United States Patent
Motoyama et al.

(10) Patent No.: US 7,574,489 B2
(45) Date of Patent: Aug. 11, 2009

(54) SYSTEM, METHOD, AND COMPUTER PROGRAM PRODUCT FOR EXTRACTING INFORMATION FROM REMOTE DEVICES THROUGH THE HTTP PROTOCOL

(75) Inventors: Tetsuro Motoyama, Cupertino, CA (US); Avery Fong, Castro Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 362 days.

(21) Appl. No.: 11/517,362

(22) Filed: Sep. 8, 2006

(65) Prior Publication Data

US 2008/0065784 A1 Mar. 13, 2008

(51) Int. Cl.
G06F 15/16 (2006.01)
(52) U.S. Cl. .................. 709/219; 709/217; 709/223; 709/224
(58) Field of Classification Search ............. 709/206, 709/217, 223, 224, 219
See application file for complete search history.

(56) References Cited

U.S. PATENT DOCUMENTS

| | | |
|---|---|---|
| 6,317,848 B1 | 11/2001 | Sorens et al. |
| 6,421,608 B1 | 7/2002 | Motoyama et al. |
| 6,839,717 B1 | 1/2005 | Motoyama et al. |
| 6,889,264 B2 | 5/2005 | Clough et al. |
| 6,925,571 B1 | 8/2005 | Motoyama et al. |
| 6,961,659 B2 | 11/2005 | Motoyama et al. |
| 7,053,767 B2 | 5/2006 | Petite et al. |
| 7,136,914 B2 | 11/2006 | Motoyama |
| 2002/0152028 A1 | 10/2002 | Motoyama et al. |
| 2002/0152235 A1 | 10/2002 | Motoyama et al. |
| 2002/0152292 A1 | 10/2002 | Motoyama et al. |
| 2003/0055952 A1 | 3/2003 | Motoyama et al. |
| 2003/0055953 A1 | 3/2003 | Motoyama et al. |
| 2003/0177227 A1 | 9/2003 | Motoyama et al. |
| 2003/0217052 A1* | 11/2003 | Rubenczyk et al. ............ 707/3 |
| 2004/0128315 A1 | 7/2004 | Motoyama et al. |
| 2004/0128365 A1 | 7/2004 | Motoyama et al. |
| 2004/0139183 A1 | 7/2004 | Motoyama et al. |
| 2004/0254915 A1 | 12/2004 | Motoyama et al. |
| 2004/0255014 A1 | 12/2004 | Motoyama et al. |
| 2004/0255021 A1 | 12/2004 | Motoyama et al. |
| 2004/0255023 A1 | 12/2004 | Motoyama et al. |
| 2005/0071444 A1 | 3/2005 | Motoyama |
| 2005/0071483 A1 | 3/2005 | Motoyama |
| 2005/0160014 A1* | 7/2005 | Moss et al. .................. 705/26 |

(Continued)

OTHER PUBLICATIONS

U.S. Appl. No. 12/062,146, filed Apr. 3, 2008, Motoyama, et al.

(Continued)

Primary Examiner—Salad Abdullahi
Assistant Examiner—O. C Vostal
(74) Attorney, Agent, or Firm—Oblon, Spivak, McClelland, Maier & Neustadt, P.C.

(57) ABSTRACT

There is provided a method, system, and computer program product for extracting information related to a monitored device communicatively coupled to a network using an HTTP communication protocol. The method includes: retrieving, from a first memory, vendor and model information of the monitored device; determining vendor and model through the web page from the monitored device; obtaining the device state information; and storing, in a second memory, the device information obtained in the accessing step, in association with the vendor and model information.

9 Claims, 56 Drawing Sheets

U.S. PATENT DOCUMENTS

| | | |
|---|---|---|
| 2005/0165926 A1 | 7/2005 | Motoyama et al. |
| 2005/0165927 A1 | 7/2005 | Motoyama et al. |
| 2005/0177642 A1 | 8/2005 | Motoyama et al. |
| 2005/0240939 A1 | 10/2005 | Motoyama et al. |
| 2005/0246437 A1 | 11/2005 | Motoyama et al. |
| 2005/0251692 A1 | 11/2005 | Motoyama et al. |
| 2005/0278428 A1 | 12/2005 | Motoyama et al. |
| 2005/0278429 A1 | 12/2005 | Motoyama et al. |
| 2006/0031543 A1 | 2/2006 | Motoyama et al. |
| 2006/0041380 A1 | 2/2006 | Motoyama et al. |
| 2006/0059255 A1 | 3/2006 | Motoyama et al. |
| 2006/0069767 A1 | 3/2006 | Motoyama et al. |
| 2006/0080429 A1 | 4/2006 | Motoyama et al. |
| 2006/0155824 A1 | 7/2006 | Motoyama et al. |
| 2006/0155845 A1 | 7/2006 | Motoyama et al. |
| 2006/0155846 A1 | 7/2006 | Motoyama et al. |
| 2006/0168197 A1 | 7/2006 | Motoyama et al. |
| 2006/0184659 A1 | 8/2006 | Motoyama et al. |
| 2007/0073758 A1* | 3/2007 | Perry et al. ............ 707/102 |

OTHER PUBLICATIONS

U.S. Appl. No. 11/867,741, filed Oct. 5, 2007, Motoyama et al.
U.S. Appl. No. 09/453,937, filed May 17, 2000, Motoyama, et al.
U.S. Appl. No. 09/953,357, filed Sep. 17, 2001, Motoyama, et al.
U.S. Appl. No. 09/975,938, filed Oct. 15, 2001, Motoyama, et al.
U.S. Appl. No. 10/068,861, filed Feb. 11, 2002, Motoyama, et al.
U.S. Appl. No. 10/157,904, filed May 31, 2002, Motoyama, et al.
U.S. Appl. No. 10/162,402, filed Jun. 5, 2002, Motoyama.
U.S. Appl. No. 10/225,290, filed Aug. 22, 2002, Motoyama.
U.S. Appl. No. 10/372,939, filed Feb. 26, 2003, Motoyama.
U.S. Appl. No. 11/234,319, filed Sep. 26, 2005, Motoyama, et al.
U.S. Appl. No. 11/234,322, filed Sep. 26, 2005, Motoyama, et al.
U.S. Appl. No. 11/234,224, filed Sep. 26, 2005, Motoyama, et al.
U.S. Appl. No. 11/234,323, filed Sep. 26, 2005, Motoyama, et al.
U.S. Appl. No. 11/517,363, filed Sep. 8, 2006, Motoyama, et al.
U.S. Appl. No. 11/517,430, filed Sep. 8, 2006, Motoyama, et al.
U.S. Appl. No. 11/517,378, filed Sep. 8, 2006, Motoyama, et al.
U.S. Appl. No. 11/517,428, filed Sep. 8, 2006, Motoyama, et al.
U.S. Appl. No. 11/940,785, filed Nov. 15, 2007, Motoyama, et al.
U.S. Appl. No. 11/960,248, filed Dec. 19, 2007, Motoyama, et al.
U.S. Appl. No. 12/015,659, filed Jan. 17, 2008, Motoyama, et al.

* cited by examiner

Vector of CAbsProtocol*
500

| CAbsProtocol* 502 | CAbsProtocol* 504 | CAbsProtocol* 506 | ... |
|---|---|---|---|

FIG. 23

Status Information Map
724

| 726 | 728 |
|---|---|
| InfoType | pair<string, int> |
| InfoType | pair<string, int> |
| InfoType | pair<string, int> |
| ... | ... |

FIG. 29 m_NormalizedVendorMap std::map<std::string, std::string>

| Vendor | Normalized Vendor |
|---|---|
| BROTHER | Brother |
| Brother | Brother |
| DELL | Dell |
| Dell | Dell |
| HP | HP |
| hp | HP |
| Hewlett-Packard | HP |
| Hewlett Packard | HP |
| QMS | KonicaMinolta |
| Minolta | KonicaMinolta |
| Konica | KonicaMinolta |
| Minolta-QMS | KonicaMinolta |
| KonicaMinolta | KonicaMinolta |
| MINOLTA | KonicaMinolta |
| Kyocera | KyoceraMita |
| Mita | KyoceraMita |
| Kyocera Mita | KyoceraMita |
| KYOCERA | KyoceraMita |
| LEXMARK | Lexmark |
| Lexmark | Lexmark |
| Oki | Oki |
| OKI | Oki |
| Oki Data | Oki |
| RICOH | Ricoh |
| Ricoh | Ricoh |
| SAMSUNG | Samsung |
| Samsung | Samsung |
| Xerox | Xerox |
| xerox | Xerox |
| XEROX | Xerox |

FIG. 30 m_NormalizedModelMap std::map<std::string, std::string>

| Normalized Vendor + "%" + Model | Normalized Model |
|---|---|
| HP%Laser Jet 9000 | LaserJet9000 |
| HP%laserjet 9000 | LaserJet9000 |
|  |  |

FIG. 31 m_VendorModelIDMap std::map<std::string, int>

| Normalized Vendor + "%" + Normalized Model | Vendor Model ID |
|---|---|
| HP%LaserJet9000 | 30010 |
| HP%ColorLaserJet4550 | 30025 |
| | |

FIG. 32

SKeyValueInfo Structure m_VendorModelSearchMap std::map<std::string, std::vector< std::pair <std::string, std::vector<std::string> > > >

| Normalized Vendor | Vector of pair<WebPage, <model name1, model name2 ....>> |
|---|---|
| HP | <br>{/hp/device/this.LCDispatcher?dispatch=html&cat=0&pos=1 ,<br>  <HP Color LaserJet 4550, HP LaserJet 9000 Series, hp color LaserJet 5500>},<br>{/hp/device/this.LCDispatcher?nav=hp.Config,<br>  <hp LaserJet 4345 mfp>}<br>> |
|  |  |
|  |  |

FIG. 39 m_UniqueIDSearchMap std::map<int, std::pair<std::string, std::vector<SKeyValueInfo> > >

| VendorModelID | <WebPage,<br>                              \| infoType<br>                              \| nRelativePriority<br>                              \| sFrontDelete1<br>Vector of SKeyValueInfo \| sFrontDelete2<br>                              \| sBackDelete<br>                              \| Vector of sKey<br>> |
|---|---|
| 2000001 | </hp/device/this.LCDispatcher?dispatch=html&cat=0&pos=1,<br>  < [102,<br>    10000,<br>    "Printer Serial Number:",<br>    "",<br>    "</font>",<br>    <"}document.writeln('</MAP>');</script>"><br>  ] ><br>> |
|  |  |

FIG. 40 m_VendorModelStatusMap std::map<std::string, std::vector<std::pair<std::string, std::vector<SKeyValueInfo> > >

| Vendor%Model | Vector of | <WebPage, <br> Vector of SKeyValueInfo <br> > | \| infoType <br> \| nRelativePriority <br> \| sFrontDelete1 <br> \| sFrontDelete2 <br> \| sBackDelete <br> \| Vector of Key |
|---|---|---|---|
| HP%ColorLaserJet5500 | < </hp/device/this.LCDispatcher?dispatch=html&cat=0&pos=2, <br>   < [700, <br>     10000, <br>     "size=\"1\">", <br>     "", <br>     "%", <br>     <"Black Print", "</td>"> <br>   ] <br>   [701, <br>     10000, <br>     "size=\"1\">", <br>     "", <br>     "%", <br>     <"Magenta Print", "</td>"> <br>   ] <br>   > <br> > <br> . <br> . <br> > | | |

FIG. 41 m_ExtractionStateVector std::vector<SExtractionState>

| | | |
|---|---|---|
| Vector of SExtractionState | ELineState | m_LineState |
| | std::vector<std::string>::iterator | m_CurrentPreconditionItr |
| | std::vector<std::string>::iterator | m_EndItr |
| | infoType | m_infoType |
| | int | m_nRelativePriority |
| | std::string | m_sFrontDelete1 |
| | std::string | m_sFrontDelete2 |
| | std::string | m_sBackDelete |

<ExtractionState, ExtractionState, ExtractionState......>

FIG. 42

```
<html><head><title>HP LaserJet 9000 Series</title><meta http-equiv="Content-Type" content="text/html" charset="ISO-8859-1">
<meta http-equiv="Content-Style-Type" content="text/css">
<meta http-equiv="Content-Language" content="en">
<LINK REL=StyleSheet HREF="jsfiles/formatting.css" TYPE="text/css" MEDIA=screen><SCRIPT LANGUAGE="JavaScript" type="text/javascript">
if (navigator.appName == "Microsoft Internet Explorer") {
   document.writeln(' <LINK REL=StyleSheet HREF="jsfiles/formatting.css" TYPE="text/css" MEDIA=all> ');
}
```

FIG. 45 m_VendorModelSearchMap std::map<std::string, std::vector< std::pair <std::string, std::vector<std::string> > > >

| Normalized Vendor | Vector of pair<WebPage, <model name1, model name2 ....>> |
|---|---|
| HP | <br>{<br>/hp/device/this.LCDispatcher?dispatch=html&cat=0&pos=1,<br><br>HP Color LaserJet 4550,<br>HP LaserJet 9000 Series,<br>hp color LaserJet 5500<br>><br>},<br>{<br>/hp/device/this.LCDispatcher?nav=hp.Config,<br><br>hp LaserJet 4345 mfp<br>><br>}<br>> |
| Xerox | <br>{<br>/t_config.htm,<br><br>DocuPrint NC60,<br>DocuPrint N4025<br>><br>},<br>{<br>/aboutprinter.shtml,<br><br>Phaser 7300<br>><br>}<br>{<br>/aboutprinter.html,<br><br>Phaser 6250N<br>><br>}<br>> |

FIG. 46

```
function BeforeTonerPerOption(tonerType)
{
        document.write('<tr><td width="2" height="50"></td><td width="163" height="50"><p style="margin-top: 0; margin-bottom: 0">');
        document.write('<font size="2" face="Arial">'+tonerType+' Toner :</font></p><p style="margin-top: 0; margin-bottom: 0">');
}
function RemainTonerOption()
{
    if((modelVer != 0x0701)&&(modelVer != 0x0702)&&(modelVer != 0x0703)&&(modelVer != 0x0711))
    {
        document.write('<tr><td width="10" height="35"></td><td width="263" height="35"><font size="2" face="Arial">Remain Toner :(0%)</font></td>');
        document.write('<td width="381" height="35" colspan="2"><table border="1" width="300" cellspacing="0" cellpadding="0"><tr><td width="300" height="17">');
        document.write('<table border="0" height="100%" width="300" cellspacing="0" cellpadding="0"><tr>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('</tr></table></td></tr></table><table border="0" width="300" cellspacing="0">');
        document.write('<tr><td width="100"><font face="Arial" size="2">0%</font></td>');
        document.write('<td width="100" align="center"><font face="Arial" size="2">50%</font></td>');
        document.write('<td width="100" align="right"><font face="Arial" size="2">100%</font></td></tr></table></td></tr>');
    }
    else
    {
        var CyanToneriPer    = 86;
        var MagentaTonerPer  = 88;
        var YellowTonerPer = 88;
        var BlackTonerPer    = 68;

BeforeTonerPerOption("Cyan");
        document.write('<font size="2" face="Arial">('+CyanTonerPer+'%)</font>');
        BeforeRemainTonerOption();
        DisplayReminedToner(CyanTonerPer,"#00FFFF");
        AfterRemainTonerOption();

BeforeTonerPerOption("Magenta");
        document.write('<font size="2" face="Arial">('+MagentaTonerPer+'%)</font>');
        BeforeRemainTonerOption();
        DisplayReminedToner(MagentaTonerPer,"#FF00FF");
        AfterRemainTonerOption();

BeforeTonerPerOption("Yellow");
        document.write('<font size="2" face="Arial">('+YellowTonerPer+'%)</font>');
        BeforeRemainTonerOption();
        DisplayReminedToner(YellowTonerPer,"#FFFF00");
        AfterRemainTonerOption();

BeforeTonerPerOption("Black");
        document.write('<font size="2" face="Arial">('+BlackTonerPer+'%)</font>');
        BeforeRemainTonerOption();
        DisplayReminedToner(BlackTonerPer,"#000000");
        AfterRemainTonerOption();
    }
}
```

FIG. 48 m_VendorModelStatusMap std::map<std::string, std::vector<std::pair<std::string, std::vector<SKeyValueInfo> > > >

| Vendor%Model | Vector of | <WebPage,<br>Vector of SKeyValueInfo<br>> | \| infoType<br>\| nRelativePriority<br>\| sFrontDelete1<br>\| sFrontDelete2<br>\| sBackDelete<br>\| Vector of sKey |
|---|---|---|---|
| Samsung%CLP550 | <br></panel/setup.htm,<br>  < [700, 15000, "=", "", ";",<br>    <"var YellowTonerPer"><br>  ],<br>  [701, 15000, "=", "", ";",<br>    <"var CyanTonerPer"><br>  ],<br>  [702, 15000, "=", "", ";",<br>    <"function RemainTonerOption()", "else", "{"><br>  ],<br>  [703, 15000, "=", "", ";",<br>    <"var MagentaTonerPer"><br>  ]<br>  .<br>  .<br>  ><br>><br>.<br>.<br>> | | |

FIG. 49 m_VendorModelSupport std::map<std::string, std::vector<std::string> >

| Vendor | Vector of strings of model names |
|---|---|
| RICOH | < Aficio 1022, Aficio 1075, Aficio 1224C> |
| XEROX | <N4025, NC60> |
| HP | <HP9000, LaserJet 4550C> |
|  |  |
|  |  |

FIG. 52 m_VendorOIDInfoMap std::map<std::string, SVendorOIDInfo>

| Vendor | struct SVendorOIDInfo {<br>   std::string m_sEnterpriseOID<br>   std::string m_sOIDForModel<br>   std::string m_sOIDForUniqueID<br>} |
|---|---|
| RICOH | 1.3.6.1.4.1.367<br>1.3.6.1.4.1.367.3.2.1.1.1.1<br>1.3.6.1.4.1.367.3.2.1.2.1.4 |
| XEROX | 1.3.6.1.4.1.253<br>1.3.6.1.4.1.253.8.53.3.2.1.2<br>1.3.6.1.4.1.253.8.53.3.2.1.3 |
|  |  |

FIG. 53 m_VendorModelOIDInfo std::map<std::string, std::map<std::string, std::vector<std::pair<SOIDinfoType, int> > > >

| Normalized Vendor | Map of Key = Normalized Model, Value = Vector of Pair of SOIDinfoType and int (Relative Priority) | |
|---|---|---|
| | Normalized Model | Vector of SOIDinfoType and int (relative Priority) |
| Ricoh | GENERIC | < (SOIDinfoType1, int1), (SOIDinfoType2, int2) > |
| | Aficio1224C | < (SOIDinfoType3, int3) > |
| | | |
| Xerox | | |
| | | |
| | | |

FIG. 54 m_NormalizedVendorModel
std::map<std::string, std::pair<std::string, std::string> >

| Normalized Vendor + "%" + Normalized Model | <Vendor, Model> |
|---|---|
| "Xerox%DocuPrintN4025" | <"XEROX"," DocuPrint N4025"> |
| "Dell%5100cn" | <"DELL", "Laser Printer 5100cn"> |
| | |

FIG. 55

SYSTEM, METHOD, AND COMPUTER PROGRAM PRODUCT FOR EXTRACTING INFORMATION FROM REMOTE DEVICES THROUGH THE HTTP PROTOCOL

CROSS-REFERENCE TO RELATED APPLICATIONS

This application is related to the following commonly owned co-pending U.S. patent applications:

1. Ser. No. 09/453,937 entitled "Method and System of Remote Diagnostic, Control, and Information Collection using a Dynamic Linked Library of Multiple Formats and Multiple Protocols with Intelligent Formatter," filed May 17, 2000;

2. Ser. No. 09/756,120 entitled "Method and System of Remote Support of Device Using Email," filed Jan. 9, 2001;

3. Ser. No. 09/782,064 entitled "Method and System of Remote Diagnostic, Control, and Information Collection using a Dynamic Linked Library of Multiple Formats and Multiple Protocols with Three-Level Formatting," filed Feb. 14, 2001;

4. Ser. No. 09/921,707 entitled "Universal Controller in The Wireless Networked Environment," filed Aug. 6, 2001;

5. Ser. No. 09/953,357 entitled "System, Method, and Computer Program Product for Collecting and Sending Various Types of Information to a Monitor Using Email," filed Sep. 17, 2001;

6. Ser. No. 09/953,358 entitled "Method and System of Remote Support of Device Using Email Through Data Transfer Module," filed Sep. 17, 2001;

7. Ser. No. 10/831,187 entitled "Method and System of Remote Monitoring and Support of Devices, Extracting Data from Different Types of Email Messages, and Storing Data According to Data Structures Determined by the Message Types," filed Apr. 26, 2004;

8. Ser. No. 09/953,359 entitled "Method and System for Remote Support of Device using Email for Sending Information Related to a Monitored Device," filed Sep. 17, 2001;

9. Ser. No. 09/975,938 entitled "Method and System of Remote Monitoring and Support of Devices, Including Handling Email Messages Having Messages Types Specified Within the Email Message," filed Oct. 15, 2001;

10. Ser. No. 11/153,543 entitled "Method and System of Remote Support of Device Using Email Based Upon POP3 with Decryption Capability Through Virtual Function," filed Jun. 16, 2005;

11. Ser. No. 10/157,905 entitled "Method and Apparatus for Monitoring Remote Devices Through a Local Monitoring Station and Communication With a Central Station Supporting Multiple Manufacturers," filed May 31, 2002;

12. Ser. No. 10/157,904 entitled "Method and Apparatus for Providing Multiple Vendor Support to Remotely Monitored Devices," Filed May 31, 2002;

13. Ser. No. 10/157,903 entitled "Method and Apparatus for Modifying Remote Devices Monitored by a Monitoring System," filed May 31, 2002;

14. Ser. No. 10/162,402 entitled "Method and System for Monitoring Network Connected Devices and Displaying Device Status," filed Jun. 5, 2002;

15. Ser. No. 10/606,862 entitled "Method and System of Remote Position Reporting Device," filed Jun. 27, 2003;

16. Ser. No. 11/182,889 entitled "Method and System of Remote Position Reporting Device," filed Jul. 18, 2005;

17. Ser. No. 11/234,224 entitled "Method and System for Script Implementation of HTTP to Obtain Information from Remote Devices," filed on Sep. 26, 2005;

18. Ser. No. 09/975,935 entitled "Method and System for Remote Support of Device Using Email Based Upon Pop3 With Decryption Capability Through Virtual Function," filed Oct. 15, 2001;

19. Ser. No. 10/068,861 entitled "Method and Apparatus Utilizing Communication Means Hierarchy to Configure or Monitor an Interface Device," filed Feb. 11, 2002;

20. Ser. No. 10/142,989 entitled "Verification Scheme for Email Message Containing Information About Remotely Monitored Devices," filed May 13, 2002;

21. Ser. No. 10/142,992 entitled "Method for Scrambling Information about Network Devices That is Placed in Email Message," filed May 13, 2002;

22. Ser. No. 10/157,903 entitled "Method and Apparatus for Modifying Remote Devices Monitored by a Monitoring System," filed May 31, 2002;

23. Ser. No. 10/162,402 entitled "Method and System to Use HTTP and Html/Xml for Monitoring the Devices," filed Jun. 5, 2002;

24. Ser. No. 10/167,497 entitled "Method and System of Remote Position Reporting Device," filed Jun. 13, 2002, which is a continuation of Ser. No. 09/575,702 (U.S. Pat. No. 6,421,608);

25. Ser. No. 10/225,290 entitled "Method and System for Monitoring Network Connected Devices with Multiple Protocols," filed Aug. 22, 2002;

26. Ser. No. 10/328,003 entitled "Method of Accessing Information from Database to be used to Obtain Status Information from the Web Pages of Remotely Monitored Devices," filed Dec. 26, 2002;

27. Ser. No. 10/328,008 entitled "Method of using Internal Structure to Store Database Information for Multiple Vendor and Model Support for Remotely Monitored Devices," filed Dec. 26, 2002;

28. Ser. No. 10/328,026 entitled "Method of using Vectors of Structures for Extracting Information from the Web Pages of Remotely Monitored Devices," filed Dec. 26, 2002;

29. Ser. No. 10/372,939 entitled "Method and System for Monitoring Network Connected Devices with Multiple Protocols," filed Feb. 26, 2003;

30. Ser. No. 10/460,150 entitled "Method for Efficiently Storing Information used to Extract Status Information from a Device Coupled to a Network in a Multi-Protocol Remote Monitoring System," filed Jun. 13, 2003;

31. Ser. No. 10/460,151 entitled "Method for Efficiently Extracting Status Information Related to a Device Coupled to a Network in a Multi-Protocol Remote Monitoring System," filed Jun. 13, 2003;

32. Ser. No. 10/460,404 entitled "Method for Parsing an Information String to Extract Requested Information Related to a Device Coupled to a Network in a Multi-Protocol Remote Monitoring System," filed Jun. 13, 2003;

33. Ser. No. 10/460,408 entitled "Method and System for Extracting Vendor and Model Information in a Multi-Protocol Remote Monitoring System," filed Jun. 13, 2003;

34. Ser. No. 10/670,505 entitled "Method and System for Extracting Information from Networked Devices in a Multi-Protocol Remote Monitoring System," filed Sep. 26, 2003;

35. Ser. No. 10/670,604 entitled "Method and System for Supporting Multiple Protocols Used to Monitor Networked Devices in a Remote Monitoring System," filed Sep. 26, 2003;

36. Ser. No. 10/764,467 entitled "Method and System for Determining the Type of Status Information to Extract from Networked Devices in a Multi-Protocol Remote Monitoring System," filed Jan. 27, 2004;

37. Ser. No. 10/764,527 entitled "Method and System for Managing Protocols Used to Obtain Status Information from a Network Device," filed Jan. 27, 2004;

38. Ser. No. 10/764,569 entitled "Method and System for Managing Vendor and Model Information in a Multi-Protocol Remote Monitoring System," filed Jan. 27, 2004;

39. Ser. No. 10/764,582 entitled "Method and System for Initializing Protocol Information Used to Extract Status Information from Networked Devices," filed Jan. 27, 2004;

40. Ser. No. 10/927,158, entitled "Method and System for Using Abstract Classes to Extract Status Information From Networked Devices," filed Aug. 27, 2004;

41. Ser. No. 10/927,257, entitle "Method and System for Using Abstract Classes to Extract Status Information from Networked Devices," filed Aug. 27, 2004;

42. Ser. No. 10/927,283, entitled "Method of Initializing a Data Processing Object Associated with a Communication Protocol Used to Extract Status Information Related to a Monitored device," filed Aug. 27, 2004;

43. Ser. No. 11/032,039, entitled "Method and System for Extracting Information from Networked Devices Using Multiple Implementations of Protocol Access Functions," filed Jan. 11, 2005;

44. Ser. No. 11/032,016, entitled "Monitoring Device Having a Memory Containing Data Representing Access Information Configured to be Used by Multiple Implementations of Protocol Access Functions to Extract Information From Networked Devices," filed Jan. 11, 2005;

45. Ser. No. 11/032,063, entitled "Monitoring Device Having a Memory Containing Data Representing Access Information Configured to be Used by Multiple Implementations of Protocol Access Functions to Extract Information From Networked Devices," filed Jan. 11, 2005;

46. Ser. No. 11/032,088, entitled "Method and System for Extracting Information From Networked Devices Using the HTTP Protocol and Precondition Information," filed Jan. 11, 2005;

47. Ser. No. 11/032,192, entitled "Method and System For Extracting Status Information From Networked Devices Using the SNMP Protocol," filed Jan. 11, 2005;

48. Ser. No. 11/234,322, entitled "Method and System for Use of Abstract Classes for Script Implementation of HTTP to Obtain Information from Devices," filed on Sep. 26, 2005;

49. Ser. No. 11/234,319, entitled "Database for Multiple Implementation of HTTP to Obtain Information from Devices," filed Sep. 26, 2005;

50. Ser. No. 11/234,323, entitled "Method and System for Script Processing in Script Implementation of HTTP to Obtain Information from Devices," filed on Sep. 26, 2005;

51. Application Ser. No. 11/517,378, entitled "Vendor Identification of Remote Device of Merged Companies," filed concurrently with the present application;

52. Application Ser. No. 11/517,430, entitled "System for Identification of Vendor and Model Name of Remote Device Among Multiple Network Protocols," filed concurrently with the present application;

53. Application Ser. No. 11/517,363, entitled "Data Used with the HTTP Protocol for Extracting Information from Remote Devices," filed concurrently with the present application;

54. Application Ser. No. 11/517,428, entitled "SNMP Implementation to Obtain Vendor Information From Remote Devices," filed concurrently with the present application.

The disclosures of each of the above U.S. patents and patent applications are incorporated herein by reference in their entirety.

The present invention includes the use of various technologies referenced and described in the references identified in the following LIST OF REFERENCES by the author(s) and year of publication of the reference:

LIST OF REFERENCES

[1] Goldfart, C., *The SGML Handbook*. Clarendon Press (1990);

[2] Castro, E., *HTML for the World Wide Web*, Peachpit Press, Berkeley (1996); and

[3] Megginson, D., *Structuring XML Documents*, Prentice Hall, N.J. (1998). The entire contents of each reference listed in the LIST OF REFERENCES are incorporated herein by reference.

BACKGROUND OF THE INVENTION

1. Field of the Invention

This invention relates to the monitoring of devices connected to a network. More particularly, it relates to a method, system, and computer program product for the remote monitoring of network-connected devices using multiple protocols.

2. Discussion of the Background

As is generally known, computer systems include hardware and software. Software includes a list of instructions that are created to operate and manage hardware components that make up a computer system. Typically, computer systems include a variety of hardware components/devices that interface with one another. The computer system can be a stand-alone type or a networked type. In a networked-type computer system, a plurality of distinct devices are connected to a network and thus communication between these distinct devices is enabled via the network.

Further, software for operating the hardware devices must be configured in order to allow communication between the hardware devices so that the hardware devices are enabled to function cooperatively. Further, in order to facilitate such a communication, it is also desirable for hardware devices to be monitored and the status of each hardware device identified in order to ensure that each hardware device is functioning in an efficient manner.

For the purposes of this patent application, the inventor has determined that a hardware device that is controlling, configuring, or monitoring the plurality of distinct devices or hardware devices would be referred to as a monitoring device and the hardware devices that are being controlled, configured, or monitored by the monitoring device would be referred to as "monitored devices."

For hardware devices that are located on a network, it is desirable for these devices to be monitored for maintenance, usage, or other purposes. However, in view of manufacturer differences relating to hardware devices and interfaces, it may be difficult for a monitoring device to communicate with various other devices connected to a network. Such a disadvantage most likely prevents network administrators from obtaining crucial information about the performance and efficiency of the devices connected to the network.

The Simple Network Management Protocol (SNMP) is today a de-facto industry standard for the monitoring and management of devices on data communication networks, telecommunication systems and other globally reachable devices. Practically every organization dealing with computers and related devices expects to be able to centrally monitor, diagnose, and configure each such device across local- and wide-area networks. SNMP is the protocol that enables this interaction.

In order for a device to respond to SNMP requests, it is desirable to equip the device with the software that enables it to properly interpret an SNMP request, perform the actions required by that request, and produce an SNMP reply. The SNMP agent software is typically a subsystem software module residing in a network entity.

The collection of objects implemented by a system is generally referred to as a Management Information Base (MIB). An MIB may also be a database with information related to the monitoring of devices. Examples of other MIB's include Ethernet MIB, which focuses on Ethernet interfaces; Bridge MIB, which defines objects for the management of 802.1D bridges, to name a few.

Using SNMP for monitoring devices is difficult as private MIB's include values that are hard to decipher without a valid key. A company using SNMP for monitoring various devices connected to its network creates a unique identifier/key that is maintained as proprietary information of the company. For the most part, the results are displayed as binary or integer values. Thus, using SNMP, results received from the devices that are being monitored ("monitored devices") fail to provide a user with the status of the monitored devices in a user comprehensible manner.

Further, using SNMP, it is difficult for one to obtain detailed information about a monitored device without a valid key or access to a private MIB to decipher the results obtained as binary or integer values. In addition, a given protocol (e.g., SNMP or HTTP/HTML) may fail for various reasons, such as time out or lost packets. Also, some information extracted from a given device using the multiple protocols may be duplicated for each protocol. Accordingly, if the extraction of data from the device is not properly managed in such situations, time and memory inefficiencies result since some protocols require more resources than other protocols. In addition, information extraction using some protocols may require much less processing and memory than using others. Furthermore, some information obtained through one protocol may be more useful for the monitoring device than the one obtained through another protocol.

SNMP has a standard command to retrieve the Enterprise Object Identifier (OID) and the System Description. However, many printers include an incorrect OID to identify the vendor of the printer. For example, the inventors of the present application have observed that some models of Samsung and Brother use HP OID for their printers. Also, when companies merge or are acquired, the old OID may still be used in some machines.

Another technique to identify the vendor is to use the system description. However, in one case, the inventors of the present application observed that the System Description did not contain the vendor name, but the Enterprise OID did contain the vendor name. For example, the inventors of the present application have observed that some models of Konica Minolta do not contain the vendor name.

Many digital copiers, printers, and Multi Function (MF) machines have a web server through which the vendor name can be obtained using a browser. HTML has an advantage over SNMP because the information obtained using HTML is human readable. Unlike private MIB information in SNMP, any information obtained through HTML can be understood by a human. Therefore, meaningful information can be obtained from machines by using the HTTP communication protocol.

Furthermore, vendor names and/or model names of a machine may be different when the vendor name and the model name are obtained through the use of different protocols. For example, SNMP Enterprise OID may indicate Minolta, while HTTP may indicate Konica Minolta. The reason for this discrepancy is that Konica and Minolta merged. In some cases, the vendor name and/or model name may differ in terms of capitalization. For example, SNMP may indicate HP, while HTTP may indicate hp. In another case, the initials, such as HP, of a company may be used in one protocol, while the full company name may be used in another protocol. The inventors of the present application have recognized a problem in working with different vendor and/or product model names and a need to obtain uniform vendor and/or product model names.

Although human readable information can be extracted from machines by using HTTP/HTML processing, there is no need to perform the functions of a browser to extract the needed information. The inventors of the present application have recognized a need to simplify the process of extracting information using HTTP/HTML processing.

SUMMARY OF THE INVENTION

The system and method of the present invention addresses solutions to the above-identified problems by enabling monitoring of devices that are connected to a network. Accordingly, a method of monitoring a device among distinct devices communicatively coupled to a network is described.

The method includes accessing a first database via a hardware access module, the first database being configured to support a plurality of communication protocols. The first database is stored with information used by the plurality of communication protocols in order to obtain various information, such as manufacturer and model information of a monitored device. A communication protocol is selected from among a plurality of communication protocols, and the selected communication protocol is configured to receive state information from the monitored device. The method further includes accessing the monitored device using the selected communication protocol and information from the first database, receiving state information from the accessed device, and storing the received state information in a second database (DeviceODBC). State information includes Dynamic, Semi-Static and Static State information. Dynamic State information refers to state information that is changing frequently, such as page count, toner level, oil and gas levels of an automobile and so on. Semi-Static State information refers to state information that is infrequently changing, such as IP address, time zone, and options of a monitored device. Static State information refers to state information that does not change over the life of the machine. When word "status" is used, status refers to state information as defined in this invention.

In another embodiment, the present invention provides a method of monitoring a device among distinct devices communicatively coupled to a network. A plurality of communication protocols may be used to retrieve information from a monitored device. For example, an SNMP protocol is first selected to access a monitored device, and device information that is configured to be efficiently retrieved using the SNMP protocol is obtained. Subsequently, HTTP and FTP protocols are selected to obtain information that was incapable of efficient retrieval using the SNMP protocol if the device supports the additional protocols. The selection of protocols is performed by a protocol manager in conjunction with support information stored in a database.

In the present invention, a monitoring system enables the monitoring of at least one device (monitored device) connected to a network, such as, for example, a LAN or a WAN. The monitored device is configured to have a unique IP address. The IP address allocated to the monitored device, and the details of the vendor/manufacturer for the monitored device, are stored in a database. By scanning the network and interrogating the devices the IP addresses of the devices can be obtained. Such methods are known. Therefore, it is assumed that IP addresses of the devices to be monitored are already acquired and stored in a database.

The present invention specifies how to extract necessary information from the HTML information received from a monitored device. Once a web page location of the monitored device is accessed (i.e., through the IP address and the specified port), a specific web page corresponding to the monitored device is obtained. Information in the web page contains various state information. For example, the toner level may be shown as "Black 100%" in the color printer web page. The required information and parameter values extracted from the web page using string matching are stored in the database.

The present invention also identifies various vendors of monitored devices and the device models that are supported by the monitoring system as described herein. Since various vendors of the monitored devices present information about a monitored device in a vendor-specific manner, the present invention enables the identification of the vendor and model of the monitored device to determine the operational state of the monitored device.

According to one aspect of the present invention, there is provided a method, system, and computer program product for extracting information related to a monitored device communicatively coupled to a network using an HTTP communication protocol, comprising: retrieving, from a first memory, vendor and model information of the monitored device; determining vendor and model through the web page from the monitored device; obtaining the device state information; and storing, in a second memory, the device information obtained in the accessing step, in association with the vendor and model information.

According to another aspect of the present invention, there is provided a method, system, and computer program product for extracting vendor and model information from various protocols and synchronizing to the normalized vendor and model information.

In another embodiment of the present invention, a method of extracting information related to a monitored device communicatively coupled to a network using an SNMP communication protocol includes: accessing the monitored device using the SNMP communication protocol to obtain first information from the monitored device; attempting to extract vendor information from the obtained first information; if the vendor information was extracted from the first information, storing the vendor information in a storage device; and if the vendor information was not extracted from the first information, accessing the monitored device using the SNMP communication protocol to obtain second information, different from the first information, from the monitored device; attempting to extract vendor information from one of the first information and second information; and if the vendor information was extracted from the second information, storing the vendor information in the storage device.

In another embodiment of the present invention, a method for transforming a vendor name of a monitored device includes: accessing the monitored device using a first communication protocol to obtain information from the monitored device; determining a vendor name of the monitored device based on the information obtained from the monitored device; and determining, using the determined vendor name, a normalized vendor name of the monitored device.

In another embodiment of the claimed invention, a method for determining a normalized vendor name and a normalized model name of a monitored device in which information obtained from the monitored device varies in accordance with a communication protocol used includes: accessing the monitored device using a first communication protocol to obtain information from the monitored device; determining a vendor name and a model name of the monitored device from the information obtained from the monitored device; determining, using the vendor name, a normalized vendor name of the monitored device; and determining, using the normalized vendor name and the determined model name, a normalized model name of the monitored device.

In another embodiment of the present invention, a method of extracting information related to a monitored device communicatively coupled to a network using an HTTP communication protocol includes: obtaining a webpage address and a corresponding plurality of model names; accessing a webpage using the obtained webpage address; parsing the accessed webpage to attempt to find at least one of the plurality of model names; and if one of the model names is found in the parsing step, then normalizing the found model as the model name of the monitored device.

In another embodiment of the present invention, a method of extracting information related to a monitored device communicatively coupled to a network using an HTTP communication protocol includes: retrieving, from a first memory, a vendor name of the monitored device; accessing a database to obtain a vector corresponding to the vendor name of the monitored device, wherein the vector includes a web page address and at least one key string associated with the information to be extracted; obtaining a line from the web page using the obtained web page address; parsing the line to determine if a first key string in the at least one key string is included in the line; repeating the obtaining and parsing steps for each key string in the at least one key string until a key string in the at least one key string has been found; and extracting the information from a line of the webpage following a line determined to include the last of the at least one key string.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIG. 23 illustrates a data structure used in the HWaccess module of FIG. 22 to maintain information necessary to access the monitored devices and to obtain status information from the monitored devices according to one embodiment of the present invention;

FIG. 29 illustrates the data structures used to store and maintain the status information of a monitored device of a specific vendor and model for each protocol according to one embodiment of the present invention;

FIG. 30 illustrates a data structure used in the CNormalizedVendorModel object of FIG. 22 to maintain information about the vendors found in a monitored device and the normalized vendor name;

FIG. 31 illustrates a data structure used in the CNormalizedVendorModel object of FIG. 22 to maintain information about the models supported by the system and the normalized model name that will be used;

FIG. 32 illustrates a data structure used in the CNormalizedVendorModel object of FIG. 22 to maintain information about the identifier of the models supported by the system;

FIG. 39 illustrates a data structure used in the HTTP package of FIG. 35 to extract the model name from the web pages;

FIG. 40 illustrates a data structure used in the HTTP package of FIG. 35 to extract the unique identifier from the web pages;

FIG. 41 illustrates a data structure used in the HTTP package of FIG. 35 to extract the status information from the web pages for all devices that are monitored;

FIG. 42 illustrates a data structure used in the HTTP package of FIG. 35 to extract the status information from a web page of a device;

FIG. 45 is a sample portion of a web page of a device that contains the model name of the device;

FIG. 46 shows sample values for the data structure of FIG. 39 used to obtain the model name from the web page shown in FIG. 45;

FIG. 48 is a sample portion of a web page of a device that contains status information;

FIG. 49 shows sample values for the data structure of FIG. 41 used to obtain status information from the web page shown in FIG. 48;

FIGS. 52, 53, and 54 are data structures of the SNMP package used for obtaining the model name, unique ID, and status information from the MIB of a device;

FIG. 55 is a data structure of the SNMP package used for mapping the normalize vendor and model name with the vendor and model name as known by SNMP.

DETAILED DESCRIPTION OF THE PREFERRED EMBODIMENTS

Figure 1:
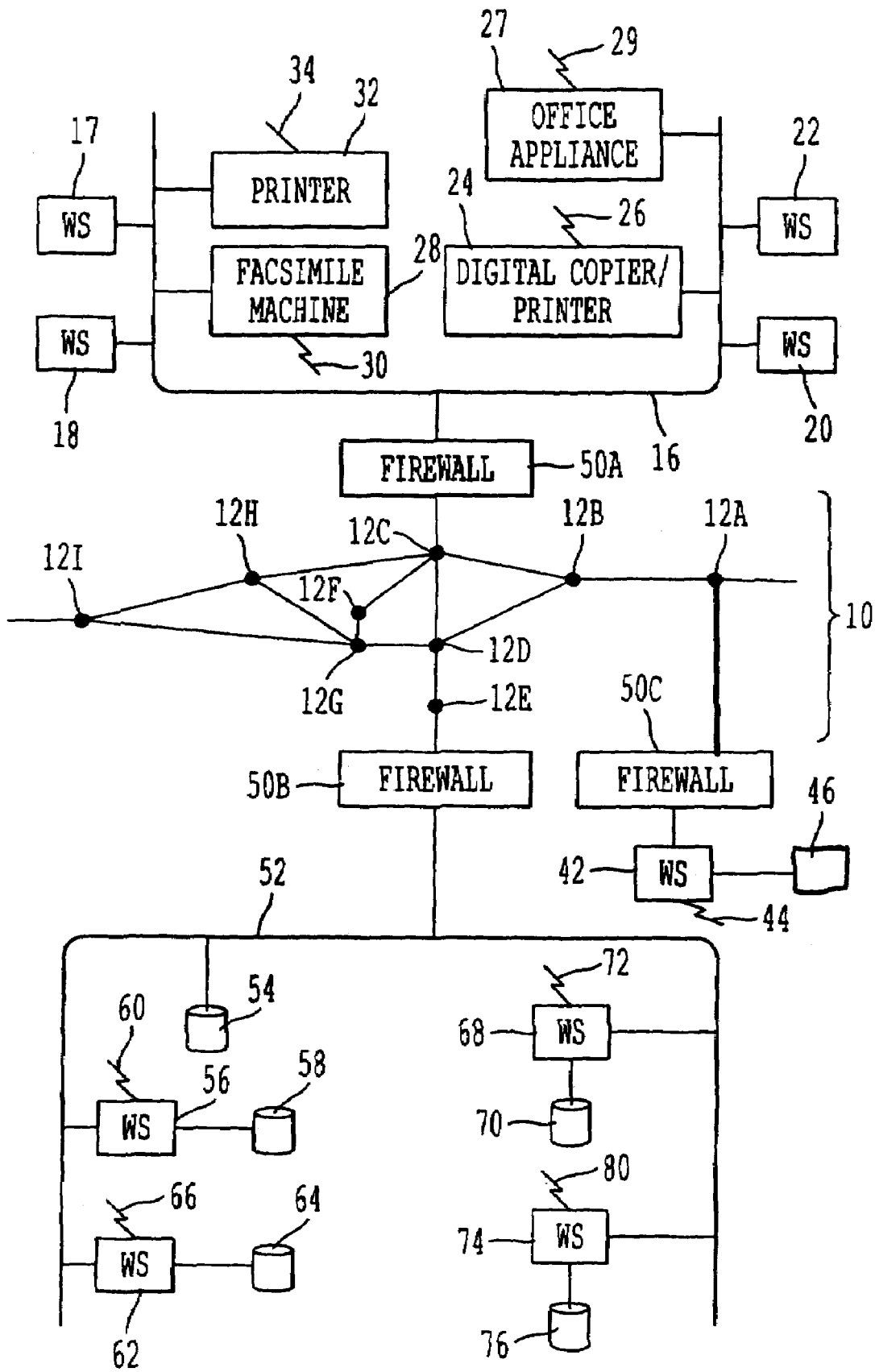
FIG. 1 illustrates networked business office devices connected to a network of computers and databases through the Internet.

FIG. 1 illustrates a schematic having various devices and computers for monitoring, diagnosing, and controlling the operation of the devices. Specifically, FIG. 1 includes a first network 16, such as a Local Area Network (LAN) connected to computer workstations 17, 18, 20, and 22. The workstations can be any type of computers including, e.g., Personal Computer devices, Unix-based computers, Linux-based computers, or Apple Macintoshes. Also connected to the network 16 are a digital image-forming apparatus 24, a facsimile machine 28, and a printer 32. As would be appreciated by one of ordinary skill in the art, two or more of the components of the digital copier/printer/multi-function machine (MF) 24 and the facsimile machine 28 can be combined into a unified "image forming apparatus." For example, the copier/printer/MF 24, facsimile machine 28, the printer 32, and the workstations 17, 18, 20, and 22 may be referred to as machines or monitored devices. In some configurations, one or more workstations may be converted to business office appliances. In addition, any network business office appliance/device can be attached to the network 16. Also, any workstation 17, 18, 20, and 22, and office appliance 27 can function as an intermediate monitoring device to poll the monitored devices on the network 16 and to send the collected data to the monitoring device.

One example of such a business office appliance is eCabinet® from Ricoh Corporation. Also, a facsimile server (not illustrated) may be connected to the network 16 and have a telephone (cellular or conventional), cable, or wireless connection. Each of the digital copier/printer/MF 24, facsimile machine 28, and printer 32, in addition to being connected to the network 16, may also include telephone (cellular or conventional) and/or cable and/or wireless connections 26, 30, and 34, respectively. As explained below, the monitored devices 24, 28, and 32, communicate with a remote monitoring, diagnosis, and control station, also referred to as a monitoring device, through, for example, the Internet via the network 16 or by a direct telephone (cellular or conventional), wireless, or cable connection.

In another exemplary business environment, monitored devices may include such devices as a multi-function imaging device, a scanner, a projector, a conferencing system, and a shredder. In another application, the network 16 may be a home network where monitored devices are meters (electricity, gas, water) or appliances such as, for example, microwave oven, washer, dryer, dishwasher, home entertainment system, refrigerator, rice cooker, heater, air condition, water heater, security camera.

In FIG. 1, a wide area network (WAN) (e.g., the Internet or its successor) is generally designated by 10. The WAN 10 can be either a private WAN, a public WAN, or a hybrid type. The WAN 10 includes a plurality of interconnected computers and routers designated by 12A-12I. The manner of communicating over a WAN is known through a series of Request for Comments (RFC) documents available from the Internet Engineering Task Force (IETF) at www.ietf.org/rfc.html. Some of the documents are RFC 821, entitled "Simple Mail Transfer Protocol"; RFC 822, entitled "Standard for the Format of ARPA Internet Text Message"; RFC 959, entitled "File Transfer Protocol (FTP)"; RFC 2045, entitled "Multipurpose Internet Mail Extensions (MIME) Part One: Format of Internet Message Bodies"; RFC 1894, entitled "An Extensible Message Format for Delivery Status Notifications"; RFC 1939, entitled "Post Office protocol—Version 3"; RFC 2068, "Hypertext Transfer Protocol—HTTP/1.1"; and RFC 2298, entitled "An Extensible Message Format for Message Disposition Notifications." The contents of each of these references are incorporated herein by reference.

Transmission Control Protocol/Internet Protocol (TCP/IP) related communication is described, for example, in the book "TCP/IP Illustrated," Vol. 1, The Protocols, by W. R. Stevens, from Addison-Wesley Publishing Company, 1994, the entire contents of which is incorporated herein by reference. Volumes 1-3 of "Internetworking with TCP/IP" by Comer and Stevens are also incorporated herein by reference in their entirety.

Continuing to refer to FIG. 1, a firewall 50A is connected between the WAN 10 and the network 16. A firewall is a device that allows only authorized computers on one side of the firewall to access a network, computers, or individual parts on the other side of the firewall. Firewalls are known and commercially available devices and/or software. Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, AddisonWesley Publishing, and "Building Internet Firewalls" by D. B. Chapman and E. D. Zwicky, 1995, O'Reilly & Associates, Inc. The entire contents of those two references are incorporated herein by reference.

The network 52 is a conventional network and includes a plurality of workstations 56, 62, 68, and 74. These workstations may be located in a distributed fashion within different departments (e.g., sales, order processing, accounting, billing, marketing, manufacturing, design engineering, and customer service departments) within a single company. In addition to the workstations connected via the network 52, a workstation 42 that is not directly connected to the network 52 is also provided. Information in a database stored in a disk 46 connected to the workstation 42 may be shared using proper encryption and protocols, such as Virtual Private Network (VPN), over the WAN 10 to the workstations connected directly to the network 52. Also, the workstation 42 can include a direct connection to a private network 44, and the database in disk 46 may be accessed through the private network 44. The cable network used by this invention may be implemented using a cable network that is typically used to carry television programming, a cable that provides for high-speed communication of digital data typically used with computers or the like, or any other desired type of cable.

In another embodiment, the workstation 42 can be a laptop computer, a PDA, a palm top computer, or a cellular phone with network capability. These devices may be used to access information stored in the database stored in the disk 46.

Information related to digital copier/printer/MF 24, office appliance 27, facsimile machine 28, or printer 32, respectively, may be stored in one or more of the databases stored in the disks 46, 54, 58, 64, 70, and 76. Known databases include (1) databases by Microsoft, IBM, and Oracle; (2) other relational databases; and (3) non-relational databases (including object-oriented databases). Each of the sales, order processing, accounting, billing, customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. For example, disk 64 may be stored with a marketing database, disk 58 may be stored with a manufacturing database, disk 70 may be stored with an engineering database, and disk 76 may be stored with a customer service database. Alternatively, the disks 54 and 46 may be stored with one or more of the databases.

In addition to the workstations 56, 62, 68, 74, and 42 being connected to the WAN 10, these workstations may also include a connection to a private network for providing a secure connection to a machine/device being monitored, diagnosed, and/or controlled. Additionally, if one of the communication media is not operating properly, one of the others may be automatically used, as a backup, for communication.

A feature of the present invention is the use of a "store-and-forward" mode of communication (e.g., Internet electronic mail, also referred to herein as e-mail) or transmission between a machine and a computer/monitoring system for diagnosing and controlling the machine. Alternatively, the message which is transmitted may be implemented using a mode of communication that makes direct, end-to-end connections (e.g., using a socket connection to the ultimate destination) such as FTP and Hyper Text Transfer Protocol (HTTP).

Figure 2:
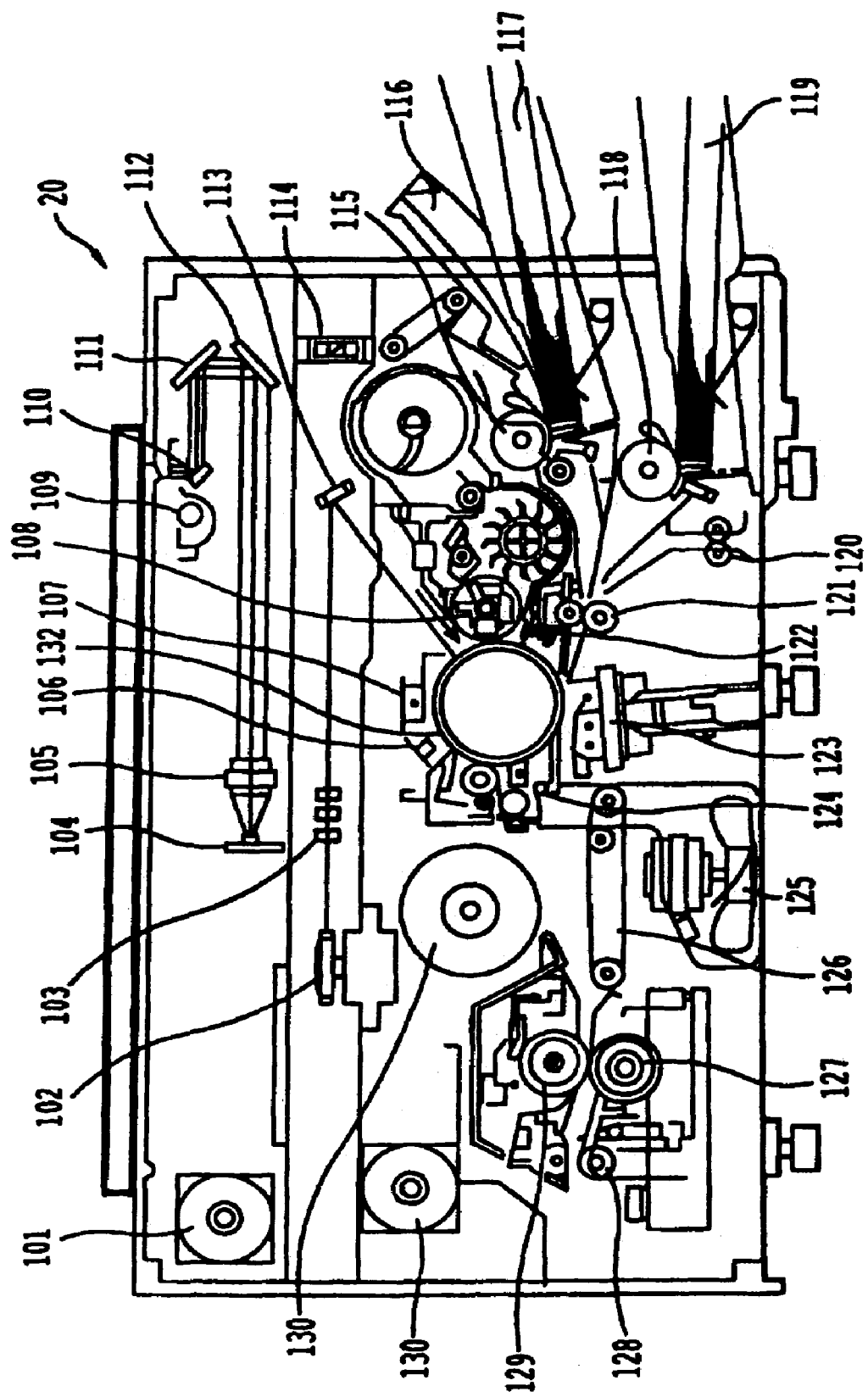
FIG. 2 illustrates the components of a digital image forming apparatus.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an F θ lens used to collimate light from a laser (not illustrated). Reference numeral 104 designates a sensor for detecting light from the scanner. Reference numeral 105 designates a lens for focusing light from the scanner onto the sensor 104, and reference numeral 106 designates a quenching lamp used to erase images on the photoconductive drum 132. There is a charging corona unit 107 and a developing roller 108. Reference numeral 109 designates a lamp used to illustrate a document to be scanned and elements 110, 111, and 112 designate mirrors for reflecting light onto the sensor 104. A drum mirror 113 is provided to reflect light to the photoconductive drum 132 originating from the polygon mirror 102. A fan 114 is used to cool the charging area of the digital image forming apparatus, and a first paper feed roller 115 is used for feeding paper from the first paper cassette 117, and a reference numeral 116 designates a manual feed table. Similarly, a second feed paper feed roller 118 is used in conjunction with the second cassette 119. Reference numeral 120 designates a relay roller, 121 designates a registration roller, 122 designates an image density sensor, and 123 designates a transfer/separation corona unit. Reference numeral 124 designates a cleaning unit, 125 designates a vacuum fan, 126 designates a transport belt, 127 designates a pressure roller; and 128 designates an exit roller. A hot roller 129 is used to fix toner onto the paper, 130 designates an exhaust fan, and a main motor 131 is used to drive the digital copier/printer 24.

Figure 3:
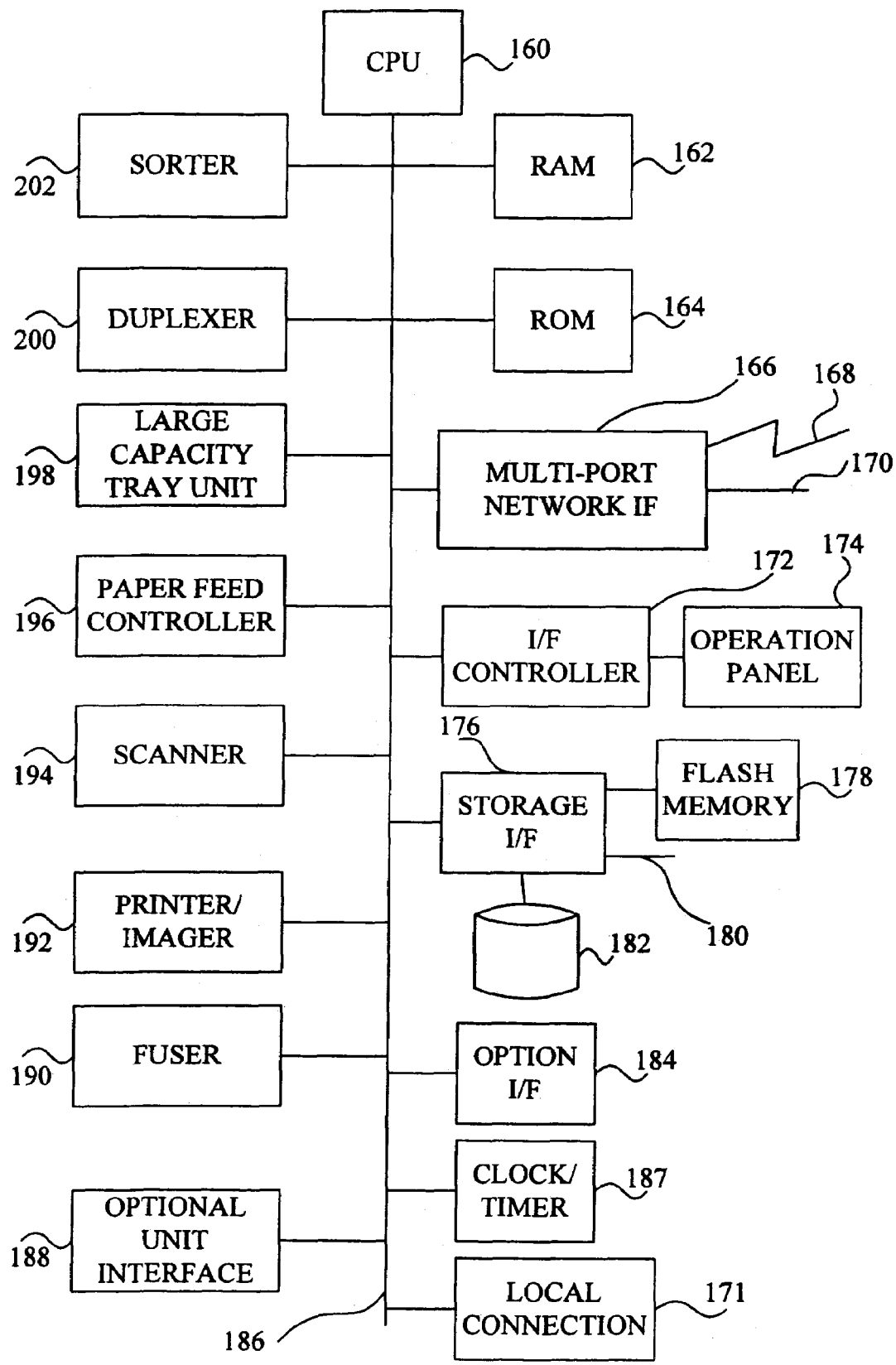
FIG. 3 illustrates the electronic components of the digital image forming apparatus illustrated in FIG. 2.

FIG. 3 is a block diagram illustrating the electronic components of the digital copier/printer/MF 24 of FIG. 2, wherein CPU 160 is a microprocessor that acts as a controller of the apparatus. Random access memory (RAM) 162 stores dynamically changing information including operating parameters of the digital copier/printer/MF 24, such as dynamic state data. A non-volatile memory (e.g., a read only memory (ROM) 164 or a Flash Memory) stores program code used to run the digital copier/printer/MF as well as static-state data, describing the copier/printerIMF 24 (e.g., the model name, model number, serial number of the device, and default parameters). In addition, some of the non-volatile memory, such as Flash Memory and a Hard Disk, may store dynamic state data and semi-static state data.

A multi-port network interface 166 is provided to enable the digital copier/printer/MF 24 to communicate with external devices through at least one communication network. Reference number 168 represents a wireless or cellular network, and numeral 170 represents another type of network different from the network identified at 168. Additional details of the multi-port network interface are set forth with respect to FIG. 4. An interface controller 172 is used to connect an operation panel 174 to a system bus 186. The operation panel 174 includes standard input and output devices found on a digital copier/printer/MF 24 including a copy button, keys to control the operation of the image forming apparatus such as, for example, number of copies, reduction/enlargement, darkness/lightness, etc. Additionally, a liquid crystal display may be included within the operation panel 174 to display parameters and messages of the digital copier/printer/MF 24 to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the entire contents of which are incorporated herein by reference. Preferably, a "reliable" communication protocol is used which includes error detection and retransmission.

A storage interface 176 connects storage devices to the system bus 186. For example, the storage devices include a flash memory 178, which can be substituted by a conventional Electrically Erasable Programmable Read Only Memory (EEPROM), and a disk 182. The disk 182 may be a hard disk, optical disk, and/or a floppy disk drive. Additional memory devices may be connected to the digital copier/printer/MF 24 via connection 180. The flash memory 178 is used to store semi-static state data that describes parameters of the digital copier/printer/MF 24 that infrequently change over the life of the apparatus 24. Such parameters include, for example, the options and configuration of the digital copier/printer. An option interface 184 allows additional hardware, such as an external interface, to be connected to the digital copier/printer/MF 24. A clock/timer 187 is utilized to keep track of both the time and date and also to measure elapsed time.

FIG. 3 also illustrates the various sections making up the digital copier/printer/MF 24. Reference numeral 202 designates a sorter and contains sensors and actuators that are used to sort the output of the digital copier/printer/MF 24. A duplexer 200 allows performance of a duplex operation. The duplexer 200 includes conventional sensors and actuators. A large capacity tray unit 198 is provided for allowing paper trays holding a large number of sheets. As with the duplexer 200, the tray unit 198 includes conventional sensors and actuators as well.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used such as a home position sensor to determine that the scanner is in the home position, and a lamp thermistor is used to ensure proper operation of the scanning lamp. A printer/imager 192 prints the output of the digital image forming device, and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device. Other elements include a GPS unit that can identify the location of the device.

Figure 4:
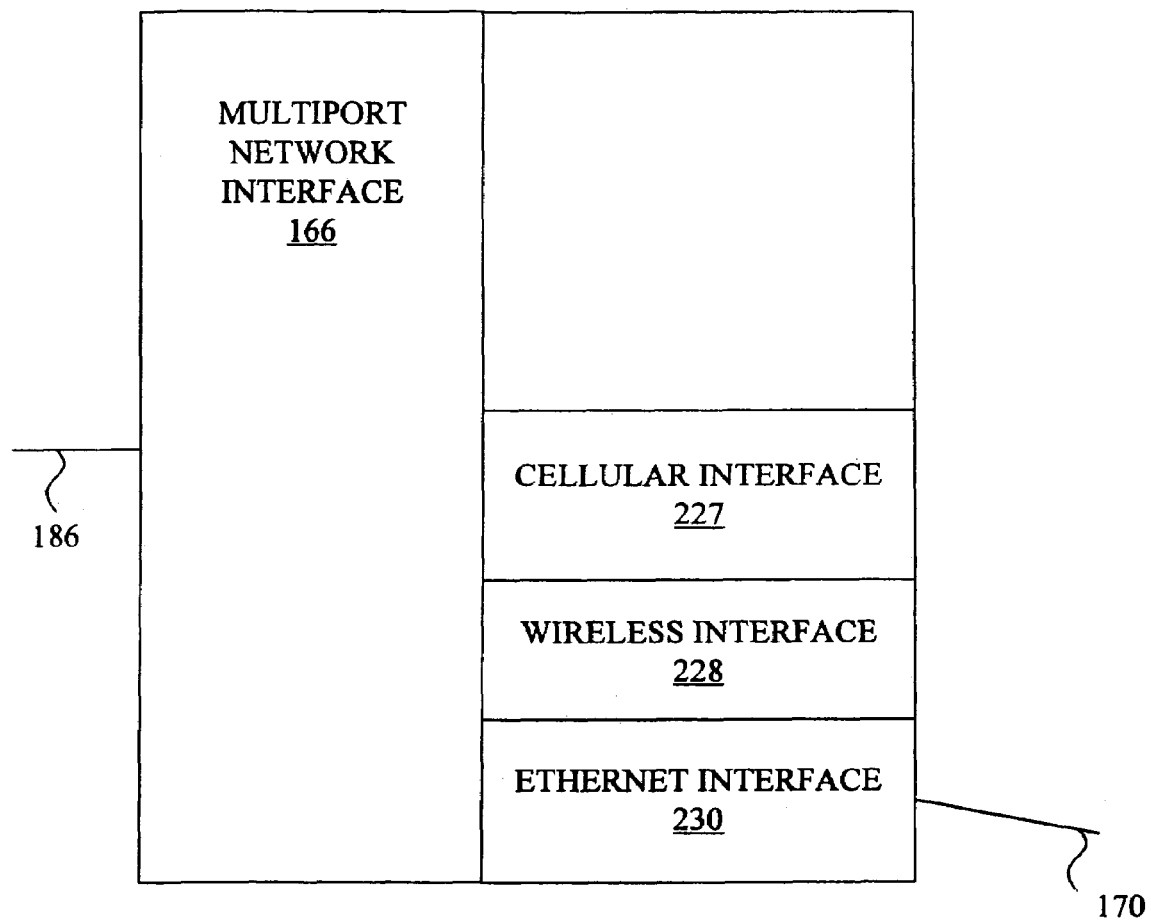
FIG. 4 illustrates details of a multi-port communication interface illustrated in FIG. 3.

FIG. 4 illustrates details of the multi-port network interface 166. The digital image forming device may communicate to external devices through a cellular interface 227, a wireless interface 228, or an Ethernet interface 230, which connects to a LAN 170. Other interfaces may include, but are not limited to, a Digital Subscriber Line (DSL) (original DSL, concentric DSL, and asymmetric DSL).

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device, and (2) a communication process used to assure reliable communication to external devices connected to the digital image forming device. The system control process monitors and controls data storage in a static state memory (e.g., the ROM 164 of FIG. 3), a semi-static state memory (e.g., the flash memory 178 or disk 182), or the dynamic state memory (e.g., a volatile or non-volatile memory (e.g., the RAM 162, the flash memory 178, or disk 182). Additionally, the static state memory may be a device other than the ROM 164 such as a non-volatile memory including either of the flash memory 178 or disk 182.

The above details have been described with respect to a digital image forming device, but the present invention is equally applicable to other business office machines or devices such as an analog copier, a facsimile machine, a scanner, a printer, a facsimile server, projector, conferencing equipment, shredder, or other business office machines, a business office appliance, or other appliances (e.g., a microwave oven, VCR, DVD, digital camera, digital cameorders, cellular phone, palm top computer). Additionally, the present invention includes other types of devices that operate using store-and-forward or direct connection-based communication. Such devices include metering systems (including gas, water, or electricity metering systems), vending machines, or any mechanical device (e.g., automobiles, motorcycles, washer, and dryer) that needs to be monitored during operation or remote diagnosis. In addition to monitoring special purpose machines and computers, the invention can be used to monitor, control, and diagnose a general purpose computer that would be the monitored and/or controlled device.

Figure 5:
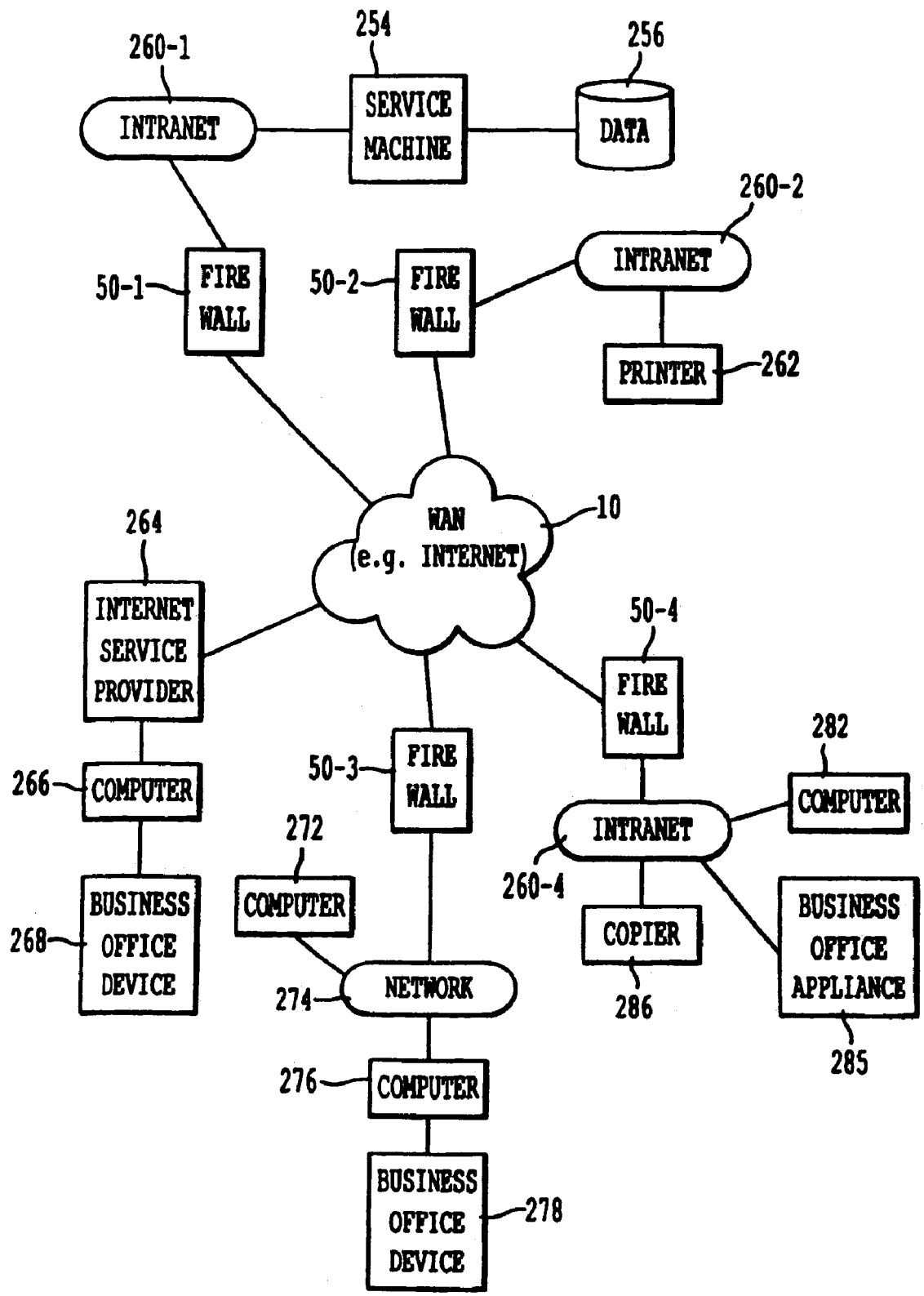
FIG. 5 illustrates an alternative system configuration in which business office devices are either connected directly to the network or connected to a computer which is connected to the network.

FIG. 5 illustrates an alternative system diagram of the present invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein, or has connected thereto, data 256 that may be stored in a database format. The data 256 includes history, performance, malfunction, and any other information such as statistical information of the operation or failure or set-up of the monitored devices, or configuration information such as which components or optional equipment is included with the monitored devices. The service machine 254 may be implemented as the device or computer that requests the monitored devices to transmit data, or that requests that remote control and/or diagnostic tests be performed on the monitored devices. The service machine 254 may be implemented as any type of device, and is preferably implemented using a computerized device such as a general purpose computer. Also, Service Machine 254 may consist of multiple computers over the network with diverse database including billing, accounting, service processing, parts tracking and reports.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet Service Provider 264, which may be any type of Internet Service Provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an Asymmetric Digital Subscriber Line (ADSL), modems that use frame relay communication, wireless modems such as a radio frequency modem, a fiber optic modem, or a device that uses infrared light waves). Further, a business office device 268 is connected to the computer 266. As an alternative to the business office device 268 (or any other device illustrated in FIG. 5), a different type of machine may be monitored or controlled such as a digital copier, any type of appliance, security system, or utility meter, such as an electrical, water, or gas utility meter, or any other device discussed herein.

Also illustrated in FIG. 5 is a firewall 50-3 connected to a network 274. The network 274 may be implemented as any type of computer network, (e.g., an Ethernet or token ring network). Networking software that may be used to control the network includes any desired networking software including software commercially available from Novell or Microsoft. The network 274 may be implemented as an intranet, if desired. A computer 272 connected to the network 274 may be used to obtain information from a business office device 278 and generate reports such as reports showing problems that occurred in various machines connected to the network, and a monthly usage report of the devices connected to the network 274. In this embodiment, a computer 276 is connected between the business office device 278 and the network 274. This computer receives communications from the network and forwards the appropriate commands or data, or any other information, to the business office device 278.

Communication between the business office device 278 and the computer 276 may be accomplished using wire-based or wireless methods including, but not limited to, radio frequency connections, electrical connections, and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique disclosed in the Bluetooth Specification (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable, but optional equipment, and therefore, the invention may be operated without the use of firewalls, if desired. For the monitoring and controlling of the networked equipment, any computers (266, 272, or 282) can be used instead of 254. In addition, any computer may access 254 to retrieve necessary device information or usage information through the web.

Figure 6A:
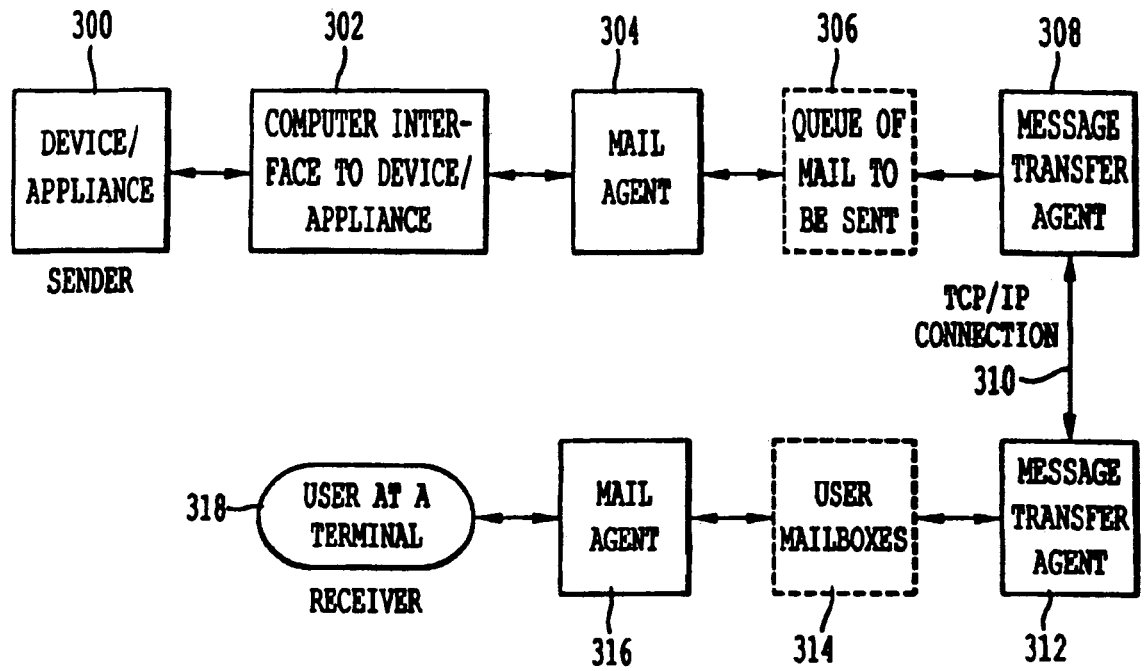
FIG. 6A is a block diagram illustrating a flow of information to and from an application unit using electronic mail.
Figure 28:
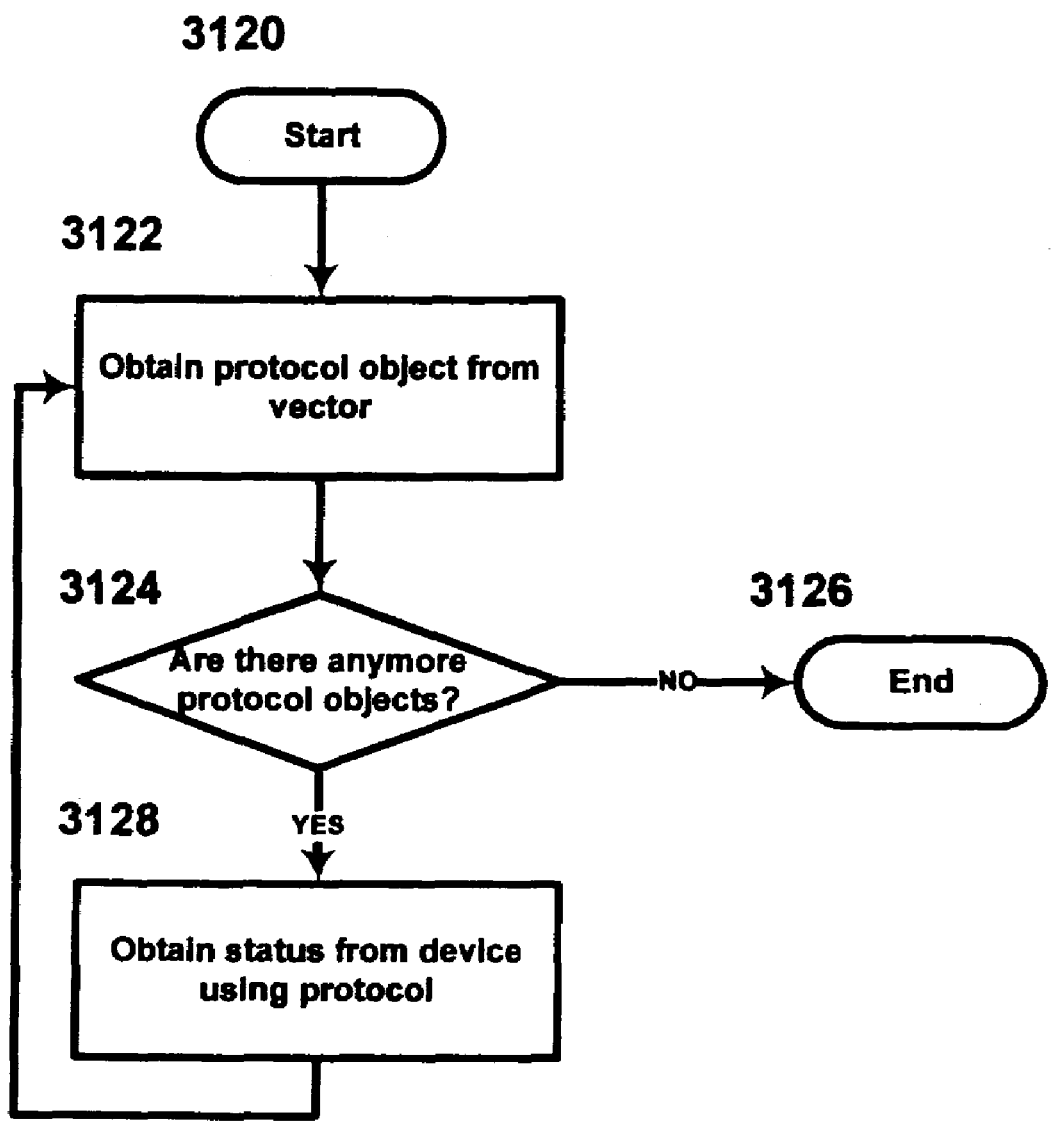
FIG. 28 shows a flowchart describing the process of obtaining status information from a monitored device using all of the communication protocols according to one embodiment of the present invention.

FIG. 6A illustrates a device/appliance 300 connected to a typical e-mail exchange system, which includes components 302, 304, 306, 308, 310, 312, 314, 316, and 318, which may be implemented in a conventional manner, and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not need to interface with the device/appliance 300 at all. The computer interface 302 then interacts with a mail agent 304. Popular mail agent for Unix includes Berkeley Mail. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may use any communication protocol. In one embodiment the present invention, elements 302 and 304 of FIG. 6A reside in the library to monitor the usage of the application unit.

From the message transfer agent 312, e-mail messages are stored in user mailboxes 314, which are transferred to the mail agent 316 and ultimately transmitted to the user at a terminal 318 which functions as a receiving terminal.

This "store-and-forward" process relieves the sending mail agent 304 from having to wait until a direct connection is established with the mail recipient. Because of network delays, the communication could require a substantial amount of time during which the application would be unresponsive. Such delays in responsiveness may generally be unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include Telnet, File Transfer Protocol (FTP), and Hyper Text Transfer Protocol (HTTP).

Public WANs, such as the Internet, are generally not considered to be secure. Therefore, if it is desired to keep messages confidential, messages transmitted over the public WANs (and multi-company private WANs) can be encrypted. Encryption mechanisms are known and commercially available and may be used with the present invention. For example, a C++ library function, crypt( ), is available from Sun Microsystems for use with the Unix operating system. Encryption and decryption software packages are known and commercially available and may also be used with this invention. One such package is PGP available from PGP Corporation.

Figure 6B:
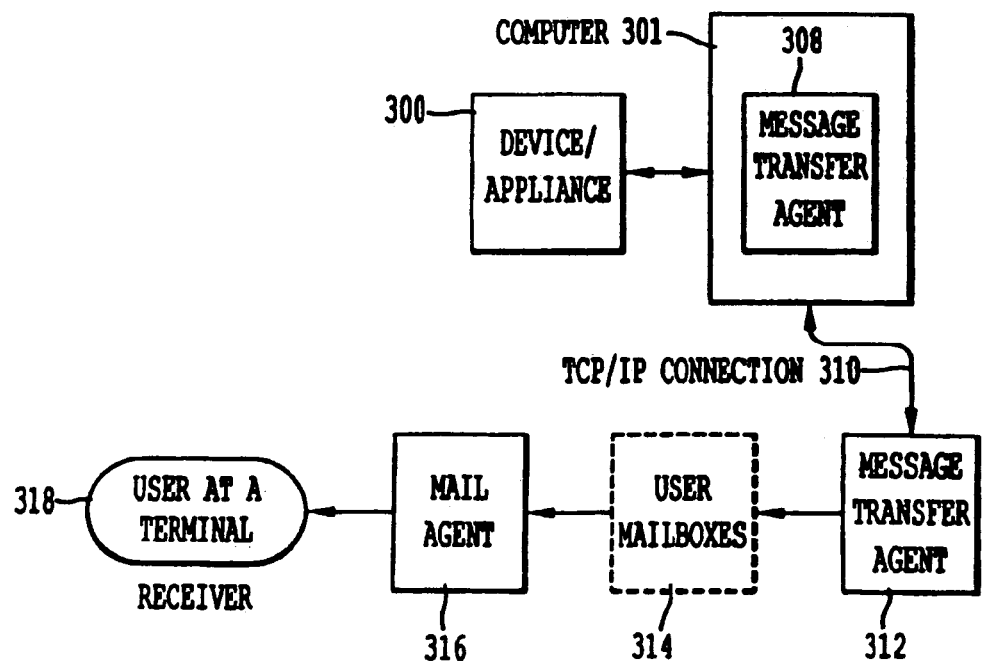
FIG. 6B illustrates an alternative way of communicating using electronic mail in which a computer that is connected to the application unit also serves as a Message Transfer Agent (MTA)

As an alternative to the general structure of FIG. 6A, a single computer that functions as the computer interface 302, the mail agent 304, the mail queue 306, and the message transfer agent 308 may be used. As illustrated in FIG. 6B, the device/appliance 300 is connected to a computer 301, which includes the message transfer agent 308.

Figure 6C:
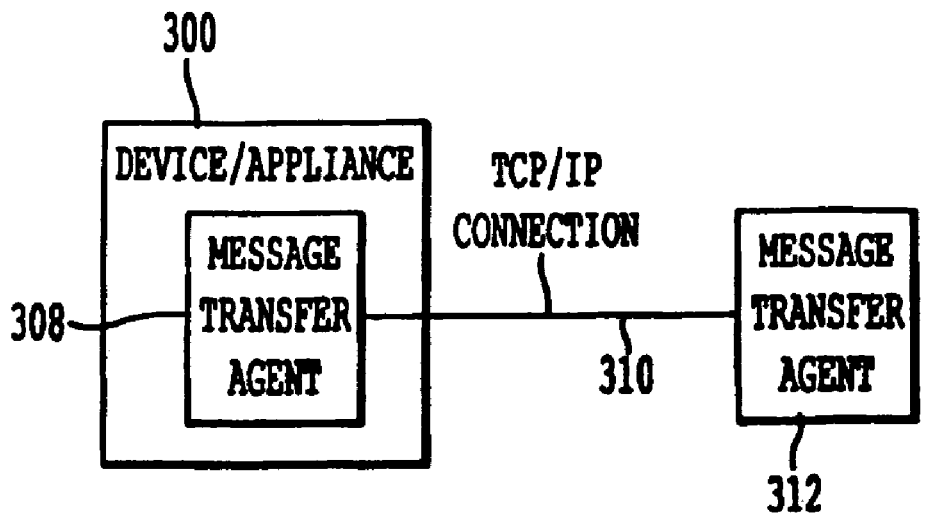
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 with an e-mail capability. One use of the embodiment of FIG. 6C includes using a facsimile machine with an e-mail capability (e.g., as defined in RFC 2305 (a simple mode of facsimile using Internet mail)) as the device/appliance 300. Many recent printers that can be connected to a network have the capability to send e-mails that report various state information.

Figure 6D:
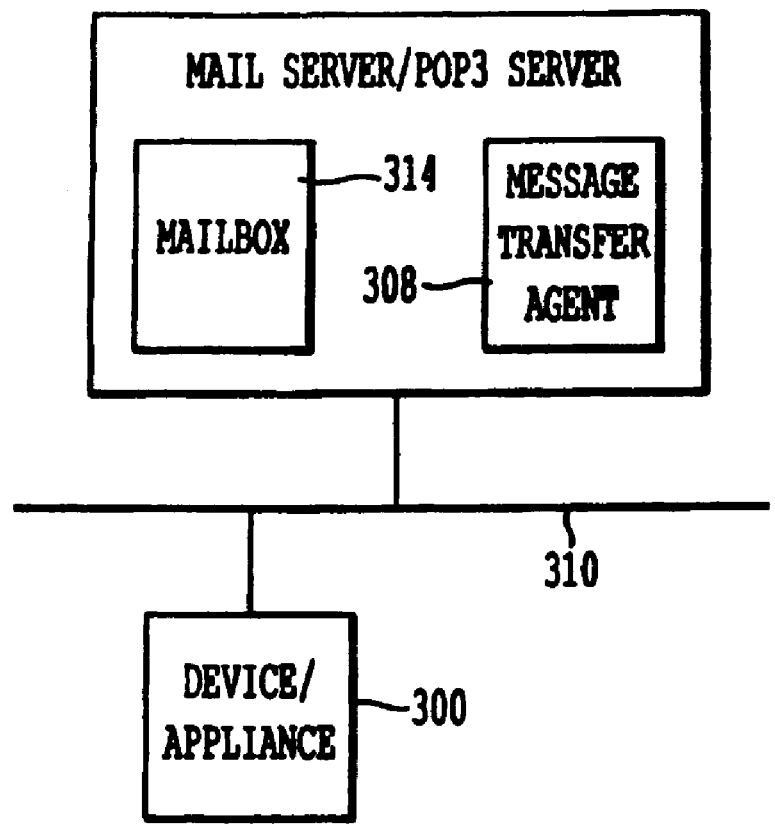
FIG. 6D illustrates an alternative way of communicating using electronic mail in which a mail server acts as a POP3 server to receive mail for an appliance/device and as an Simple Mail Transfer Protocol (SMTP) server to send mail for the appliance/device.

FIG. 6D illustrates a system in which a device/appliance 300 does not by itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
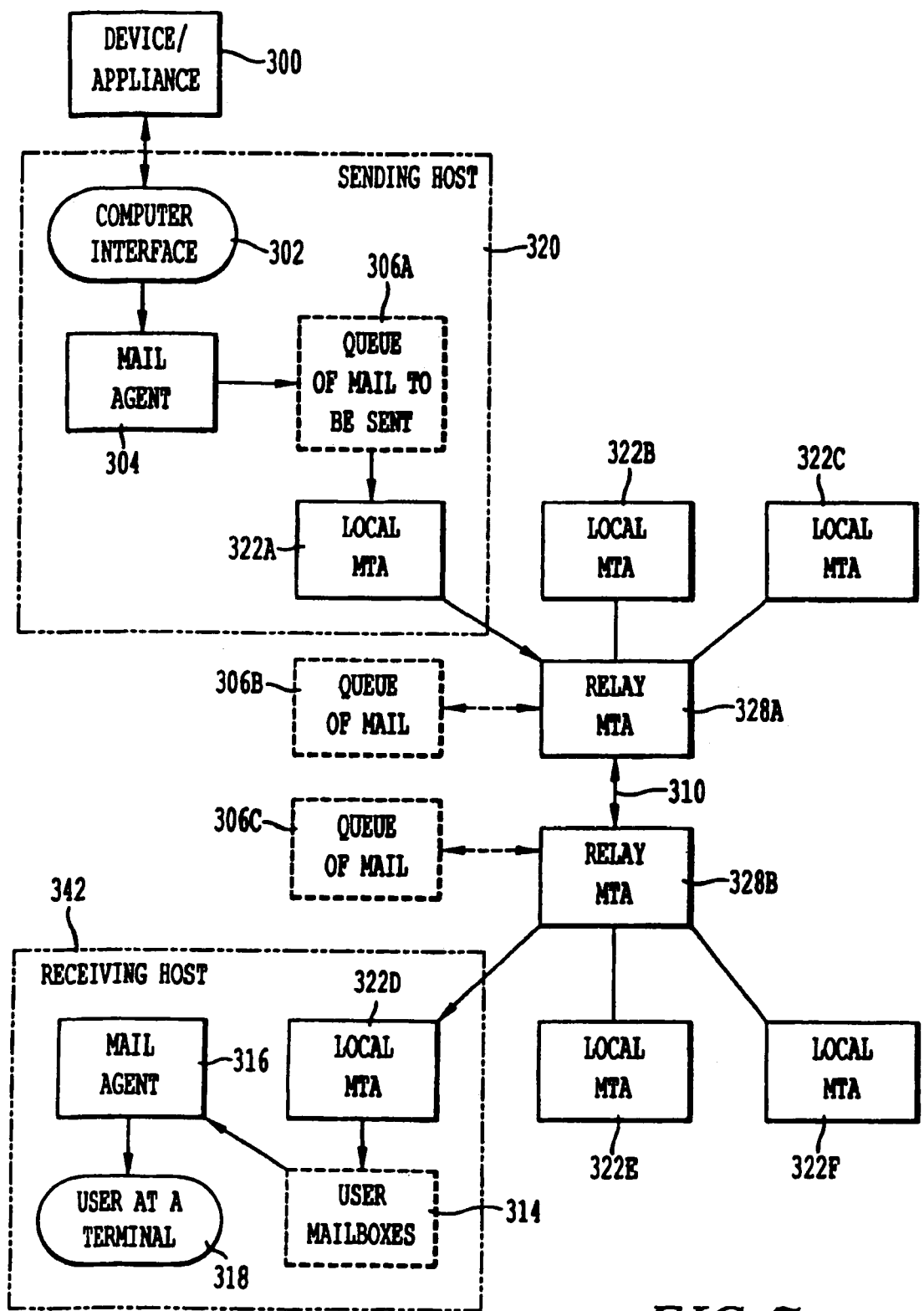
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/ appliance 300. Other local MTAs 322B, 322C, 322E, and 322F may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316, and finally forwarded to the user at a terminal 318. If desired, the mail may be directly forwarded to the terminal without user interaction.

Figure 8:
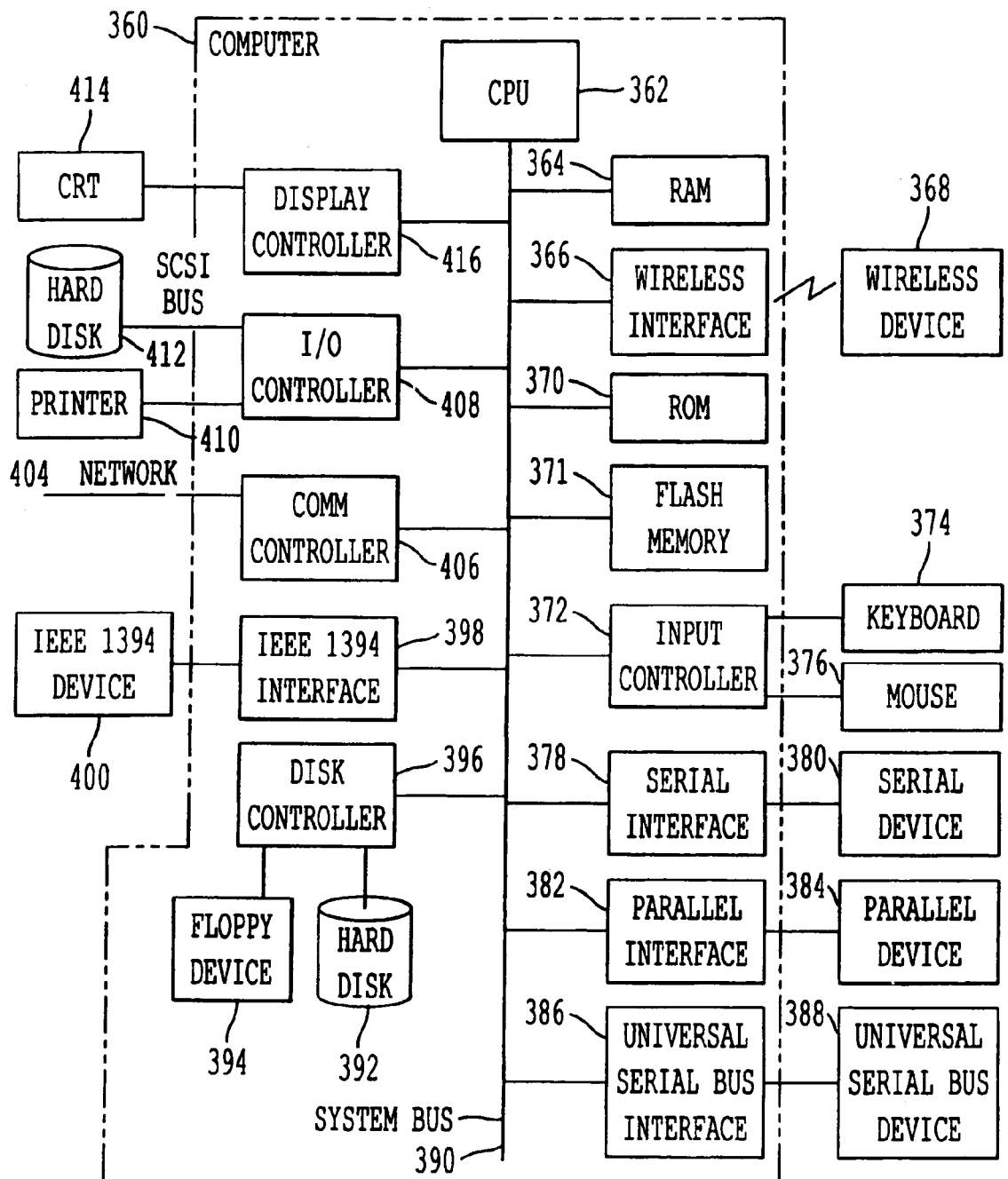
FIG. 8 illustrates an exemplary computer which may be connected to an appliance/device and used to communicate.

The various computers used in the present invention, including the computers 266 and 276 of FIG. 5, may be implemented as illustrated in FIG. 8. Further, any other computer used in this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 that communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

Computer 360 includes a ROM 370 and a flash memory 371, although any other type of non-volatile memory (e.g., Erasable Programmable ROM, or an EEPROM) may be used in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. A system bus 390 connects the various elements of the computer 360. A disk controller 396 may be connected to a floppy disk drive 394 and a hard disk drive 392. Also, the disk controller 396 may be connected to a CD/DVD drive. A communication controller 406 allows the computer 360 to communicate with other computers (e.g., by sending e-mail messages) over a network 404. An I/O (Input/Output) controller 408 is connected to a local printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
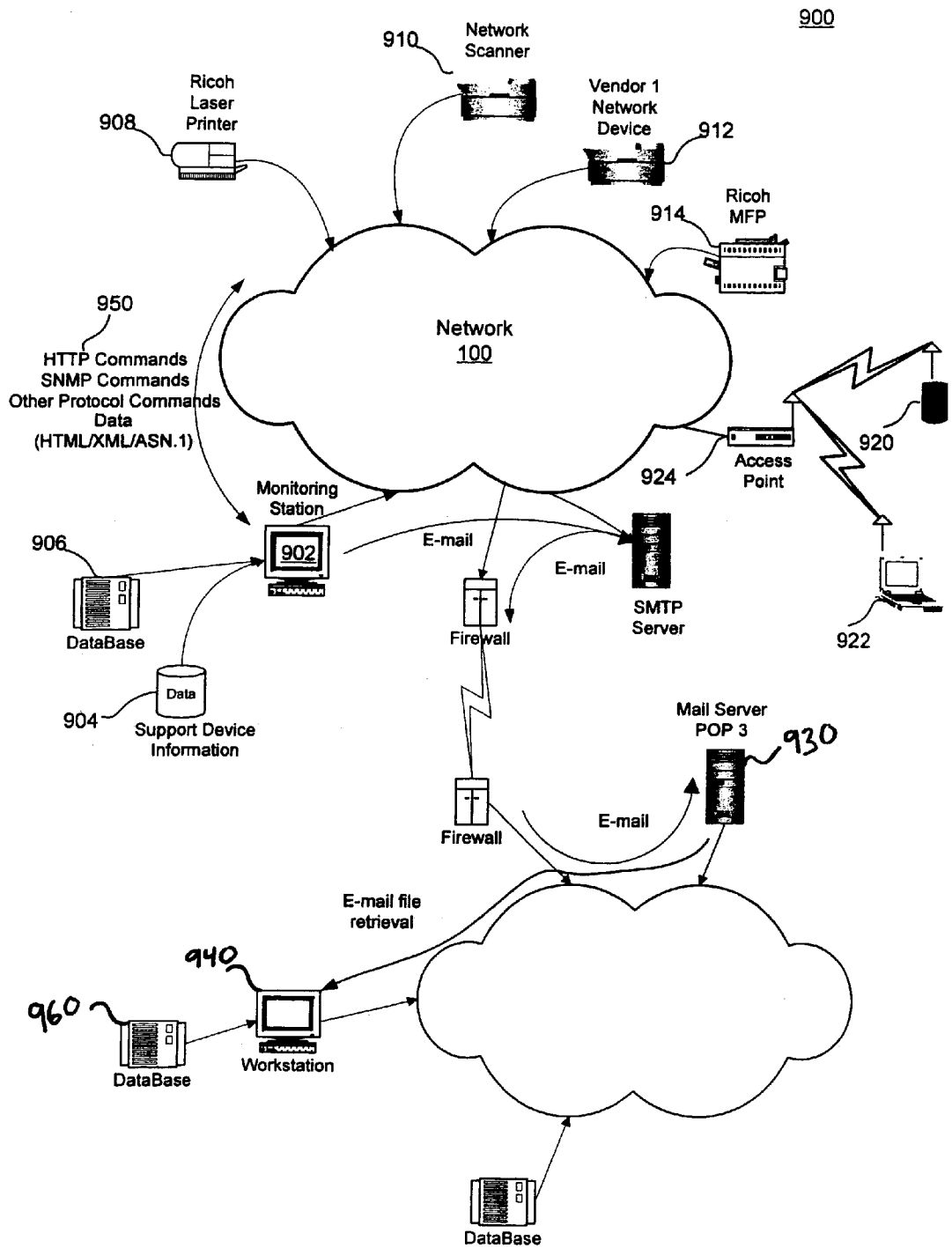
FIG. 9 is a schematic representation of the overall system in accordance with an exemplary embodiment of the present invention.

Referring now to FIG. 9, there is shown a schematic representation of the overall system 900 in accordance with an exemplary embodiment of the present invention. System 900 is shown to include a plurality of devices, for example, a laser printer 908, a scanner 910, a network device 912, and a multi-function machine 914, all connected to a network 100. The plurality of devices are generally referred to herein as "monitored devices." The system 900 also includes a workstation/monitoring system 902 (hereinafter referred to as a controller 902), connected to the network 100 for monitoring and controlling the monitored devices 908, 910, 912, and 914. Each of the monitored devices 908, 910, 912, and 914 are given a unique address. For example, an IP address assigned to a device serves as a unique address for the device. Thus, a user at controller 902 is able to access a respective device among the monitored devices 908-914 by accessing the unique IP address assigned to the respective monitored device. It will be appreciated that the present invention is not limited to using IP addresses to uniquely identify devices connected to a network.

The controller 902, upon accessing a device among the monitored devices 908-914, obtains various information through SNMP or/and. HTTP protocols. Such information includes detailed information about the operational status of the device including troubleshooting information. For example, controller 902 accesses and obtains the jam location of a particular device and sends a message to the person in charge of the device to clear the jam. The operational status/details of the laser printer 908 include such details as toner level, indication of paper jam, quantity of print paper in printer trays, etc.

It will be appreciated that the controller 902 may be either physically connected or wirelessly coupled to the network 100. For example, a personal digital assistant (PDA) 920 or a laptop computer 922, shown to be wirelessly coupled to the network 100, may also be used as a controller 902. An access point 924 acts as an interface to enable wireless communications between the network 100 and PDA 922 or laptop computer 922. Henceforth, the present invention will be described with the assumption that the controller 902 will be controlling and monitoring the status of the monitored devices connected to the network.

The network 100 facilitates communication between the controller 902 and the monitored devices 908-914 to enable monitoring and control of such monitored devices. The number of devices that are connected to the network is not limiting of the present invention. It will be appreciated that the network 100 may be a local area network (LAN) or a wide area network (WAN). Likewise, the monitored devices 908, 910, 912, and 914 are shown to be merely exemplary.

The controller 902 is communicatively coupled to a storage device 904 and a database 906. The storage device 904 includes a hard disk, optical disk, and/or an external disk drive. The database 906 is communicatively linked to the storage device 904, and includes a Relational Database Management System (RDBMS) for easy search and retrieval of data stored in the storage device 904. The storage device 904 preferably stores detailed information about each of the monitored devices 908-914. For example, detailed information, such as the make, model, and various functions and trouble-shooting details of the laser printer 908 are stored in the storage device 904. Also, deviation values about the operational status of the laser printer compared to predetermined reference values may also be stored in the storage device 904. Although the database 906 and the storage device 904 are described to be communicatively coupled to the controller 902, it will be appreciated that the controller 902 may be built with the storage device and the database installed therein. In such a case, the storage device 906 and the database 904 would be depicted as being internal to the controller 902.

The controller 902 is installed with software in order to facilitate monitoring and control of the plurality, of devices 908-914. Simple Network Management Protocol (SNMP), File Transfer Protocol (FTP) and Hyper Text Transfer Protocol (HTTP) are used by the controller 902 for monitoring the plurality of devices 908-914 and the data received from the plurality of devices 908-914 is presented in the form of ASN.1 Binary format or HTML or XML formats, as shown in 950.

Although FIG. 9 illustrates only the imaging devices, the network for communicating information between the monitoring device and the plurality of monitored devices may include the home network where the appliances and meters are connected to the network. It will be appreciated that data collected by the controller/workstation 902 can be sent through e-mail, FTP, or any other communication protocol means to a remote device for further processing. Though the monitoring station 902, PDA 920, or the laptop 922 can be the controller that collects the data and stores the data or sends the data through a communication protocol, it will be appreciated that the controller can be any of the devices connected to the network. Any of the network devices (e.g. printers) can contain the monitoring system capable of monitoring the status of other devices in the network, storing the collected data and/or sending the collected data through any other communication protocol means (e.g., e-mail, FTP). The Xerox DocuPrint 4025 and HP LaserJet 9000 are both capable of sending e-mail.

The monitoring station 902 can send the collected information to a remote location by e-mail via SMTP or other protocol. As shown in FIG. 9, the monitoring station 902 sends the information in an e-mail via SMTP server 926 to a remote location or remote network. The remote location has a POP3 server 930 to receive the email. A workstation 940 communicates with the POP3 server 930 to retrieve the email containing the status information. The workstation 940 may store the status information in a database 960. Email allows the information to be easily transmitted to a remote location. The information may be in the email message or in an attachment. The information may be encoded to provide secure transmission of the data. Other protocols such as FTP, HTTP, or web service can be used to transmit the information to a remote location.

Monitoring System Architecture

Figure 10:
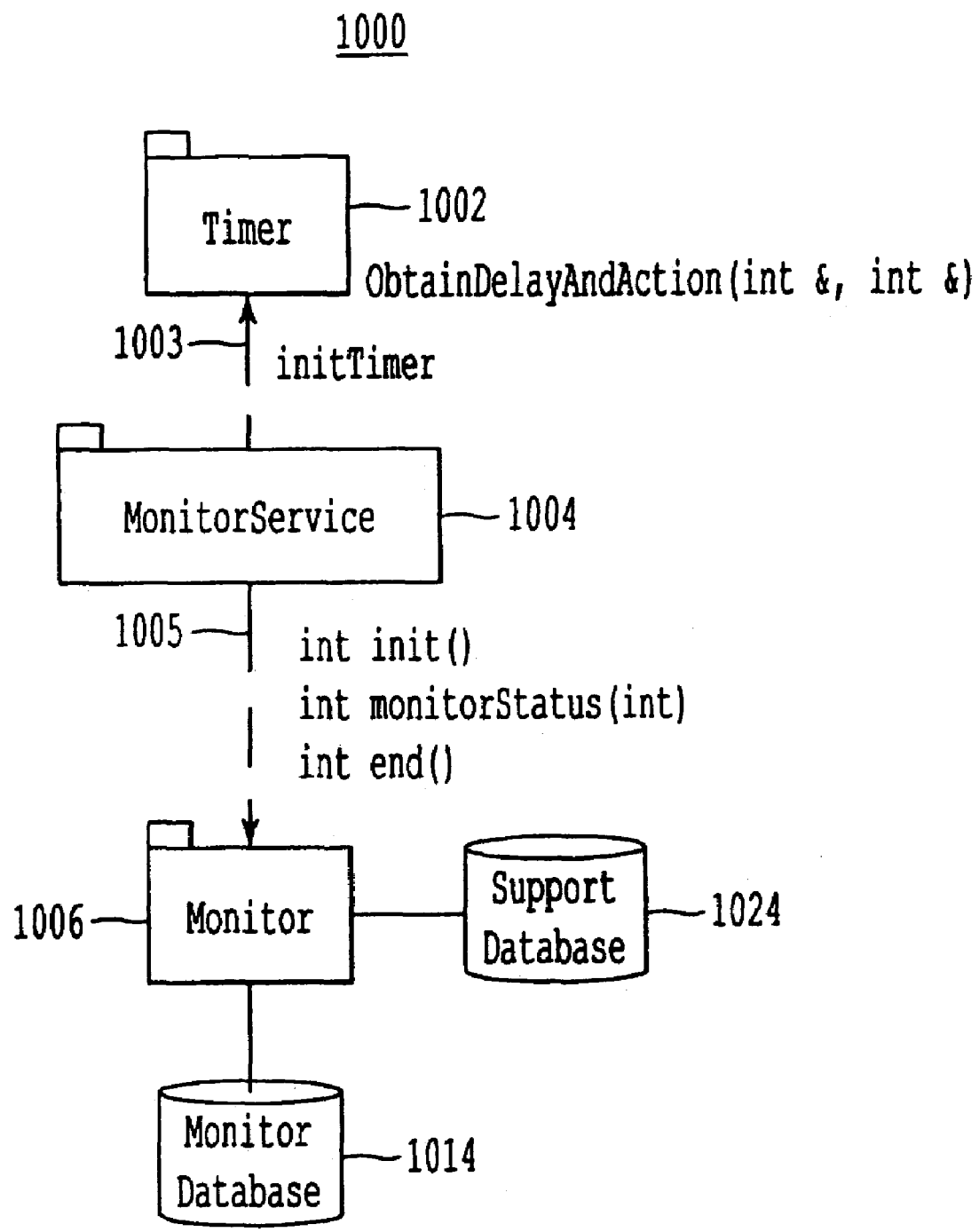
FIG. 10 illustrates modules used in the monitoring of the data and their interface functions in accordance with an exemplary embodiment of the present invention.

FIG. 10 illustrates a monitoring system 1000 (and associated interface functions) used in the monitoring of data associated with remote devices according to an exemplary embodiment of the present invention. The monitoring system 1000 includes the software module MonitorService 1004, which is a computer resident program such as Service in NT or Windows 2000, and Daemon in Unix. In a preferred embodiment, the monitoring system is implemented using an objected-oriented software environment. Also included in the monitoring system 1000 are a Timer module 1002 and Monitor module 1006. Timer module 1002 and Monitor module 1006 are library functions to be called by the MonitorService module 1004. For example, MonitorService 1004 initializes the Timer module 1002 by calling the InitTimer 1003 function and obtains delay and action parameters by calling obtainDelayAndAction (int &, int &) function. The init( ) function is also called by the MonitorService module 1004 to initialize various modules in the Monitor module 1006, as illustrated later. The init( ) function can be used to obtain the IP address and parameter value assigned to a monitored device through an external source containing IP addresses, parameter names and values collected through known methods. The Monitor module 1006 is communicatively coupled to a support database 1024 and to a monitor database 1014, which are described in more detail below.

Once the IP address of a monitored device is obtained, the IP address is used by the monitoring system to contact the monitored device to obtain information such as, manufacturer (vendor) and model information. Some of the functions executed by the monitoring system 1000 include:

void initTimer(void)

This function initializes the Timer. In particular, this function triggers the Timer object to get the timing information from the registry.

void obtainDelayAndAction(int & out_nDelay, int & out_nAction)

This function returns the delay time in seconds for the Sleep function (need to multiply 1000) and the action indicator. The action indicator is defined as follows: 0=event checking; 1=sending the monitored data; and 2=monitoring and storing the data into the local database.

int init(void)

This function initializes the Monitor. In addition, it creates the devices to be monitored. The return int is the error code in which zero is defined as no error.

int monitorStatus(int in_nAction)

This function monitors the preset information. The return int is the error code in which zero is defined as no error.

int end(void)

This function cleans up the Monitor before closing the objects. The return int is the error code in which zero is defined as no error.

Monitor Module

Figure 11:
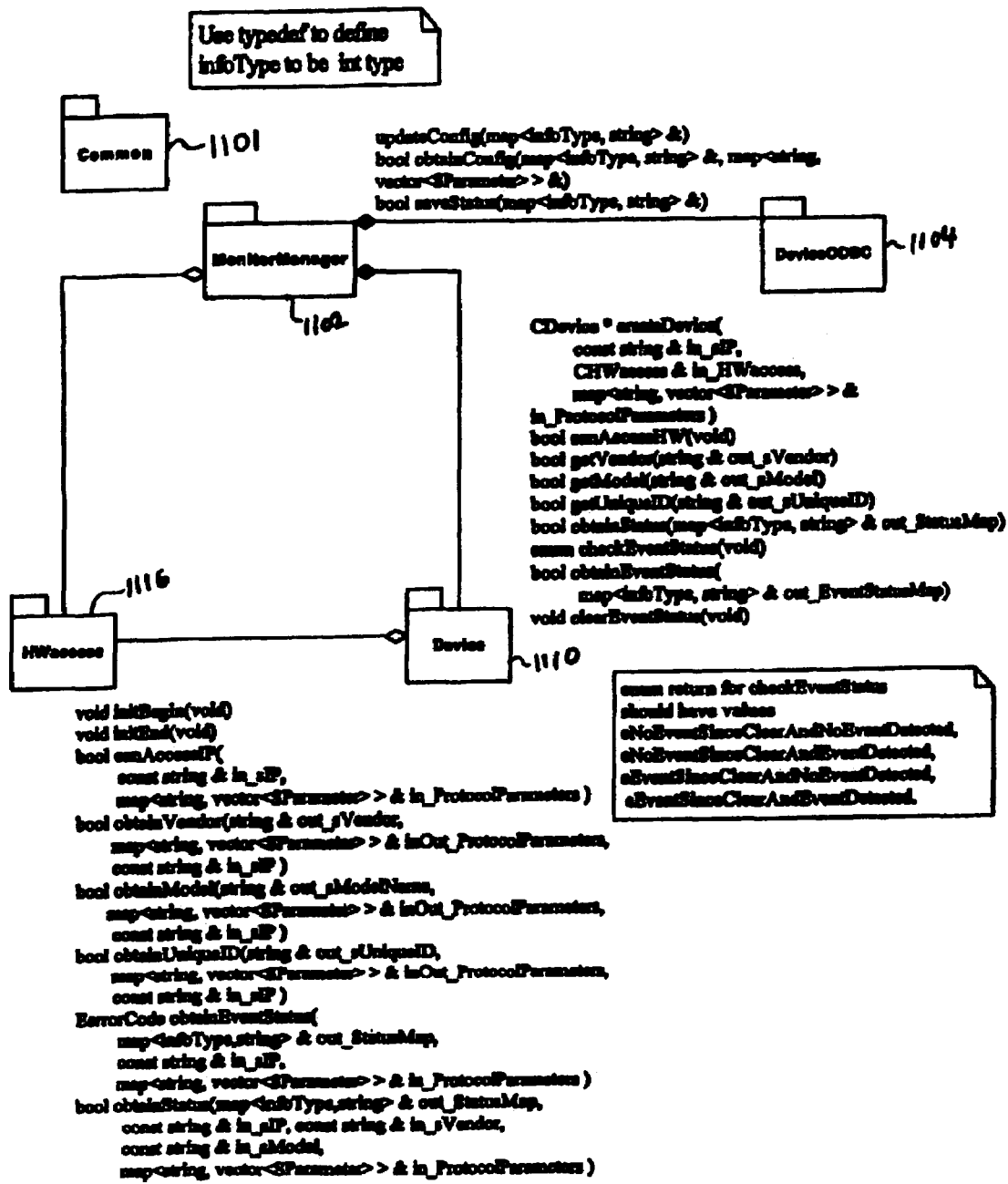
FIG. 11 shows details within the Monitor module and their calling functions between the sub-modules.

FIG. 11 shows the structural details of the Monitor module 1006, including the various software sub-modules, and the calling functions between the sub-modules of the Monitor module 1006. The Monitor module 1006 includes a Common module 1101 that contains classes used by many modules, a MonitorManager module 1102 that manages the other sub-modules (including the DeviceODBC module 1104, the Device module 1110, and the HWaccess module 1116) to complete the tasks defined by interface functions as illustrated in FIG. 10. Specifically, the DeviceODBC module 1104 is accessed in order to access external device information through the standard interface. The HWaccess module 1116 obtains vendor, model, unique ID, and status information from the monitored devices using a selected communication protocol from among a plurality of communication protocols (e.g., HTTP, SNMP, and FTP). Each of the Monitor software modules will be described in more detail below.

The following is a partial listing and description of the interfaces among the Monitor modules discussed above. For example, some modules may need to have "init" functions or additional functions in order to obtain the information in convenient formats.

void updateConfig(std::map<infoType, std::string>&)

Before this function is called, the calling function is preferred not to replace the vendor and model entries if obtain functions return a null string. This function updates the device information database of the current record in the Device-ODBC 1104. This function is most efficient when the Obtain-Config below is called initially. First, this function checks if the IP address is the same at the DeviceODBC 1104. If the IP address fields are not the same, the record with the correct IP address is obtained from the database. Then, the other fields are copied and the record is updated.

bool obtainConfig(std::map<infoType, std::string>&, std::map<std::string, std::vector<SParameter>>&)

This function obtains the map from DeviceODBC 1104 for the device information in the given format and the map of protocols and associated parameters. The function returns true if there is data returned, false if there is no more data.

bool saveStatus(std::map<infoType, std::string>&)

This function saves the status information into the DeviceODBC 1104. The function returns true when saving is successful, false otherwise.

```
CDevice * createDevice(const std::string & in_sIP, CHWaccess &
  in_HWaccess, std::map<std::string, std::vector<SParameter>> &
  in_ProtocolParameters)
```

This function creates the device based upon in_sIP and in_ProtocolParameter. The created device is connected to the hardware through CHWaccess. If the device can not be created, the function returns 0. Therefore, the calling object should check if the return object pointer is 0 or not.

bool canAccessHW(void)

This function returns true when the hardware can be accessed through the network, false otherwise.

bool getVendor(std::string & out_sVendor)

This function returns the vendor name. If the device is not supported by the system, but it can be accessed through one of the protocols, the string shall contain "GENERIC." If the error is detected in the process, the function returns false with null string. Otherwise, the function returns true.

bool getModel(std::string & out_sModel)

This function gets the model of the device. If the model is obtained, the function returns true. If the error is detected in the process, the function returns false with null string.

bool getUniqueID(std::string & out_sUniqueID)

This function returns the unique ID of the device. If the Unique ID is obtained, the function returns true. If the error is detected in the process, the function returns false with null string.

bool obtainStatus(map<infoType, std::string>& out_StatusMap)

This function returns the status map. The function returns true when the status is returned, false when status could not be obtained. Note that this function returns the different maps from the HWaccess and Device modules. In the Device module, event status information is added to the map returned from HWaccess and is cleared.

enum checkEventStatus(void)

This function triggers to obtain the event of the network device. The enum type and values should be defined in the classes. The enum values should include values eNoEventSinceClearAndNoEventDetected, eNoEventSinceClearAndEventDetected, eEventSinceClearAndNoEventDetected, eEventSinceClearAndEventDetected.

bool obtainEventStatus(std::map<infoType, std:: string>& out_EventStatusMap)

This function obtains event status information. The function returns true when the status is returned, false when status could not be obtained.

void clearEventStatus(void)

This function clears the event status accumulated since the last obtainStatus function call or clearEventStatus.

void initBegin(void)

This function starts the initialization process through HWaccess, in particular, to create the software device objects.

void initEnd(void)

This function ends the initialization process through HWaccess signifying that the device object creation is finished.

bool canAccessIP(const std::string & in_sIP, std:: map<std::string, std::vector<SParameter>>& in_ProtocolParameters)

This function returns true when the device can be accessed at the IP address, false otherwise.

bool obtainVendor(std::string & out_sVendor, std:: map<std::string, std::vector<SParameter>>& inOut_ProtocolParameters, const std::string & in_sIP) p This function obtains the Vendor. The function returns true if the operation is successful, false with the empty string otherwise. During this function call, the protocols are examined and if a particular protocol can not be used for status monitoring, the protocol shall be deleted from the inOut_ProtocolParameters.

```
bool obtainModel(std::string & out_sModelName, std::map<std::string,
  std::vector<SParameter>> & inOut_ProtocolParameters,
  const std::string & in_sIP)
```

This function obtains the Model name. The function returns true if the operation is successful, false with the empty string otherwise. During this function call, the protocols are examined, and if a particular protocol can not be used for status monitoring, the protocol shall be deleted from the inOut_ProtocolParameters.

bool obtainUniqueID(std::string & out_sUniqueID, std:: map<std::string, std::vector<SParameter>>& inOut_ProtocolParameters, const std::string & in_sIP)

This function obtains the Unique ID. The function returns true if the operation is successful, false with the empty string otherwise. During this function call, the protocols are examined and if a particular protocol can not be used for status monitoring, the protocol shall be deleted from the inOut_ProtocolParameters.

```
EerrorCode obtainEventStatus(std::map<infoType, std::string> &
  out_StatusMap, const std::string & in_sIP, std::map<std::string,
  std::vector<SParameter>> & in_ProtocolParameters)
```

This function obtains the event status. The EerrorCode is defined below.

```
bool obtainStatus(std::map<infoType, std::string> &
  out_StatusMap, const std::string & in_sIP, const std::string &
  in_sVendor, const std::string & in_sModel, std::map<std::string,
  std::vector<SParameter>> & in_ProtocolParameters)
```

This function obtains the status of the device. The function returns true if the operation is successful, false with the empty map otherwise.

Figure 12:
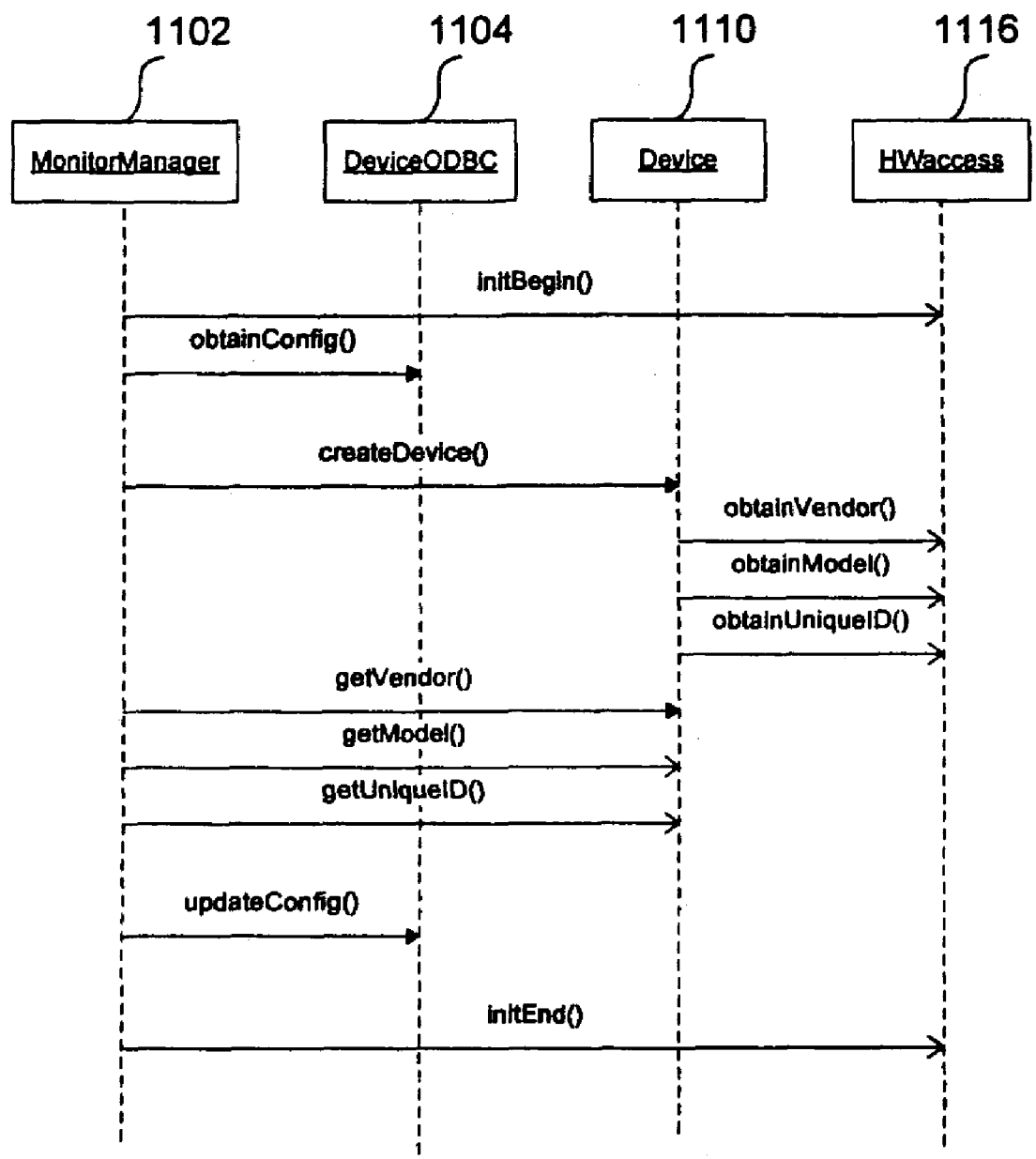
FIG. 12 shows the sequence of the init function of the Monitor module illustrated in FIG. 10.

FIG. 12 shows the sequence of the init( ) function to describe the calling sequence of Monitor module 1006 as illustrated in FIG. 10. The MonitorManager 1102 initializes the HWaccess module 1116 to start the initialization function. Subsequently, the MonitorManager 1102 obtains information about a monitored device and uses an IP address assigned to the monitored device to communicate with the monitored device. The MonitorManager 1102 accesses DeviceODBC 1104 to obtain configuration information of the monitored device. The configuration information returned to the MonitorManager 1102 includes, for example, an IP address of the monitored device, parameter names and associated values for each protocol, and vendor/manufacturer and model information of the monitored device. Once the IP address is obtained, the MonitorManager 1102 sets the IP address, parameter names and associated values for each protocol, to create a software object for the device in the Device Module 1110. When the device software object is successfully created, the HWaccess module 1116 is used to obtain Vendor, Model, and Unique ID from the monitored device to be stored in the created device software object.

Once the vendor, model information, and unique ID are obtained from the device software object, the MonitorManager 1102 updates the database (for example, DeviceODBC 1104) with information received from the monitored device. Although FIG. 12 shows one device, the steps from obtaining config to updateConfig are repeated to cover all the devices specified in the external source. In addition, each protocol specified in FIGS. 18, 19, 20, and 22 are initialized. The database tables corresponding to ODBC in FIGS. 17, 18, 19, 20, and 21 are accessed and necessary information for accessed devices are transferred from the external storage to the internal data structure so that the status information collection from the accessed devices is faster.

Figure 13:
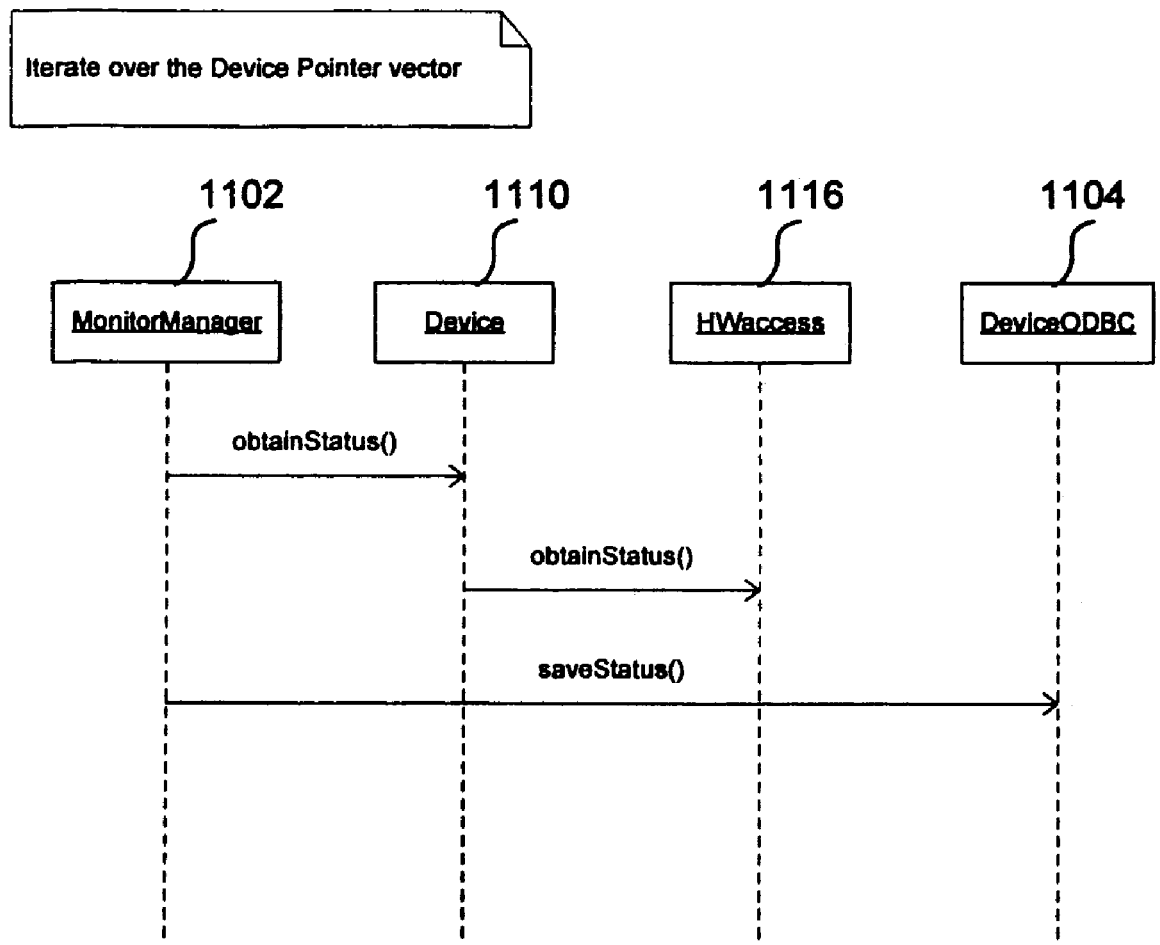
FIG. 13 shows an exemplary sequence of the status monitor function to determine the status of a monitored device by the MonitorManager, as shown in FIG. 11.

FIG. 13 shows the sequence of the status monitor function to determine the status of a monitored device by the MonitorManager module 1102, as illustrated in FIG. 11. When the obtainStatus function is issued from Device to HWaccess, the CHWaccess class in turn issues an obtainStatus function call to each protocol described in FIG. 22 through the abstract class, with different parameters, as described below. Each protocol module has already cached information necessary to extract the status information from the monitored devices, which have already been accessed once during the initialization time described in FIG. 12. Therefore, the status information can be quickly extracted from the monitored devices without accessing the external source during the status monitoring. This process is repeated over all the monitored devices stored in the vector as shown in FIG. 14.

Figure 14:
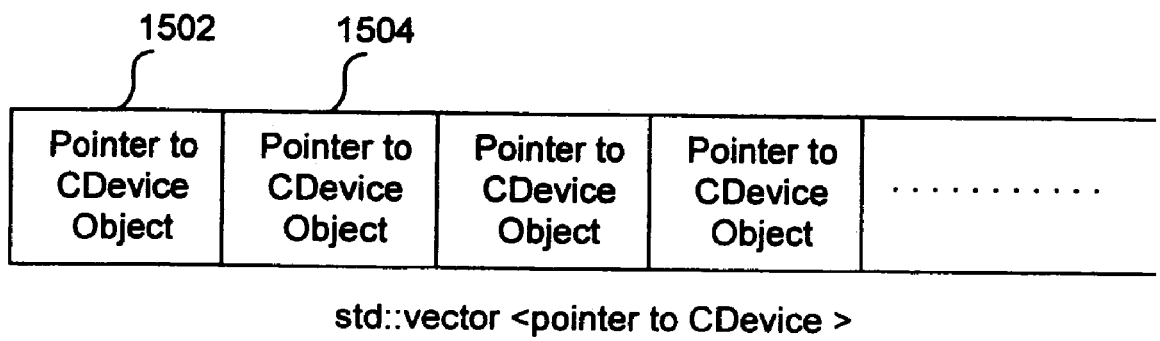
FIG. 14 shows a vector of the reference to the devices created by CDeviceFactory and used by the MonitorManager, as illustrated in FIG. 12.

Referring to FIG. 14, there is shown a vector 1500 having reference to the devices created within the Device Module 1110 of FIG. 11 and used by the MonitorManager 1102, as illustrated in FIGS. 12 and 13. MonitorManager 1102 stores device pointers, such as for example, Pointer to CDevice Object 1502, and Pointer to CDevice Object 1504 created within the Device Module 1110, in the vector. The vector sequence is iterated to obtain the status of a monitored device. Polling of monitored devices is performed over the device object by issuing an obtainStatus command. Once the status of each of the software objects is obtained, such status is updated through the DeviceODBC 1104. The status monitor sequence was described above at FIG. 13, and will not be repeated herein.

The DeviceInfo structure shown in Table I illustrates the information regarding one exemplary monitored device. The DeviceInfo structure includes the e-mail address of the contact person, in addition to the telephone number. Table 1 is an example of information, and not all the elements in the table are required. Also, any useful information related to a monitored device can be added in the database and the DeviceInfo structure.

TABLE 1

| Type | Name | Description |
|---|---|---|
| std::string | m_sVendor | A string representing the vendor of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEMailAddress | A string representing the e-mail address of the contact person. |

Monitor Database

Figure 17:
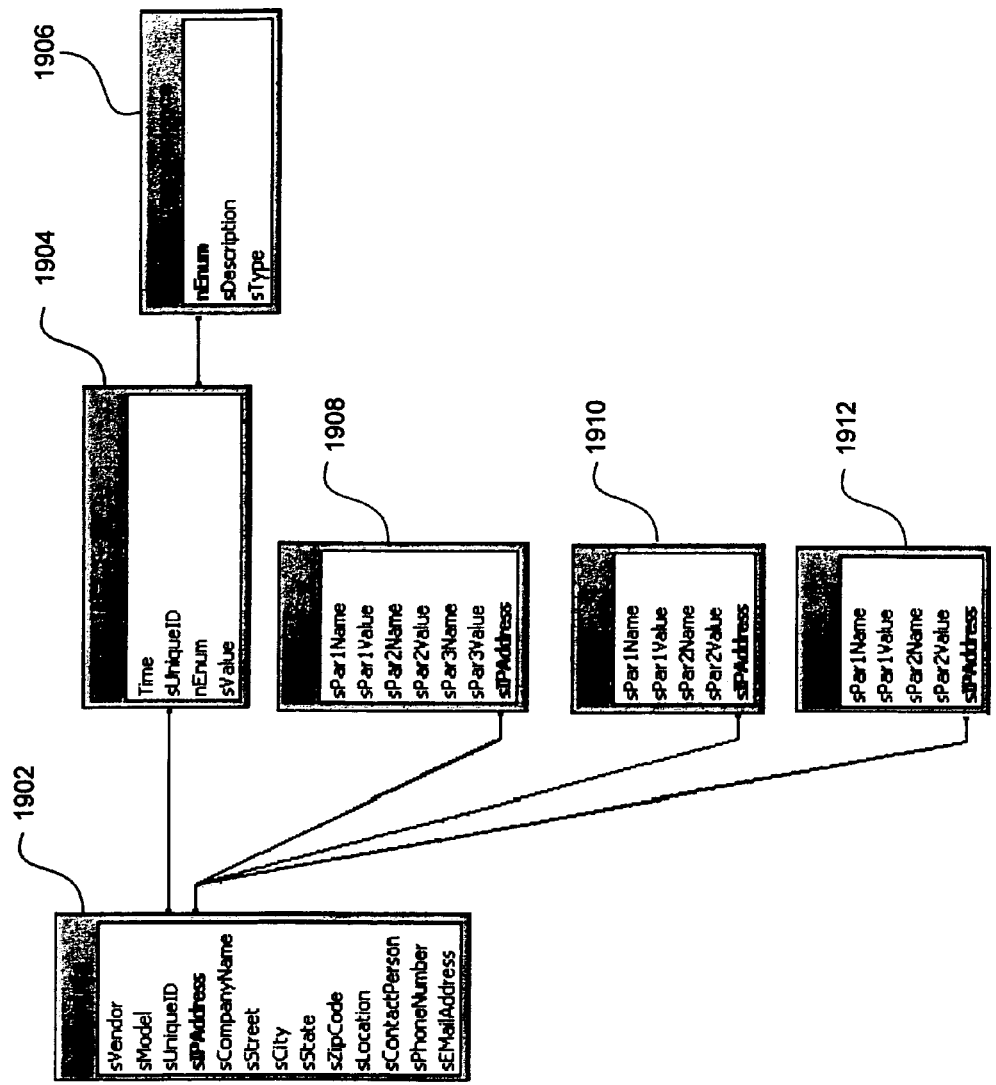
FIG. 17 illustrates the organization of the monitor database used in one embodiment of the present invention.

FIG. 17 illustrates the organization of the monitor database, which includes the device information for each monitored device (see also Table I). As shown in FIG. 17, a set of parameters, one set for each communication protocol (e.g., SNMP, HTTP, and FTP), is associated with the device information DeviceInfo 1902 for each monitored device. Moreover, each set of parameters for a particular protocol (e.g., SNMP 1908, HTTP 1910, and FTP 1912) is organized as a list of parameter name and value pairs, e.g., sParlName and sParlValue. Note that the number of parameters for each protocol may be shorter or longer than the number shown in FIG. 17. For example, a username and password may be stored as FTP parameters, while a community name and a password may be stored as SNMP parameters for a given monitored device. As shown in FIG. 17, the monitor database also includes information related to the DeviceHistory 1904, which contains the status information of the monitored devices, and the EnumCorrespondence 1906.

Figure 15:
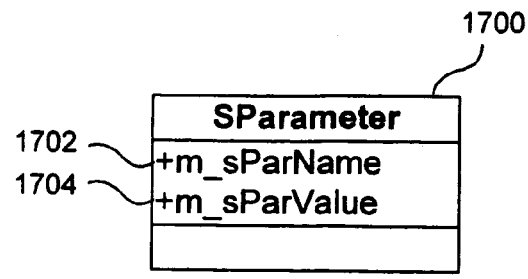
FIG. 15 illustrates the SParameter data structure used to store parameter values necessary to access monitored devices according to one embodiment of the present invention.

FIG. 15 illustrates the SParameter data structure 1700 used to pass the parameters used by the various communication protocols. SParameter includes two fields: m_sParName 1702 and m_sParValue 1704, which represent the name and value of the parameter, respectively.

Figure 16:
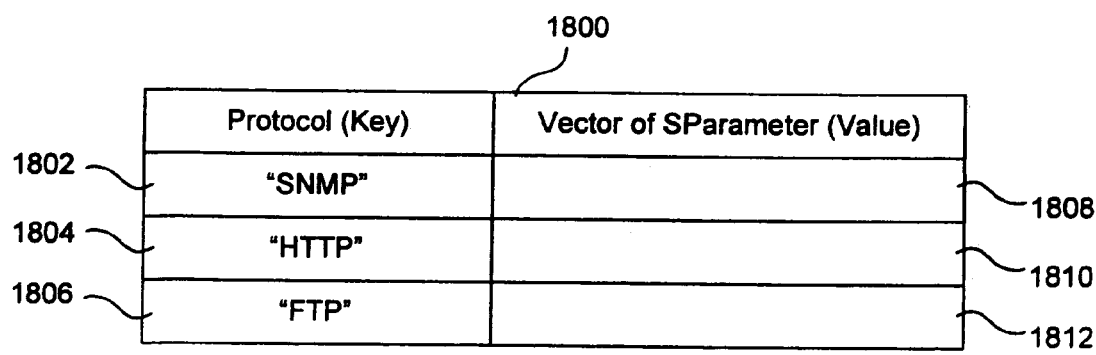
FIG. 16 illustrates a map structure used to store parameter values necessary to access monitored devices according to one embodiment of the present invention.

FIG. 16 illustrates the map structure 1800 used to pass a vector of parameters for each protocol obtained from the monitor database to a software object associated with each monitored device. The map structure 1800 associates each protocol/key field 1802, 1804, and 1806, with a corresponding vector of parameters 1808, 1810, and 1812, respectively, arranged according to the SParameter format shown in FIG. 15. For example, for the SNMP protocol 1802, the vector of parameters 1808 may include a list of parameter name, parameter value pairs that are used to access the monitored device with the SNMP protocol. For example, the SNMP parameter names stored in the vector 1808 might include "Community Name" and "Password", together with the corresponding parameter values. Note, however, that the organization of the map structure 1800 allows for any number of protocols and associated parameter vectors, and is not limited to the SNMP, HTTP, and FTP protocols shown in FIG. 16.

Support Database

Figure 18:
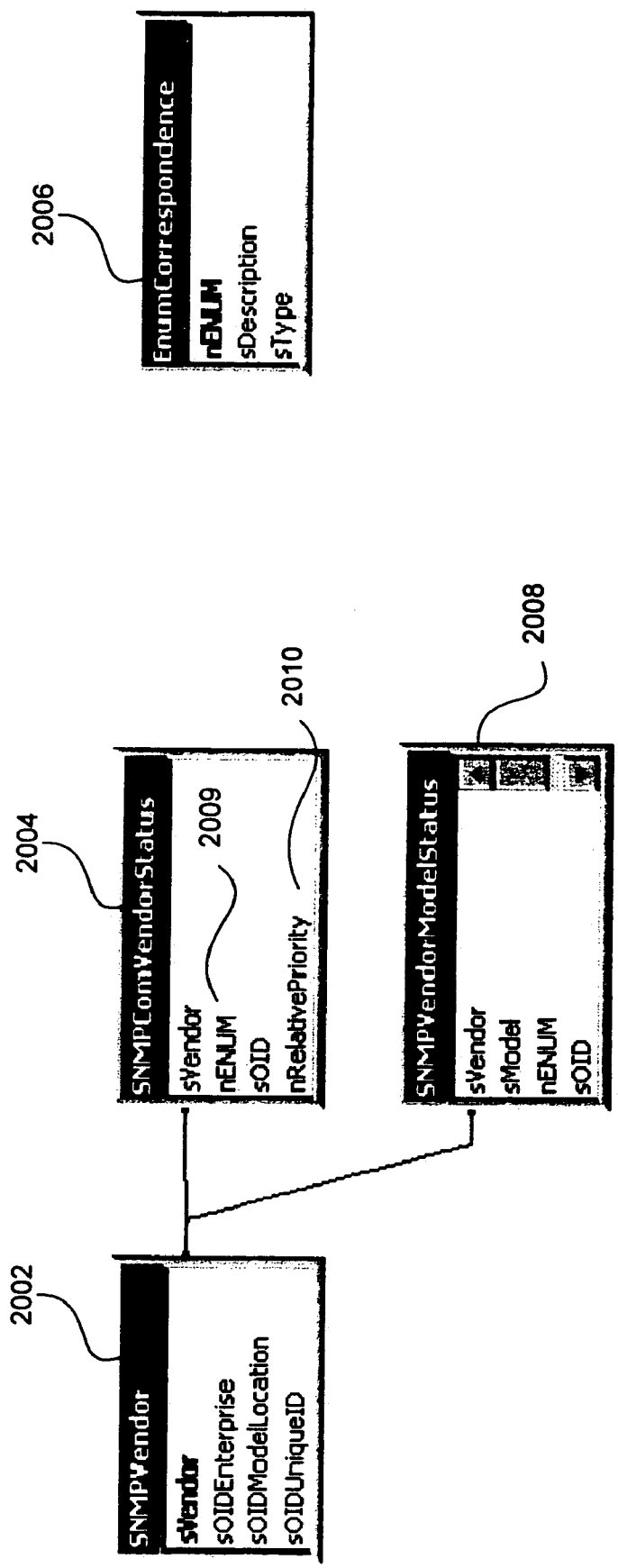
FIGS. 18 and 20 illustrate the organization of a support database arranged according to communication protocol according to one embodiment of the present invention.
Figure 19:
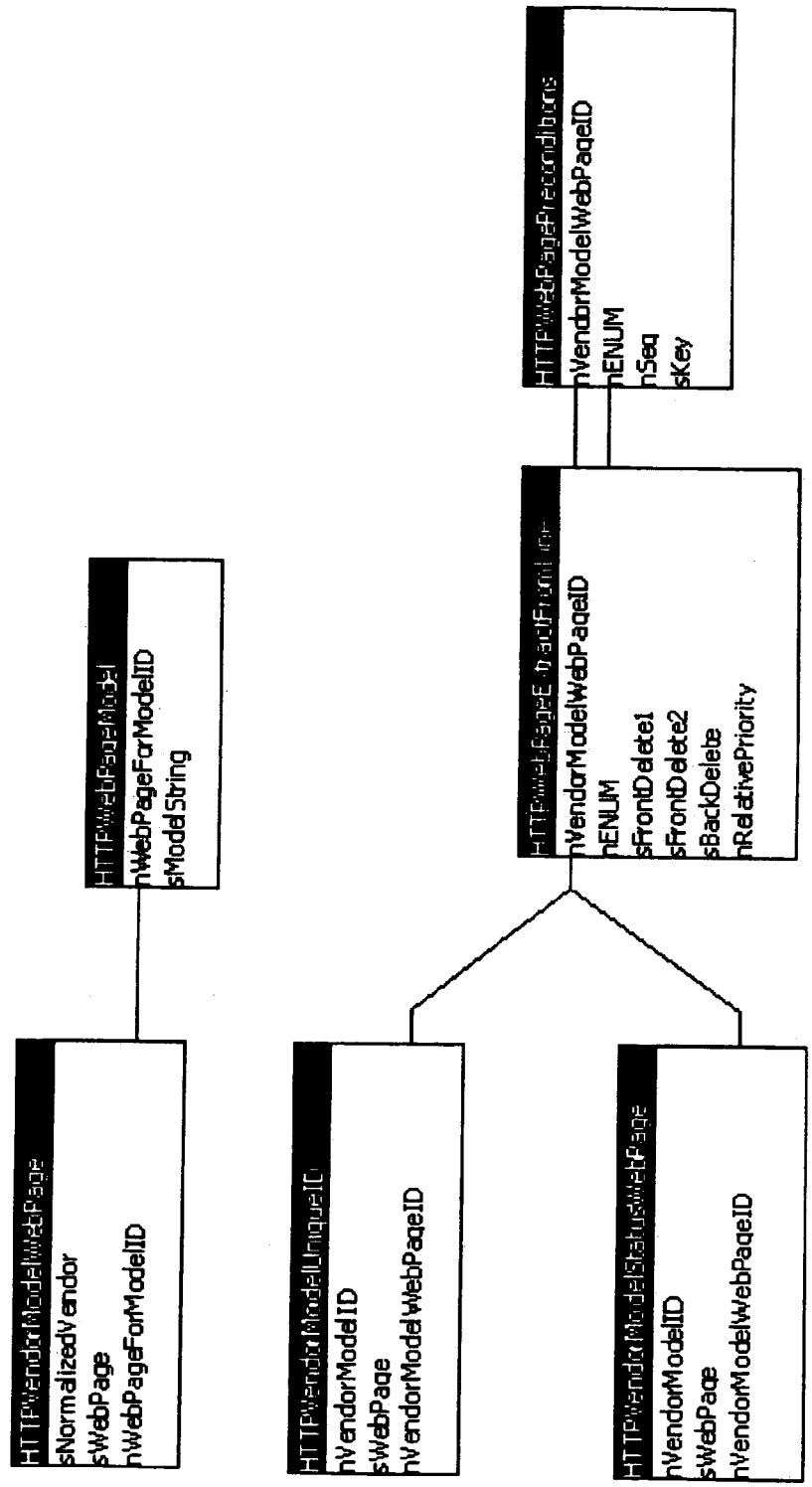
FIG. 19 is a diagram illustrating the organization of a support database for the HTTP protocol according to one embodiment of the present invention.
Figure 20:
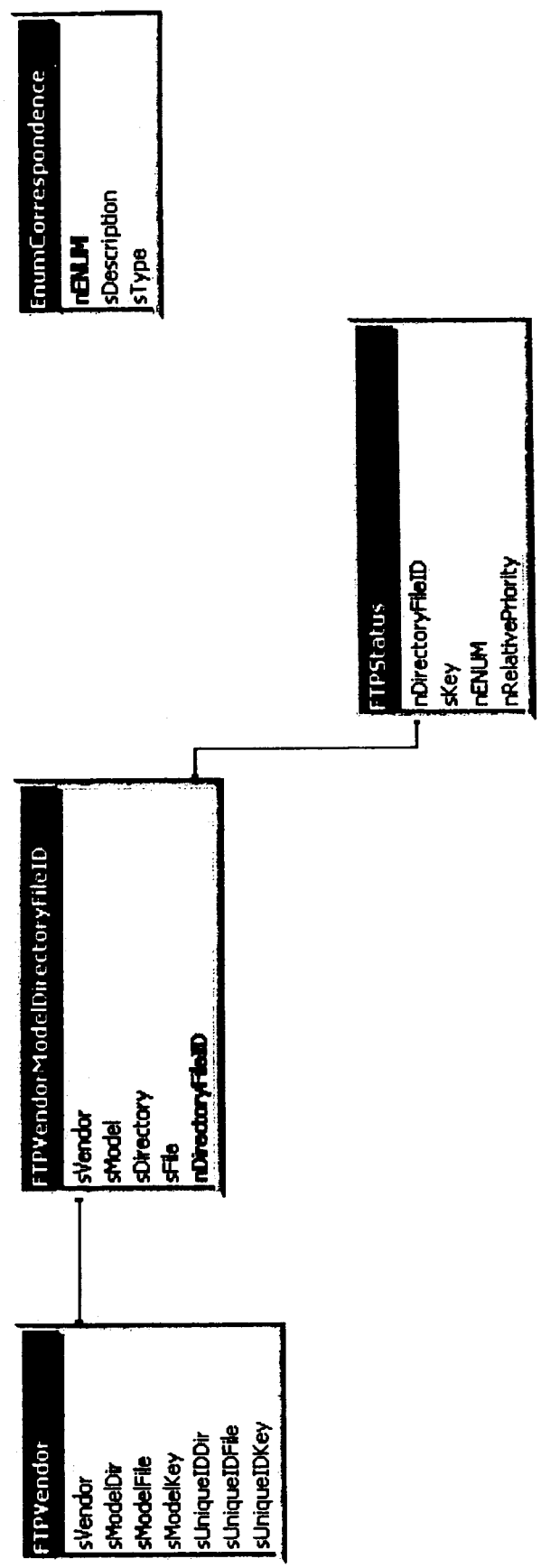

FIGS. 18-20 illustrate the organization of the support database 1024 shown in FIG. 10. The support database, which includes information necessary to extract status information from each monitored device, is organized by communication protocol. Moreover, the support database contains information for determining which protocols are supported by a given vendor and model. For example, FIG. 18, which illustrates the organization of the support database for SNMP-related support information used to extract information from a monitored device, includes SNMPVendor 2002, SNMPComVendorStatus 2004, EnumCorrespondence 2006, and SNMPVendorModelStatus 2008 data structures. A given data structure in the support database may include parameters that uniquely identify the type of status information to be extracted, along with parameters that control the extraction. For example, the SNMPComVendorStatus data structure 2004 include an nENUM field 2009, which identifies the type of information to be extracted (e.g., toner level), and an nRelativePriority field 2010, which indicates the weight or importance of the extracted information relative to other protocols. Thus, if the same information may be extracted from the monitored device using more than one protocol, the nRelativePriority value gives a relative indication of which protocol's extracted value should be used. For example, if HTTP is only able to extract information indicating whether the toner level is "high" or "low" while the SNMP protocol is able to extract the percentage level of toner remaining, the priority level for the toner level for SNMP would be higher than the corresponding value for HTTP. In addition, the support database may provide default priority values for an entire protocol. In one embodiment, the SNMP protocol is given a priority value of 10,000 in a system in which protocol values may range from 0 to 32,000.

FIGS. 19 and 20 illustrate the data structures included in the HTTP and FTP portions of the support database 1024 and includes data structures analogous to the data structures described above with regard to FIG. 18. The EnumCorrespondence data structure shown in FIGS. 18-20 is shared by the data structures for all of the protocols in the support database and is the same data structure shown in FIG. 17.

FIG. 19 shows the tables of the support database used by the HTTP protocol. The tables HTTPVendorModelWebPage and HTTPWebPageModel determine which vendor and model are supported by the HTTP protocol. The two tables also contain information used to extract the model name from the web page of the device. The table HTTPVendorModelUniqueID contains information about the web page of a device that contains the unique ID for a given vendor and model. The table HTTPVendorModelStatusWebPage contains information about the web pages of a device that contains status information for a given vendor and model. The tables HTTPWebPageExtractFromLine and HTTPWebPagePreconditions contain information used to locate and extract the unique ID or status information from a web page of a device.

FIG. 20 shows data structures containing support information used to extract information from FTP files of a monitored device.

Exemplary enum types used by the present invention is the infoType defined below. (The enum types are merely exemplary and therefore should not be construed as limiting the present invention.)

infoType (typedef int infoType)

This section describes the definition of the infoType (int). The value range 0 through 99 is assigned to the data type. The value range 100 to 499 is assigned to Device Information. The value range 500 to 1999 is assigned to the common parameters including standard MIB parameters. The range 2000 to 3999 is assigned to Ricoh-specific information. The range 4000 to 4999 is assigned to Xerox. The range 5000 to 5999 is assigned to Lexmark. The range 6000 to 6999 is assigned to HP. 7000 and higher values are assigned to Brother, Samsung, Kyocera Mita, Dell, and Konica-Minolta. The values are defined as follows:

infoType {eNotDefine=0, eDeviceInformation=1, eStatusInformation=2, eVendor=100, eModel, eUniqueID, eIPAddress, eCompanyName, eStreet, eCity, eState, eZipCode, eLocation, eContactPerson, ePhoneNumber, eEMailAddress, eDateTime=500, eHrDeviceErrors, eLowPaper, eNoPaper, eLowToner, eNoToner, eDoorOpen, eJammed, eOffline, eServiceRequested, ePrtGeneralConfigChanges=600, ePrtLifeCount, ePrtAlertDesc1, ePrtAlertDesc2, ePrtAlertDesc3, ePrtAlertDesc4, ePrtAlertDesc5, eBlack=700, eMagenta, eCyan, eYellow, eTonerCollector=800, eBlackDeveloper=810, eColorDeveloper, eFuser=820, eDrum=830, eTransfer=840, eMaintenanceKit=850, eOilKit=860, eStationInfo1=901, eStationInfo2, eStationInfo3, eStationInfo4, eStationInfo5, eRicohEngineCounterTotal=2000, eRicohEngineCounterPrinter, eRicohEngineCounterFax, eRicohEngineCounterCopier}.

EerrorCode

The following codes are merely exemplary, and more codes may be added to the existing set. The range 0-99 is reserved. The range 100-199 is for SMTP, 200-299 is for POP3, 300-399 is for Socket, and 400-499 is for HTTP, and 500-599 is for FTP. Other ranges not specified may be defined by a user, if needed.

enum EerrorCode(eNoError=0, eUnknownError=1, eSomeError, eCompleteFailure, eSomeDeviceCreationError=20, eCreateDeviceError, eNoDeviceCreated, eObtainConfigError, eSaveStatusError, eObtainUniqueIDError, eObtainStatusError, eStartSendError, eSomeDataSendError, eCompleteDataSendFailure, eEndSendError, eSendHeloCommandFailed=100, eSendMailCommandFailed, eSendRcptCommandFailed, eSendDataCommandFailed, eSendDataFailed, eSendQuitCommandFailed, eSendUserCommandFailed=200, eSendPassCommandFailed, eSendStatCommandFailed, eSendRetrCommandFailed, eSendDeleCommandFailed, eSendQuitPop3CommandFailed, eCreateSocketFailed=300, eConnectSocketFailed, eBadRequest=400, eUnauthorized, ePaymentRequired, eForbidden, eNotFound, eMethodNotAllowed, eNotAcceptable, eProxyAuthenticationRequired, eRequestTimeOut, eConflict, eGone, eLengthRequired, ePreconditionFailed, eRequestEntityTooLarge, eRequestURITooLarge, eUnsupportedMediaType, eRequestedRangeNotSatisfiable, eExpectationFailed, eInternalServerError=450, eNotImplemented, eBadGateway, eServiceUnavailable, eGatewayTimeOut, eHTTPVersionNotSupported, eMultipleChoices=480, eMovedPermanently, eFound, eSeeOther, eNotModified, eUseProxy, eTemporaryRedirect).

Figure 21:
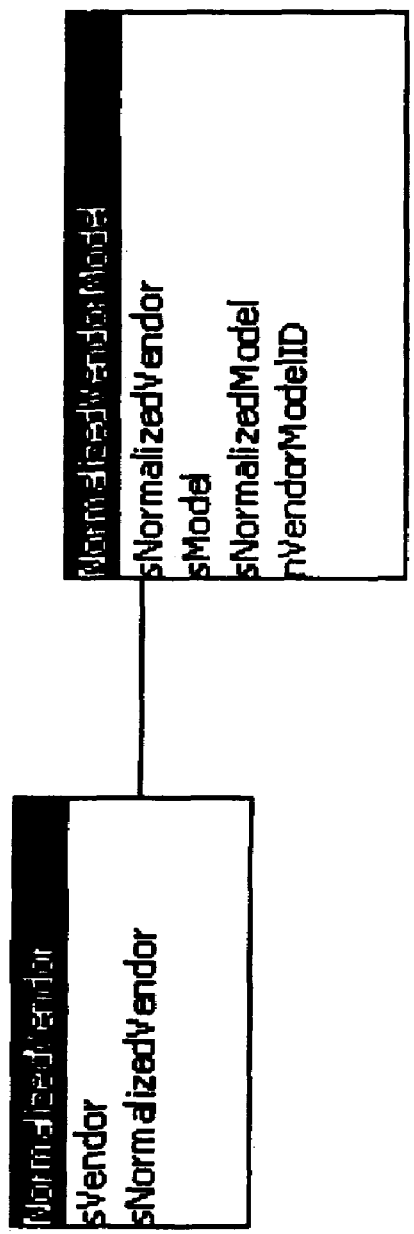
FIG. 21 is a diagram illustrating the organization of a support database for normalizing vendors and models according to one embodiment of the present invention.

FIG. 21, shows the tables of the support database used to determine the normalized vendor and model that the system supports. The table NormalizedVendor contains the mapping of all vendor names to a common vendor name that all protocols will use. The table NormalizedVendorModel contains the mapping of all model names to a common model name that all protocols will use and the mapping of the normalized vendor and model to an ID.

Abstract Classes in the HWaccess Module

Figure 22:
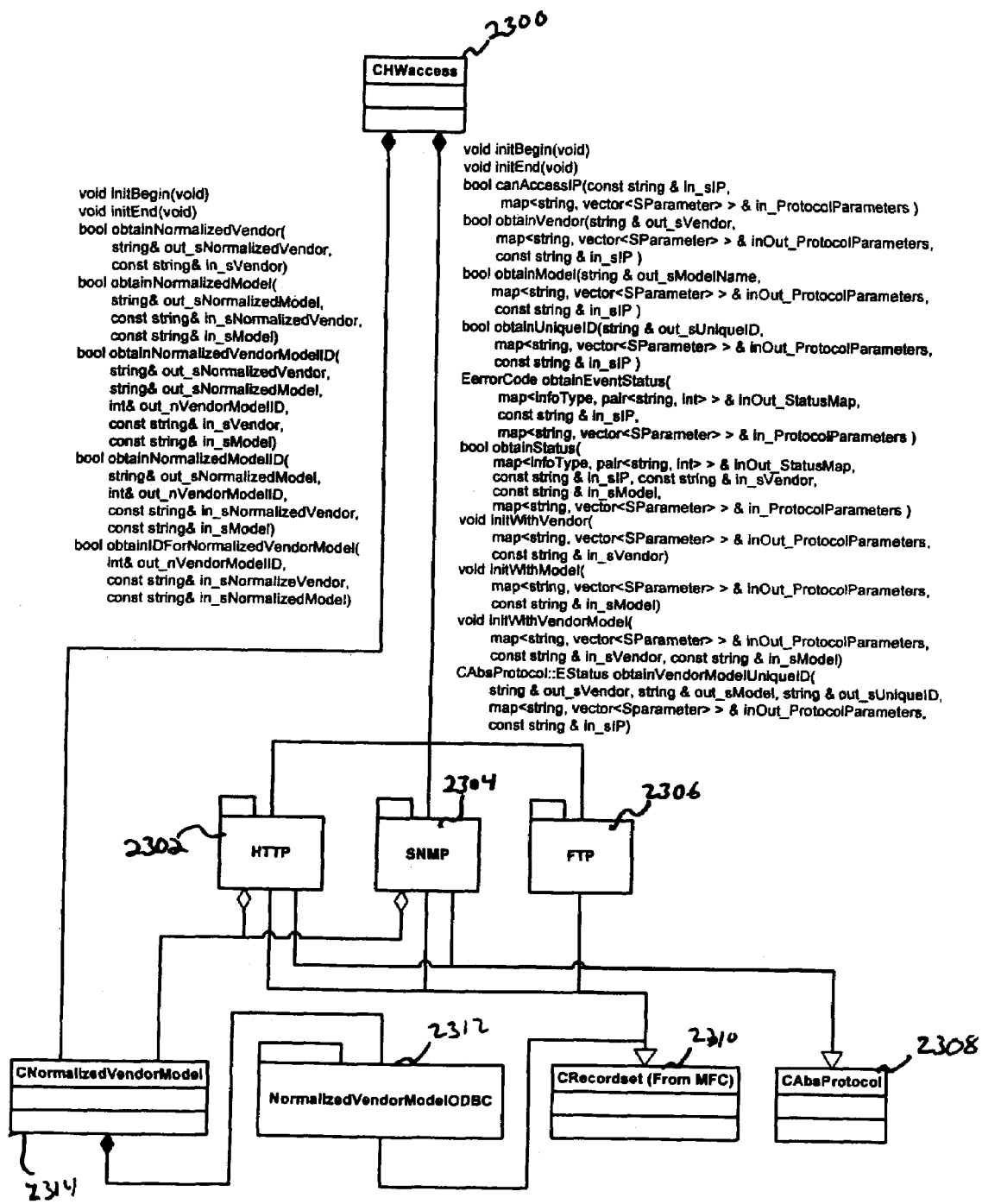
FIG. 22 illustrates the package diagram of the HWaccess package according to one embodiment of the present invention.

FIG. 22 shows the package diagram for the HWaccess package. This package is responsible for identifying the network devices to be monitored and obtaining information about the network devices using various network protocols (e.g. SNMP, HTTP, and FTP). The package contains the packages HTTP 2302, SNMP 2304, FTP 2306, NormalizedVendorModelODBC 2312, and the classes CHWaccess 2300, CAbsProtocol 2308, CRecordset 2310, and CNormalizedVendorModel 2314. The packages HTTP 2302, SNMP 2304, and FTP 2306 implement the network protocols to access the network devices to obtain information from them. For example, the HTTP package 2302 implement the HTTP protocol to access the web pages of the network devices to obtain information from the web pages. The class CHWaccess 2300 manages all the protocol packages to obtain the necessary information from the network devices. The class CAbsProtocol 2308 is an abstract class representing any protocol. This class provides the interface between CHWaccess 2300 and the protocol packages. The class CAbsProtocol 2308 provides a set of common functions as shown in FIG. 22 to CHWaccess 2300 in which all protocols will provide CHWaccess 2300 the necessary information. The classes derived from CAbsProtocol 2308 as described in later figures will provide the method for each of the functions for the appropriate protocols. The class CRecordset 2310 is a class of the Microsoft Foundation Class that provides each of the protocol package access to the database to obtain information about which vendor and model of network devices are supported and what information to obtain from those network devices. The class CNormalizedVendorModel 2314 is a member of a namespace so that the object for this class can be shared by all the protocol packages. The class 2314 contains information so that the protocols can obtain the normalized vendor, normalized model, and ID for the vendor and model. The normalized vendor and model names provide a common name that all protocols can use. The class 2314 obtains information about the normalized vendor and model and ID from the support database through the NormalizedVendorModelODBC 2312 package. The 2312 package provides access to tables in the support database to obtain the normalized vendor and model and ID.

Each of the protocol packages, HTTP 2302, SNMP 2304, and FTP 2306, as described in FIG. 22, contain a class that manages the access to the network device to obtain information from the device. The class is derived from the abstract class CAbsProtocol 2308 which provides for the method of implementing the protocols to access information from the network device. An abstract class only provides the interface functions but does not perform any process. The classes derived from the abstract class provide the method to perform the process for the interface functions. There can be many derived classes of the abstract class so that the different derived classes can perform the process of the interface function differently. From the design of the HWaccess package, a new protocol can be added to the system by adding a new package that contains a derived class of CAbsProtocol that manages the new package to access the network device using the new protocol. The abstract class allows for the future expansion of the system.

FIG. 23 shows the data structure that is used in the HWaccess package of FIG. 22 to maintain all the protocols to access and to obtain information from the network devices. In FIG. 23, the data structure is a vector 500 of pointers to CAbsProtocol 2308. The class CHWaccess 2300 will contain and use this data structure. Even though the vector 500 will contain pointers to classes derived from CAbsProtocol 2308, CHWaccess 2300 will see the vector as containing pointers to CAbsProtocol 2308 and call the interface functions of CAbsProtocol 2308 through the virtual function call mechanism. In actuality, CHWaccess 2300 will call the interface functions of the derived classes of CAbsProtocol 2308. For example, the pointer to the CAbsProtocol 502 in the first entry in the vector may be a pointer to the derived class CSNMPProtocol, the pointer to the CAbsProtocol 504 in the second entry in the vector may be a pointer to the derived class CHTTPProtocol, and the pointer to the CAbsProtocol 506 in the third entry in the vector may be a pointer to the derived class CFTPProtocol. So when CHWaccess 2300 calls the interface functions of CAbsProtocol 2308 in the vector, it is actually calling the interface functions of CSNMPProtocol, CHTTPProtocol, and CFTPProtocol. The use of the abstract class CAbsProtocol 2308 in the vector 500 allows any protocol to be used to access and obtain information from the network devices. The abstract class CAbsProtocol 2308 hides the detail of what protocol is being used.

Figure 24:
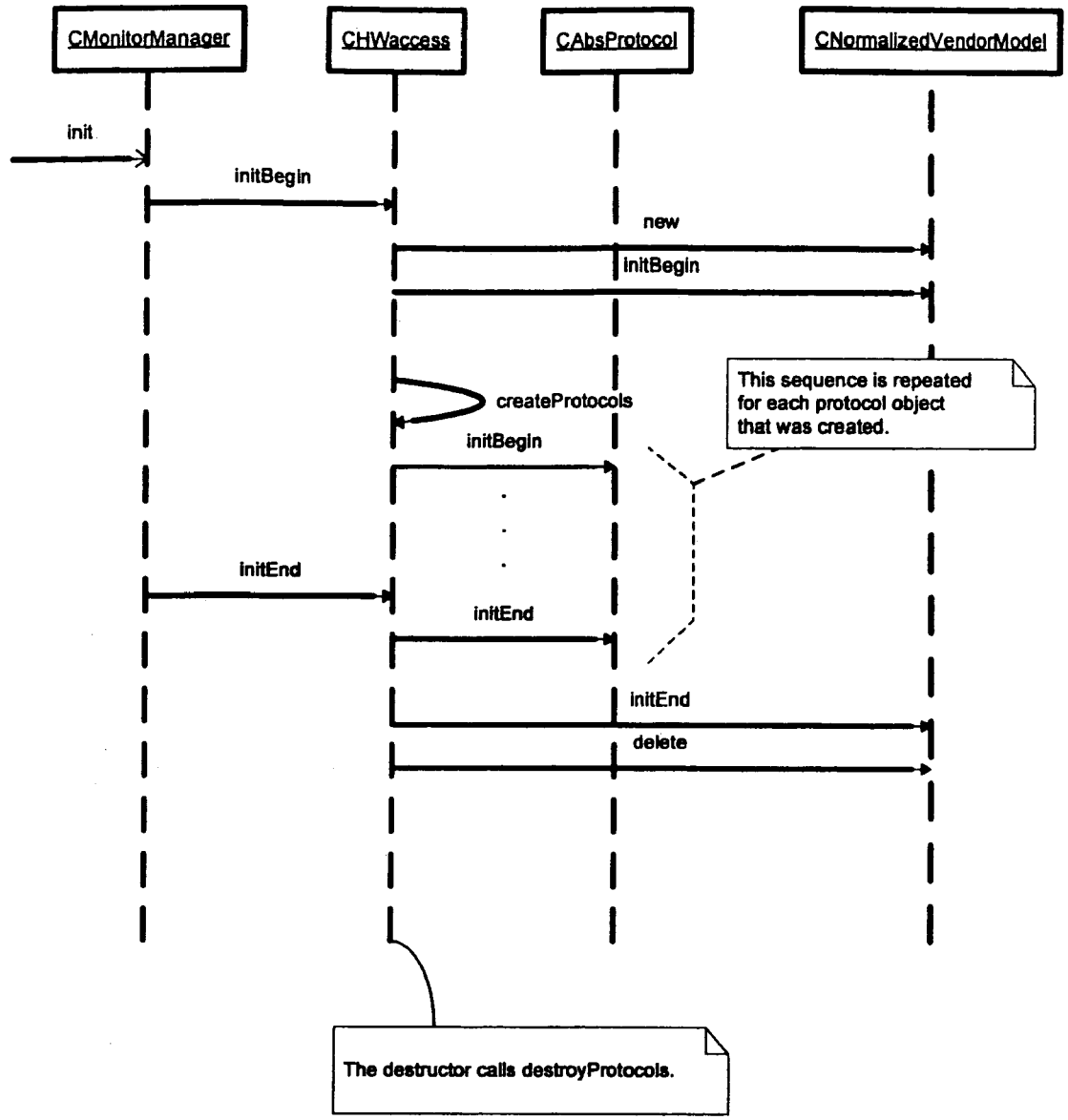
FIG. 24 is a sequence diagram of the initialization of the class objects when init( ) of the Monitor package is called.

FIG. 24 is a sequence diagram that shows the initialization of the HWaccess package when init( ) of the Monitor package is called. The CNormalizedVendorModel object is created and initialized so that all protocol objects can obtain the normalized (or common) name and ID for the vendor and model. All the protocol objects will be created and initialized to access information from the devices to be monitored. The calling of the function initBegin( ) of CHWaccess will create the CNormalizedVendorModel object and will be accessible to all the protocol objects. initBegin( ) of CNormalizedVendorModel is called to initialize its data structures with information about all the vendors and its' normalized vendors, all the models and its' normalized models and the ID for the normalized vendor and model. Then all the protocol objects (all derived from CAbsProtocol) will be created in the createprotocols( ) function. initBegin( ) of each protocol object will be called to initialize its support information used to determine the vendor, model, and unique ID of the monitored devices. Before initEnd( ) of CHWaccess is called, functions of CHWaccess and the protocol objects will be called to access the device and obtain and initialize vendor, model, and unique ID information of the device for all the protocols. By the time initEnd( ) of CHWaccess is called, each protocol object has all the information it needs to obtain the status information for the monitored devices which the protocol supports. initEnd( ) of each protocol object will clean up all the data structures it does not need after its initialization. initEnd( ) of CNormalizedVendorModel will clean up all the data structures it contains before the CNormalizedVendorModel is deleted.

Figure 25:
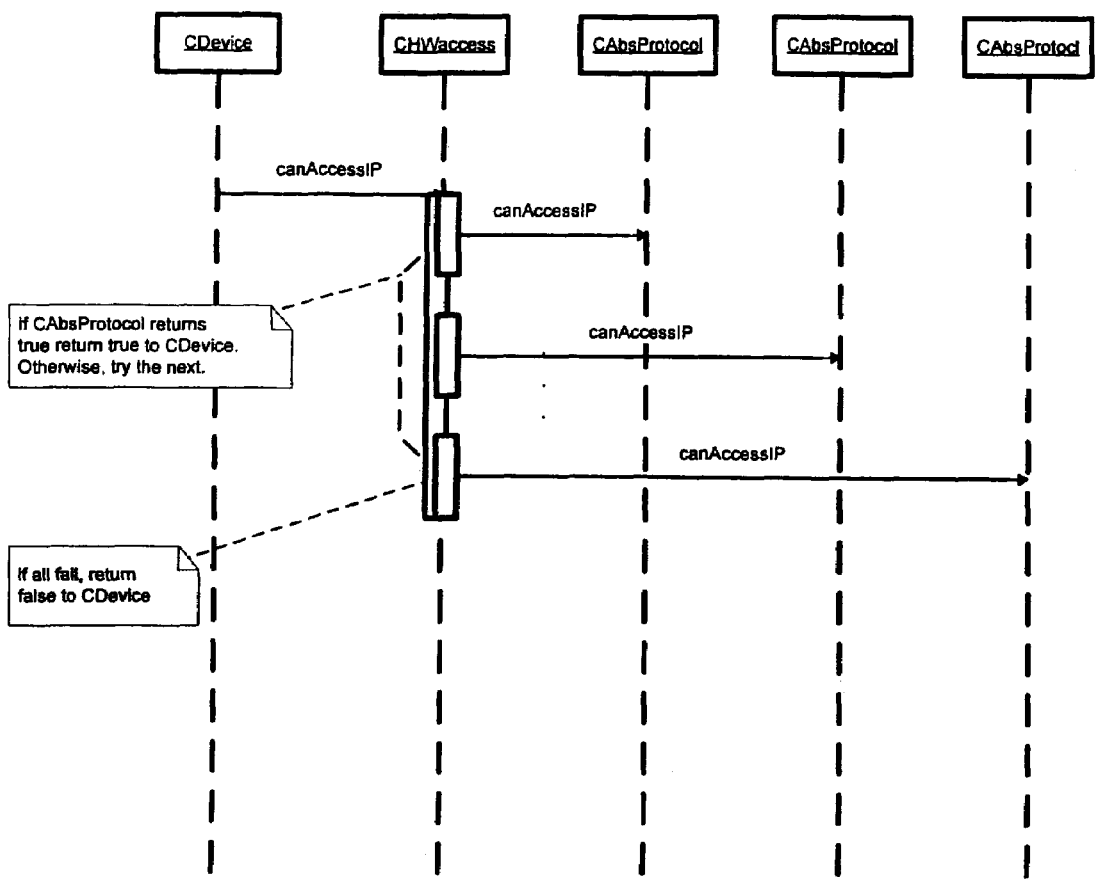
FIG. 25 is a sequence diagram of canAccessIP( ) of the HWaccess package to determine if the device is accessible by any protocol.

FIG. 25 is a sequence diagram that shows canAccessIP( ) of the HWaccess package to determine if the device is accessible by any protocol. CHWaccess will call canAccessIP( ) of each protocol object until one of the protocol objects can access the device corresponding to the IP address. If none of the protocol objects can access the device, canAccessIP( ) of CHWaccess returns false and the device will not be monitored.

Figure 26:
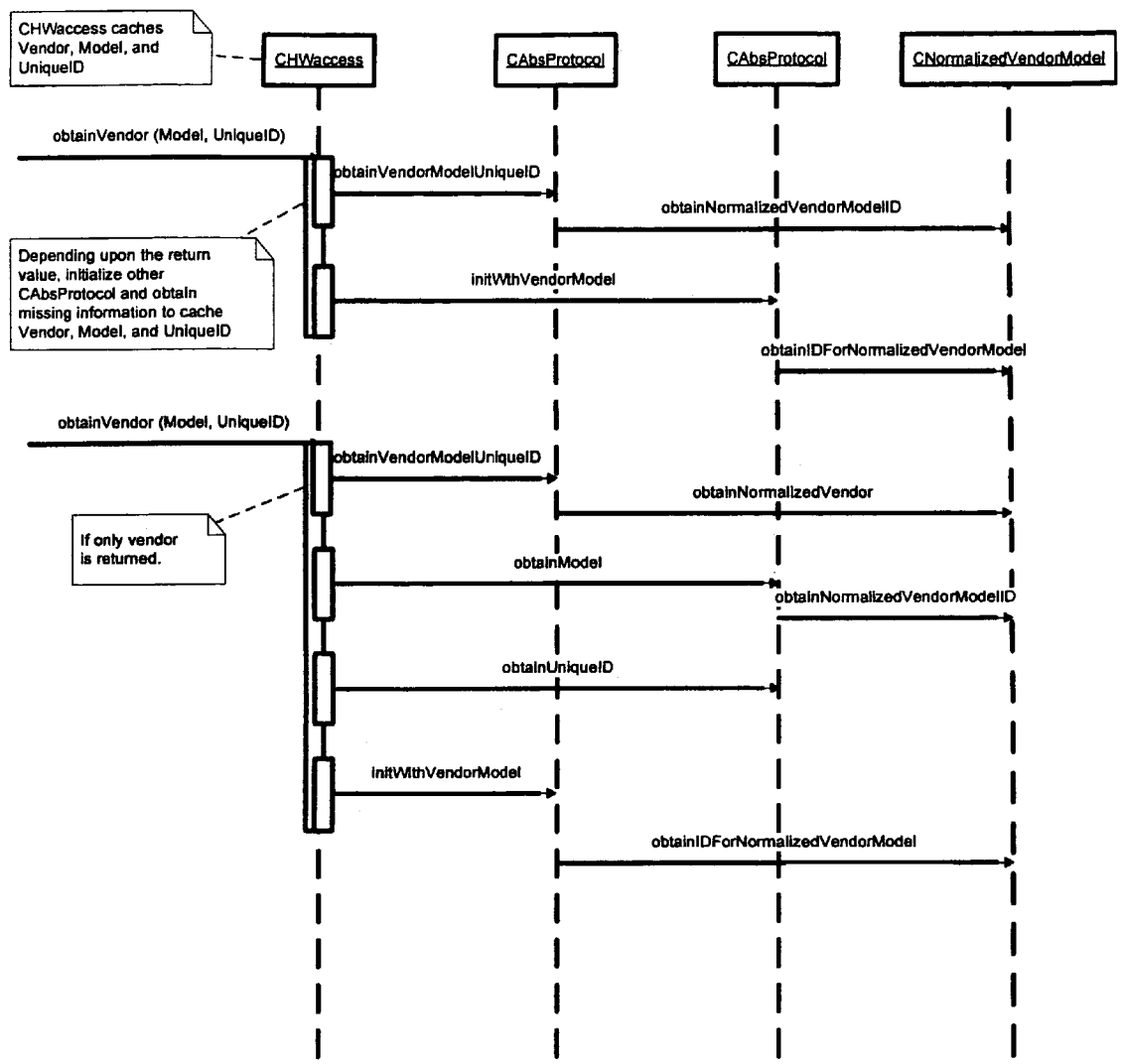
FIG. 26 is a sequence diagram for obtaining vendor information, model information, and an unique ID from a monitored device through CHWaccess object.

FIG. 26 is a sequence diagram that shows the scenario for obtaining the vendor, model, and unique ID of the device from protocol objects and initializing the other protocol objects with vendor and model information. Once a protocol object obtains the vendor and model information of the device, the protocol object obtains the normalized vendor and model name of the device from the CNormalizedVendorModel object and updates it support for the device so it can obtain status information from the device. CNormalizedVendorModel uses the data structures shown in FIG. 30 through 33 for returning the normalized vendor and model name (and vendor model ID if needed). The other protocol objects will need to receive information about the vendor and model of the device so it can update its support for the device so it can obtain status information from the device. CHWaccess will use as many of the protocol objects as necessary to obtain the vendor, model, and unique ID of the device and initialize all the other protocol objects with vendor and model information. CDevice (1110) object will keep the normalized vendor, normalized model, and unique ID information for a given IP address of the device. In the sequence diagram, CHWaccess calls obtainVendorModelUniqueID( ) of a protocol object and gets all the information from the protocol object. The protocol object obtains the normalized vendor and model name and ID by calling obtainNormalizedVendorModelID( ) of CNormalizedVendorModel. CHWaccess will then initialize all the other protocol objects with the normalized vendor and model information by calling initWithVendorModel( ) of all the other protocol objects. The protocol objects may call obtainIDForNormalizedVendorModel( ) of CNormalizedVendorModel if the protocol objects needs to use the ID.

For obtaining the vendor, model, and unique ID for another device in the sequence diagram, CHWaccess calls obtainVendorModelUniqueID( ) of a protocol object and may get only the vendor name. The protocol object obtains the normalized vendor name by calling obtainNormalizedVendor( ) of CNormalizedVendorModel. Then CHWaccess calls obtainModel( ) and obtainUniqueID( ) of another protocol object to obtain the model and unique ID. The protocol object will obtain the vendor, model, and unique ID information from the device and will obtain the normalized vendor and model name and ID by calling obtainNormalizedVendorModelID( ) of CNormalizedVendorModel. CHWaccess will then initialize all the other protocol objects with the normalized vendor and model information by calling initWithVendorModel( ) of all the other protocol objects. The protocol objects may call obtainIDForNormalizedVendorModel( ) of CNormalizedVendorModel if the protocol objects needs to use the ID.

Figure 27:
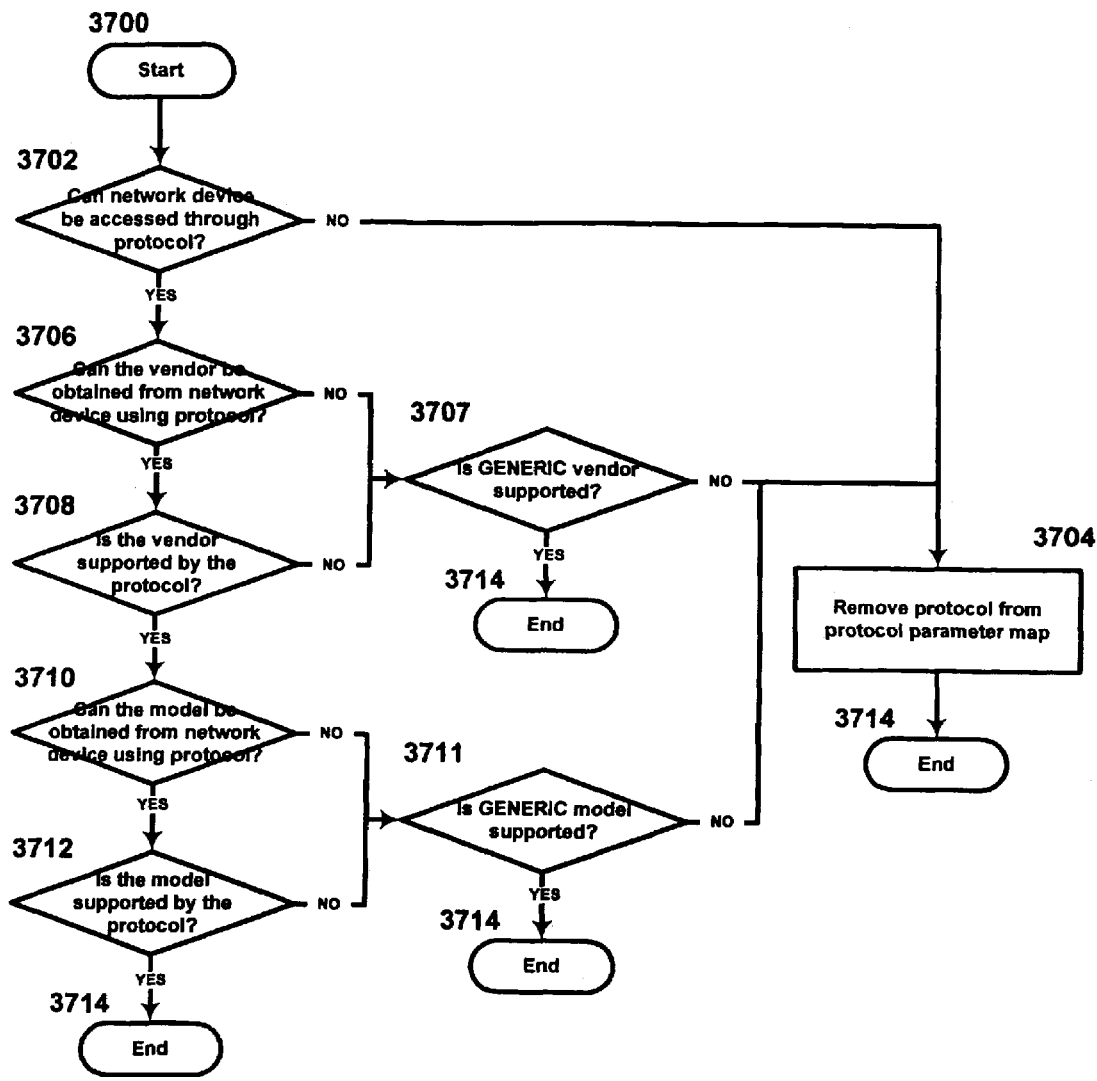
FIG. 27 shows a flowchart describing how the data structure used by the software objects representing the monitored devices is updated to determine which protocols are used to obtain status information for a monitored device according to one embodiment of the present invention.

FIG. 27 shows a flowchart describing how the Protocol Parameter Map 1800 of FIG. 16 is updated to determine which protocols are used to obtain the status information from a network device. The steps in FIG. 26 are performed to obtain the vendor name and the model name of a network device for a protocol. In step 3702, a check is made to determine if the network device can be accessed using a protocol. The network device is accessed through the protocol using the information in the map 1800. If the network device cannot be accessed through the protocol, the protocol is removed from the protocol parameter map 1800 in step 3704 and the updating of the map 1800 is completed in step 3714. If the network device can be accessed through the protocol, then in step 3706 a check is made to determine if the vendor of the network device can be obtained using the protocol. If the vendor cannot be obtained, then in step 3707 a check is made if GENERIC vendor is supported by the protocol. Support for GENERIC vendor for a protocol means that a protocol can obtain status information that is common to all devices (common status information) through some standard even if it cannot obtain or does not support the vendor of the devices. If GENERIC vendor is not supported by the protocol, then the protocol is removed from the protocol parameter map 1800 in step 3704 and the updating of the map 1800 is completed in step 3714. If GENERIC vendor is supported by the protocol, then the protocol remains in the protocol parameter map 1800 and the updating of the map is completed in step 3714. If the vendor can be obtained in step 3706, then in step 3708 a check is made to determine if the vendor of the network device is supported. If the vendor is not supported by the protocol, then in step 3707 a check is made if GENERIC vendor is supported by the protocol. The sequence of steps following step 3707 is discussed above.

If the vendor is supported by the protocol, then in step 3710 a check is made to determine if the model of the network device can be obtained using the protocol. If the model cannot be obtained, then in step 3711 a check is made if GENERIC model is supported by the protocol. Support for GENERIC model for a protocol means that a protocol can obtain status information that is common to all devices of a vendor (vendor specific status information) even if it cannot obtain or does not support the model of the devices. If GENERIC model is not supported by the protocol, then the protocol is removed from the protocol parameter map 1800 in step 3704 and the updating of the map 1800 is completed in step 3714. If GENERIC model is supported by the protocol, then the protocol remains in the protocol parameter map 1800 and the updating of the map is completed in step 3714. If the model can be obtained in step 3710, then in step 3712 a check is made to determine if the model of the network device is supported. If the model is not supported by the protocol, then in step 3711 a check is made if GENERIC model is supported by the protocol. The sequence of steps following 3711 is discussed above. If the model is supported by the protocol, then the protocol can be used to obtain status information for the network device and the updating of the protocol parameter map 1800 is completed in step 3714. If the vendor and model are not obtained or not supported, then the protocol is removed from the protocol parameter map 1800 and the protocol is not used to obtain status information. There are variations to the process shown in FIG. 27 depending on the protocol.

As discussed above, status information can be obtained by SNMP from the network device even if the vendor and model are not obtained or supported. As long as the network device supports SNMP and can be accessed by SNMP, information can be obtained using the standard Management Information Base (MIB) of the network device. In step 3702, if the network device cannot be accessed through SNMP, then the SNMP protocol may be removed from the protocol parameter map 1800 in step 3704. However, if the network device can be accessed through SNMP, then the SNMP protocol remains in the protocol parameter map 1800 whether or not the vendor or model is obtained and supported. Network devices that support SNMP provide a MIB so that the remote system can always obtain information from the devices. However, the type and number of information that can be obtained from the network device depends upon if the vendor and model are obtained and supported. More information can be obtained from the network device by SNMP if the vendor and model are obtained and known. If the vendor and model cannot be obtained, SNMP is still able to obtain information that all devices can provide, such as the system description or the time the system has been running. SNMP can be used to obtain information from the network device under the three conditions: (1) vendor and model are supported, (2) vendor supported but model not supported, and (3) vendor and model are not supported. HTTP and FTP do not have the characteristics as SNMP. Where SNMP has a standard MIB that all network devices can follow so that information can be obtained, web pages and FTP files will vary among network devices of different vendors and models. There is no standard for web pages and FTP files which network devices follow to obtain information.

FIG. 28 shows a flowchart describing the process of obtaining status information about the network devices using all the protocols. After the protocol objects have been initialized with information about the vendor and model of network devices it supports, the protocol objects can be used to obtain status information from the network devices. The protocol objects contain information about how to obtain status information for given vendors and models using the data structures containing information from the support database of FIGS. 18, 19, and 20. The vector of pointers to CAbsProtocol 2308 described in FIG. 22 is used to obtain the status information for all the protocol objects. The process of the flowchart will step through the vector once. In step 3122, a protocol object is obtained from the vector of pointers to CAbsProtocol. The protocol object corresponds to one of the network protocols to access the network device (e.g. SNMP, HTTP, and FTP). In step 3124, a check is done to see if there are any more protocol objects that can be obtained from the vector. This check is done by determining if the end of the vector has been reached. If no more protocol objects can be obtained, then the system is done in obtaining the status information from the network device using all the protocol objects in step 3126. If there is a protocol object obtained from the vector, then use the protocol object to obtain the status information of the network device in step 3128. After obtaining the status information using the protocol object, obtain more status information using another protocol object by going back to step 3122.

FIG. 29 shows the data structure used to maintain the status information obtained through the various protocols. It does not maintain information about which protocol was used to obtain the status information. The data structure is a map 724. The key 726 to the map 724 is an infoType. infoType is a number representing a type of information. The value 728 to the map 724 is a pair. The pair consists of a string and an integer. The string in the pair is the status information obtained from the network device that corresponds to the infoType. The integer in the pair is the weight or priority of the status information as obtained from a protocol. As an example, for the infoType of 700 that may represent the level of black toner in the printer cartridge, the pair may contain the string "75%" and integer 10000. The string "75%" indicates that 75% of the toner remains in the cartridge and the integer 10000 is the weight or priority of the status information. CSNMPProtocol 2402, CHTTPProtocol 2502, and CFTPProtocol 2602 adds status information that it obtains from the network devices to the map 724. If there is a same infoType already in the map, the pair of values of higher priority is kept in the map.

FIG. 30 is a map structure attribute member, m_NormalizedVendorMap, of the class CNormalizedVendorModel that is in the HWaccess module of FIG. 22. The map structure attribute member of FIG. 30 contains information about the vendors supported by the system and maps the vendor name to the normalized vendor name. The key of the map is the various names of vendors that the system supports and the value of the map is the normalized vendor. The key will contain the names of vendors that the different protocols may obtain since not all the protocols will obtain the exact same name for a vendor. In addition, merger and acquisition may result in the different company names. The value will contain a normalized name for the different names of the vendor that all protocols can use. This allows a mapping of different vendor names as obtained by various protocols to one unique vendor name. For example, the SNMP protocol may obtain the vendor name hp from a device. The HTTP protocol may obtain the vendor name Hewlett-Packard from the same device. The normalized vendor for the device that all protocols will use for the device will be HP. The map also serves the purpose of providing a normalized vendor name for vendor names of merged companies. All the different vendors for the merged company will map to a single vendor name which may be one vendor name or a combination of the vendor names. For example, the HTTP protocol may obtain the vendor name Minolta from a device. The SNMP protocol may obtain the vendor name QMS for the same device. The normalized vendor for the device which corresponds to merged companies that all protocols will use for the device will be KonicaMinolta. This map is populated with information from the tables of the support database of FIG. 21.

FIG. 31 is a map structure attribute member, m_NormalizedModelMap, of the class CNormalizedVendorModel (2314) that is in the HWaccess module of FIG. 22. This map structure is used to obtain the normalized model name after the normalized vendor name is obtained using the map structure shown in FIG. 30. The map structure attribute member of FIG. 31 contains information about the models supported by the system and maps the model name to the normalized model name. The key of the map is the concatenation of the normalized vendor name and the various names of models that the system supports with a separator ('%') between them. The value of the map is the normalized model name. The key will contain the names of models that the different protocols will obtain since not all the protocols will obtain the exact same name for a model. The value will contain a name for the different names of the model that all protocols will use and have in common. This allows a mapping of different model names as obtained by various protocols to one unique model name. For example, the SNMP protocol may obtain the model name "CLP 550" from a model of a Samsung printer. The HTTP protocol may obtain the model name "CLP-550" from the same printer. The normalized model name for the device that all protocols will use for the device will be CLP550. This map is populated with information from the tables of the support database of FIG. 21.

FIG. 32 is a map structure attribute member, m_VendorModelIDMap, of the class CNormalizedVendorModel that is in the HWaccess module of FIG. 22. The map structure attribute member of FIG. 32 contains information about the ID associated with the normalized vendor and model name. The key of the map is the concatenation of the normalized vendor name and the normalized model name with a separator ('%') between them. The value of the map is a number for the vendor model ID. This ID uniquely identifies the vendor model. The protocols may use the ID. For example, the HTTP protocol uses the vendor model ID in the map structure of FIG. 40 that will be used to obtain the unique ID of the device for a given vendor and model. The map, m_VendorModelIDMap, is populated with information from the tables of the support database of FIG. 21.

Figure 33:
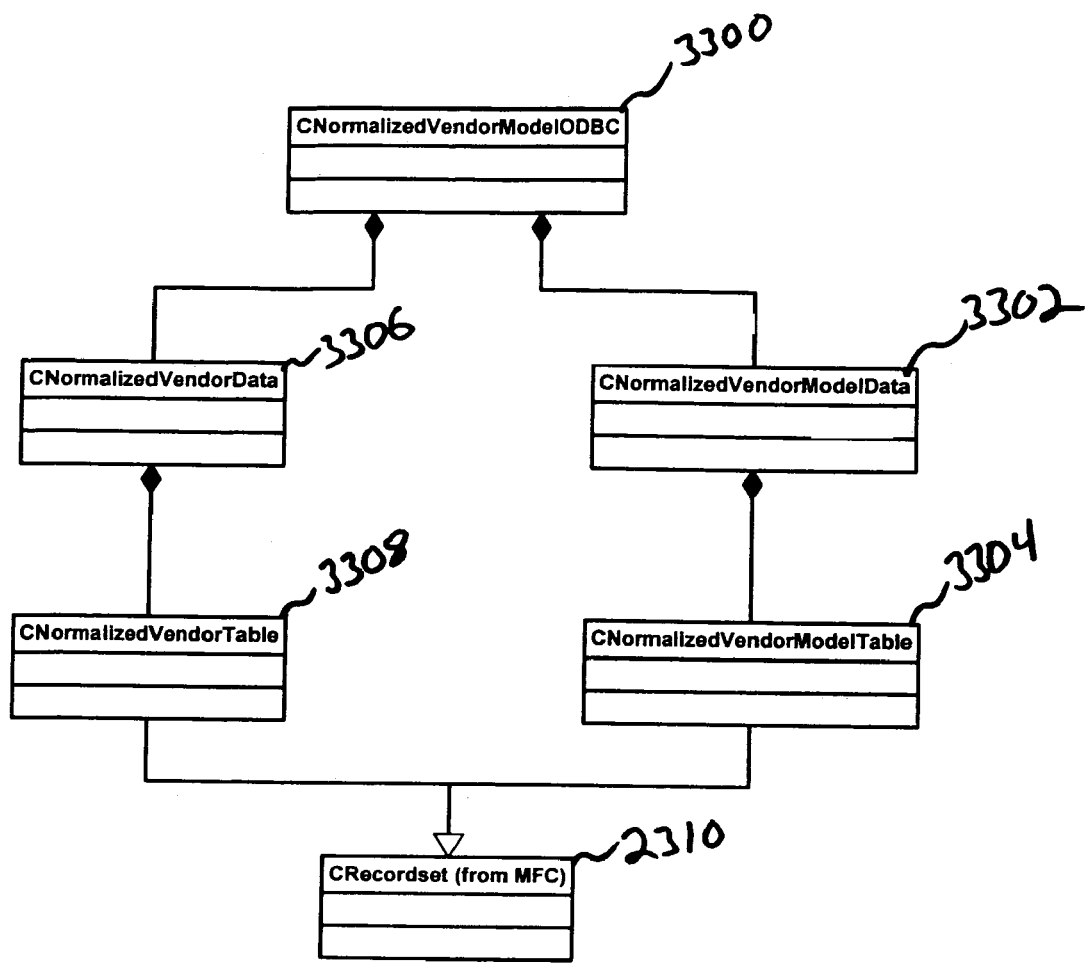
FIG. 33 illustrates the class diagram of the NormalizedVendorModelODBC package for accessing normalized vendor and model information from the database.

FIG. 33 is a class diagram for the NormalizedVendorModelODBC package. This package interfaces with the support database to obtain information to map vendor names with normalized vendor names, model names with normalized model names, and vendor and model names with IDs. The CNormalizedVendorModelODBC class 3300 is the interface for this package and manages the other classes to obtain the appropriate information from the tables of the support database. The CXXXData classes 3306 and 3302, and their corresponding CXXXTable classes 3308 and 3304, provide access to the XXX tables of the support database shown in FIG. 21 to obtain information from the tables.

Figure 34:
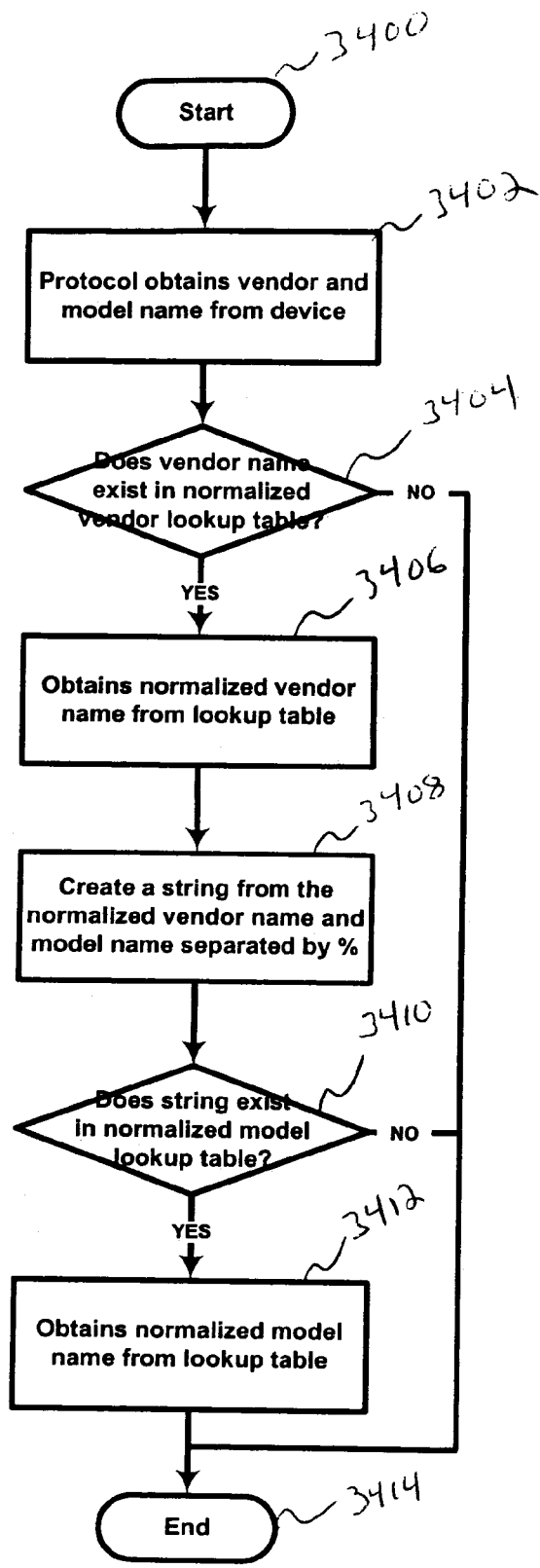
FIG. 34 is a flowchart describing the process of determining the normalized vendor name and normalized model name from the vendor name and model name obtained by a protocol from a device.

FIG. 34 is a flowchart that describes the process of determining the normalized vendor name and normalized model name from the vendor name and model name obtained by a protocol from a device. The process of obtaining the normalized vendor name and normalized model name corresponds to calling the interface functions of CNormalizedVendorModel shown in FIG. 22. The process starts with step 3402, in which the protocol obtains the vendor and model name from the device. The vendor and model name obtained corresponds to the names the protocol's know which may or may not be the normalized names. In step 3404, from the vendor name obtained, determine if the vendor name exists in the normalized vendor lookup table. This process is checking if the vendor name is one of the keys of the map m_NormalizedVendorMap of FIG. 30. If not, then the process is complete without obtaining the normalized vendor and model name. If it is one of the keys, the process proceeds to step 3406. In step 3406, the value from the map corresponding to the key for the normalized vendor name is obtained. In step 3408, with the normalized vendor name and the model name obtained by the protocol, create a string with the normalized vendor name and model name separated by %. In step 3410, the string is used to check if the model name exists in the normalized model lookup table. This process is checking if the string is one of the keys of the map m_NormalizedModelMap of FIG. 31. If not, then the process is complete with only obtaining the normalized vendor name. If it is one of the keys, the process proceeds to step 3412. In step 3412, the value from the map corresponding to the key for the normalized model name is obtained. The process is then complete with the normalized vendor name and normalized model name obtained.

The flowchart of FIG. 34 is an example of a protocol obtaining the normalized vendor and model. If the protocol needed the vendor model ID, then the process would include obtaining the ID from the map m_VendorModelIDMap of FIG. 32 with the use of the normalized vendor and model name. All protocols may not need to obtain the normalized information. Protocols will vary in the information it wants from the class CNormalizedVendorModel so that the flowchart of FIG. 34 is one of many possible processes that a protocol will follow.

Figure 35:
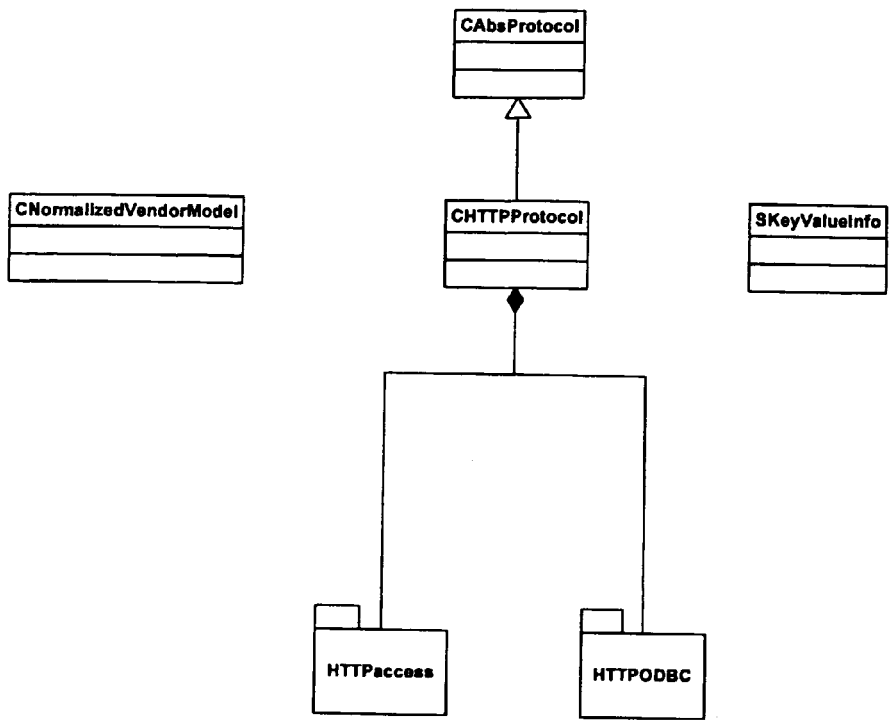
FIG. 35 illustrates the package diagram of the HTTP package supporting the extraction of information from web pages.

FIG. 35 is a package diagram for the HTTP package. This package supports the extraction of information from web pages of devices. The package uses the abstract class CAbsProtocol described in FIG. 22 above. The CHTTPProtocol class is derived from CAbsProtocol. CHTTPProtocol is the interface for the HTTP package and manages the packages HTTPaccess and HTTPODBC described in FIGS. 37 and 38 below to obtain information from the devices. The HTTP package uses the class CNormalizedVendorModel described in FIG. 22 above for information about normalized vendor name, normalized model name, and vendor model ID. The HTTP package contains and uses the structure SKeyValueInfo described in FIG. 36 below to locate and extract information from the web page of a device. The data elements of SKeyValueInfo are obtained from the tables of the database shown in FIG. 19.

Figure 36:
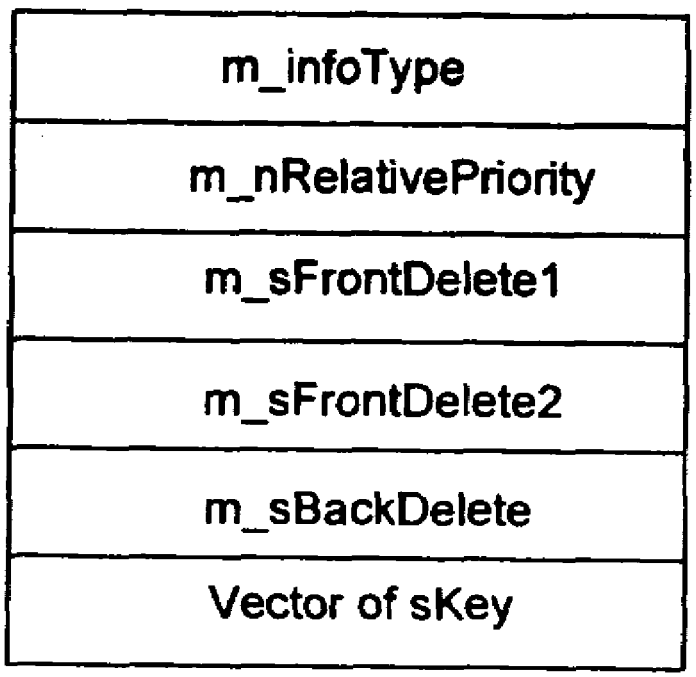
FIG. 36 illustrates a data structure used in the HTTP package of FIG. 35 to extract information from the web pages.

FIG. 36 shows the structure SKeyValueInfo that is used in the HTTP package of FIG. 35 to locate and extract information from the web pages. m_infoType is a number representing the type of information. For example, an m_infoType value of 601 represents the total pages printed by the network device and an m_infoType value of 700 represents the black toner level remaining. m_nRelativePriority represents the weight of the information that will be extracted by the HTTP protocol. A m_nRelativePriority that is higher than that of other-protocols indicates that the information extracted by the HTTP protocol is more informative and desirable. A m_nRelativePriority that is lower than that of other protocols indicates that the information extracted by the HTTP protocol should not be used if other protocols already obtain the information. The vector of sKey is a vector of strings that will be used to locate the desired information from a web page. The strings will let the HTTP protocol navigate to the line containing the desired information. The strings are placed in the vector in a particular order so that as each are searched for and found in the web page, the closer the HTTP protocol is to the line containing the desired information. After the last string in the vector is identified in the line of the web page, the next line shall contain the desired information. The strings, along with the sequence number to identify the last line before the target line, are obtained from HTTPWebPagePreconditions table in FIG. 19. The strings, obtained from HTTPWebPageExtractFromLine in FIG. 19, m_sFrontDelete1, m_sFrontDelete2, and m_sBackDelete, are used to extract the information from the line containing the desired information. m_sFrontDelete1 and m_sFrontDelete2 will be used to delete the strings in front of the desired information and m_sBackDelete will be used to delete the string in back of the desired information.

Figure 37:
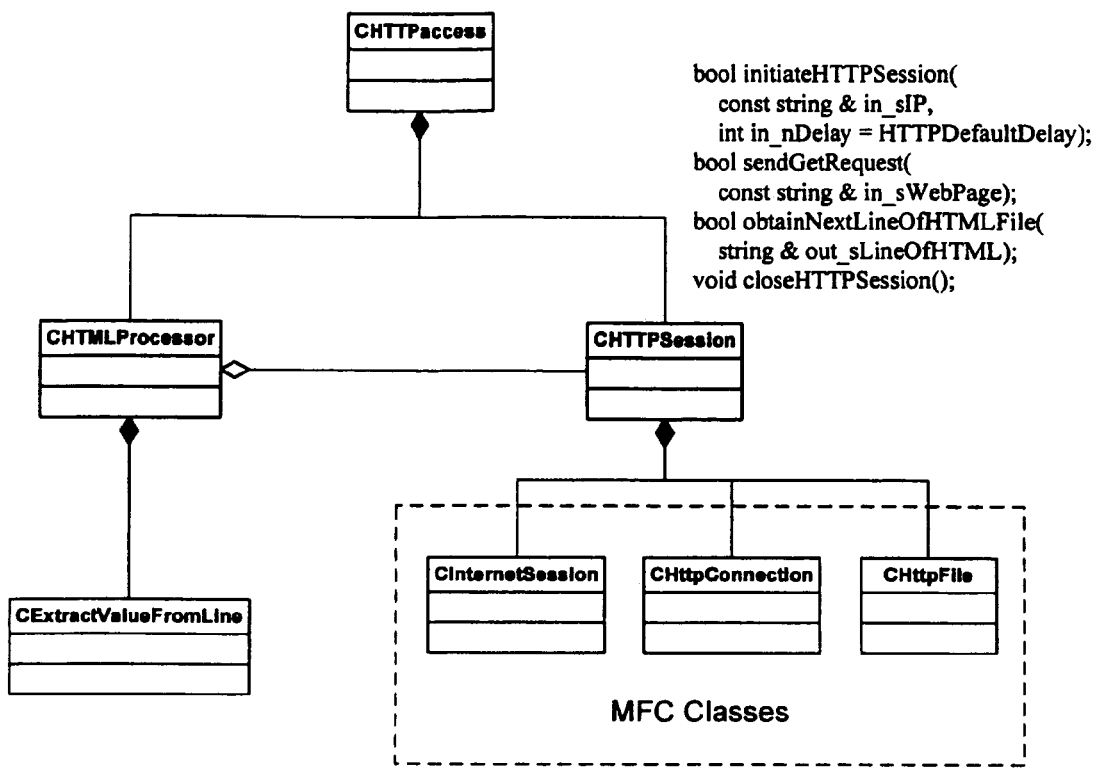
FIG. 37 illustrates the package diagram of the HTTPaccess package of FIG. 35 that supports the access and processing of web pages to extract information.

FIG. 37 is a package diagram for the HTTPaccess package. This package is responsible for initiating and closing an HTTP session with a network device and to extract information from the web page of the device. The class CHTTPaccess is the interface for this package and manages other classes to perform the package's tasks. The class CHTTPSession initiates and closes an HTTP session with a device and accesses the web page of the devices. The class CHTMLProcessor process the lines of a web page of a device to locate and extract the desired information. The class CExtractValueFromLine processes a line of the web page containing the desired information so as to extract the information. The classes CInternetSession, CHttpConnection, and CHttpFile are classes of the Microsoft Foundation Classes (MFC) that are used by CHTTPSession to access the web pages of a device.

Figure 38:
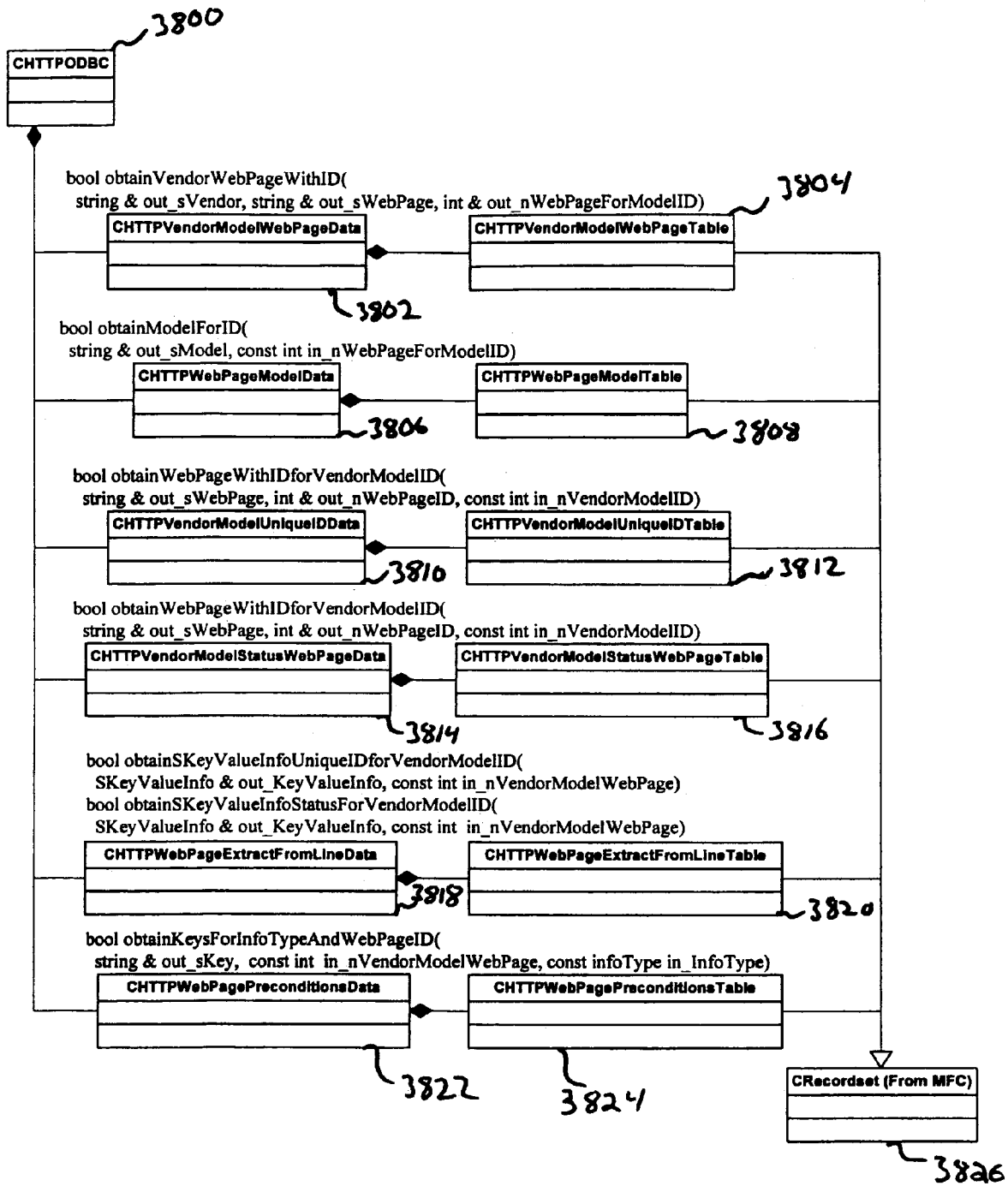
FIG. 38 illustrates the package diagram of the HTTPODBC package of FIG. 35 that supports the access to the database to obtain information to extract information from the web pages of devices of various vendors and models.

FIG. 38 is a package diagram for the HTTPODBC package. This package interfaces with the support database to obtain information used to extract the model name, unique identifier, and status information from the web pages of a device. The CHTTPODBC class 3800 is the interface for this package and manages the other classes to obtain the appropriate information from the tables of the support database. The CHTTPXXXData classes 3802, 3806, 3810, 3814, 3818, and 3822 and their corresponding CHTTPXXXTable classes 3804, 3808, 3812, 3816, 3820, and 3824 provide access to the XXX tables of the support database shown in FIG. 19 to obtain information from the tables.

FIG. 39 is a map structure that is used in the HTTP package of FIG. 35 to extract the model name from the web pages. The map structure m_VendorModelSearchMap is an attribute member of CHTTPProtocol. The key to the map is a string for the normalized vendor name. The value to the map is a vector of pairs. The first element of the pair is a name of the web page which would contain the model name and the second element of the pair is a vector of strings for all the model names that could be found in the web page. For a given vendor name, the map structure would contain all the web pages that would contain model names for the devices. Each web page would contain at least one model name that can be found in the web page. If a web page is accessible, then each line of the web page is searched to see if one of the model strings can be found. If one is found, then the vendor and model of the device is discovered. If the model cannot be found, then the vendor is known since its web page is accessible but the model is not supported. However, the HTTP protocol does not support obtaining status information from devices if only the vendor name is known. The normalized vendor name is used in the map rather than the vendor name that would be found in the web page. The reason is that if the web page is accessible, then that web page is associated with the vendor so that the normalized vendor can be used. This map structure is populated with information from the support database. Description of how this map is used is provided in FIGS. 44 to 46.

FIG. 40 is a map structure that is used in the HTTP package of FIG. 35 to extract the unique ID from the web page of a device. The map structure m_UniqueIDSearchMap is an attribute member of CHTTPProtocol. The key to the map is an integer that is the vendor model ID. This ID corresponds to the normalized vendor and normalized model of the map m_VendorModelIDMap of FIG. 32. The value to the map is a pair. The first element in the pair is the name of the web page that will contain the unique ID. The second element in the pair is a vector of the structure SKeyValueInfo. The vector will only contain one SKeyValueInfo structure since only one is needed to extract the unique ID from the web page. Once the vendor and model of the device is known, the unique ID is obtained using information from this map structure. This map structure is populated with information from the tables of FIG. 19 in the support database.

FIG. 41 is a map structure that is used in the HTTP package of FIG. 35 to extract the status information from the web pages of all devices that are monitored. The map structure m_VendorModelStatusMap is an attribute member of CHTTPProtocol. The key to the map is a string containing the normalized vendor and normalized model name separated by %. The value to the map is a vector of pairs. The first element in the pair is the name of the web page that contains one or more status information. The second element in the pair is a vector of the structure SKeyValueInfo. The vector will contain SKeyValueInfo structures to extract all the status information from the web page. For a given vendor and model, the vector will contain pairs for all the web pages from which status information can be extracted. Once the vendor and model are determined for a device, information about obtaining status information from the device is obtained from the support database and added to the map structure. Description of how this map is used is provided in FIGS. 47 to 50.

Figure 47:
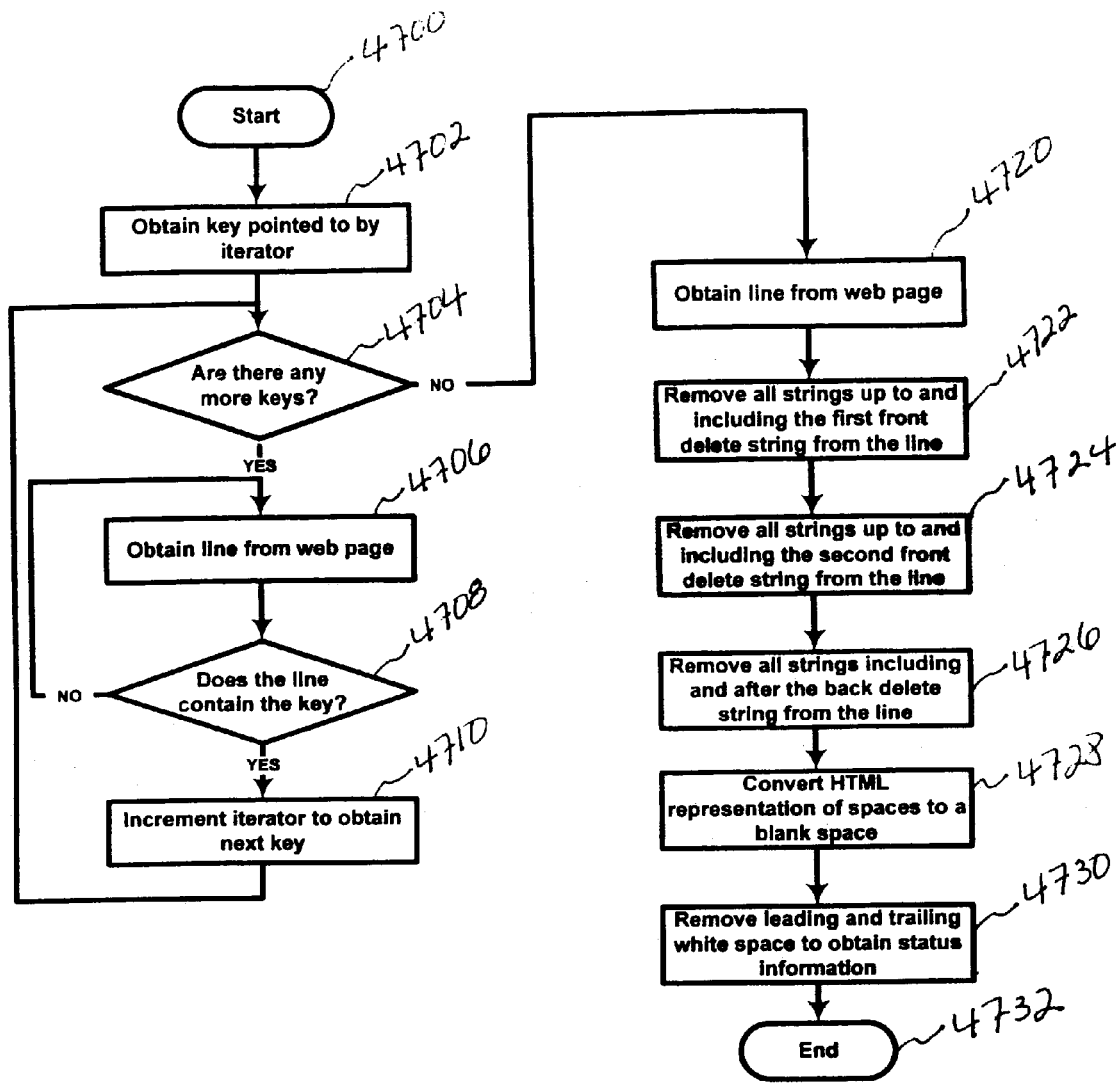
FIG. 47 is a flowchart describing the process of obtaining the status information from the web page of a device that will use the data structures of FIGS. 41 and 42.

FIG. 42 is a vector structure that is used in the HTTP package of FIG. 35 to extract the status information from a web page of a device. The vector structure m_ExtractionStateVector is an attribute member of CHTMLProcessor. The vector structure is a vector of the structure SExtractionState. The structure SExtractionState contains information for extracting a status information from the web page. FIG. 47 shows a flowchart on how the structure is used to extract the status information. The vector structure contains information for extracting all the information except vendor and model from the web page. The structure SExtractionState uses information from the structure SKeyValueInfo to obtain the status information from a web page. m_infoType, m_nRelativePriority, m_sFrontDelete1, m_sFrontDelete2, and m_sBackDelete of SExtractionState are the same as those in the structure SKeyValueInfo. The iterator m_CurrentPreconditionItr will be used to iterate through the key strings in the vector of sKey of SKeyValueInfo while the iterator m_EndItr will be used to point to the end of the vector of sKey. The iterator m_CurrentPreconditionItr will point to the sKey and is initially set to point to the first element of the vector of sKey. If a line of the web page contains the sKey, then the iterator will be incremented so that it will point to the next sKey that will be searched for. It the iterator reaches the end (equals m_EndItr), the then next line of the web page will contain the desired status information. m_LineState is the enumeration ELineStatus with values ePreTargetLine, eTargetLine, and eFinished. The value of m_LineState maintains the state of finding the status information. If m_LineState is ePreTargetLine, then the system is still searching the for the sKey of the vector to locate the status information. As long as the iterator m_CurrentPreconditionItr is not at the end of the vector, m_LineState is ePreTargetLine. Once the iterator m_CurrentPreconditionItr reaches the end of the vector, all the sKey of the vector has been found and m_LineState becomes eTargetLine and the status information is extracted from the next line of the web page. Once the status information is extracted from the next line of the web page, m_LineState becomes eFinished.

Figure 43:
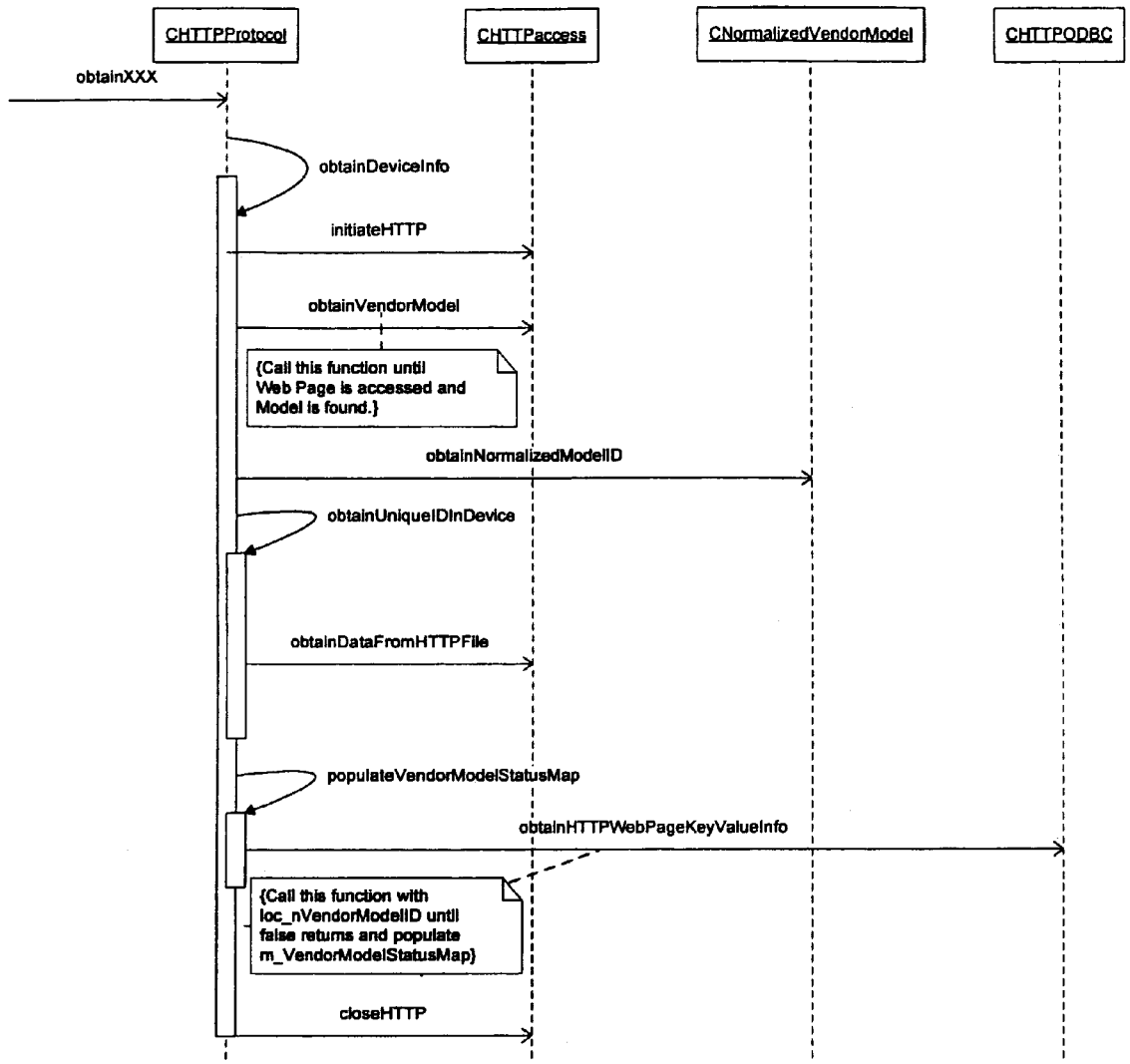
FIG. 43 is a sequence diagram for obtaining vendor name, model name, and unique identifier from the device's web pages.

FIG. 43 is a sequence diagram that shows the vendor name, model name, and unique identifier being obtained from the device's web pages. The function obtainXXX( ) of CHTTPProtocol where XXX is Vendor, Model, UniqueID, or VendorModelUniqueID, initiates the sequence to obtain information about the device. The function obtainXXX( ) calls its own function obtainDeviceInfo( ) which obtains the vendor name, model name, and unique ID. All the sequences following obtainDeviceInfo( ) in the diagram are performed within the function. The HTTP session is initiated by a call to the function initiateHTTP( ) of CHTTPaccess. Then the function obtainVendorModel( ) of CHTTPaccess is called to obtain the model name from the device's web page. This function may be called multiple times with different input web pages until the model is obtained. If the model name is obtained, the normalized vendor name is known based upon the map structure m_VendorModelSearchMap of FIG. 39. Once the model name is obtained, the function obtainNormalizedModelID( ) of CNormalizedVendorModel is called to obtain the normalized model name and the vendor model ID. Then the unique ID of the device is obtained by calling its own function obtainUniqueIDniDevice( ). Within this function the map structure m_UniqueIDSearchMap of FIG. 40 is used to obtain the web page that contains the unique ID and the call to function obtainDataFromHTTPFile( ) of CHTTPaccess will obtain the unique ID from the web page. With the vendor and model known, a call to its own function populateVendorModelStatusMap( ) will populate the map structure m_VendorModelStatusMap of FIG. 41 with information about all the status information that will be obtained from the web pages of the device. populateVendorModelStatusMap( ) will populate the map structure with information from the tables of FIG. 19 in the support database with calls to obtainHTTPWebPageKeyValueInfo( ) of CHTTPODBC. The HTTP session is closed by the call to function closeHTTP( ) of CHTTPaccess.

Figure 44:
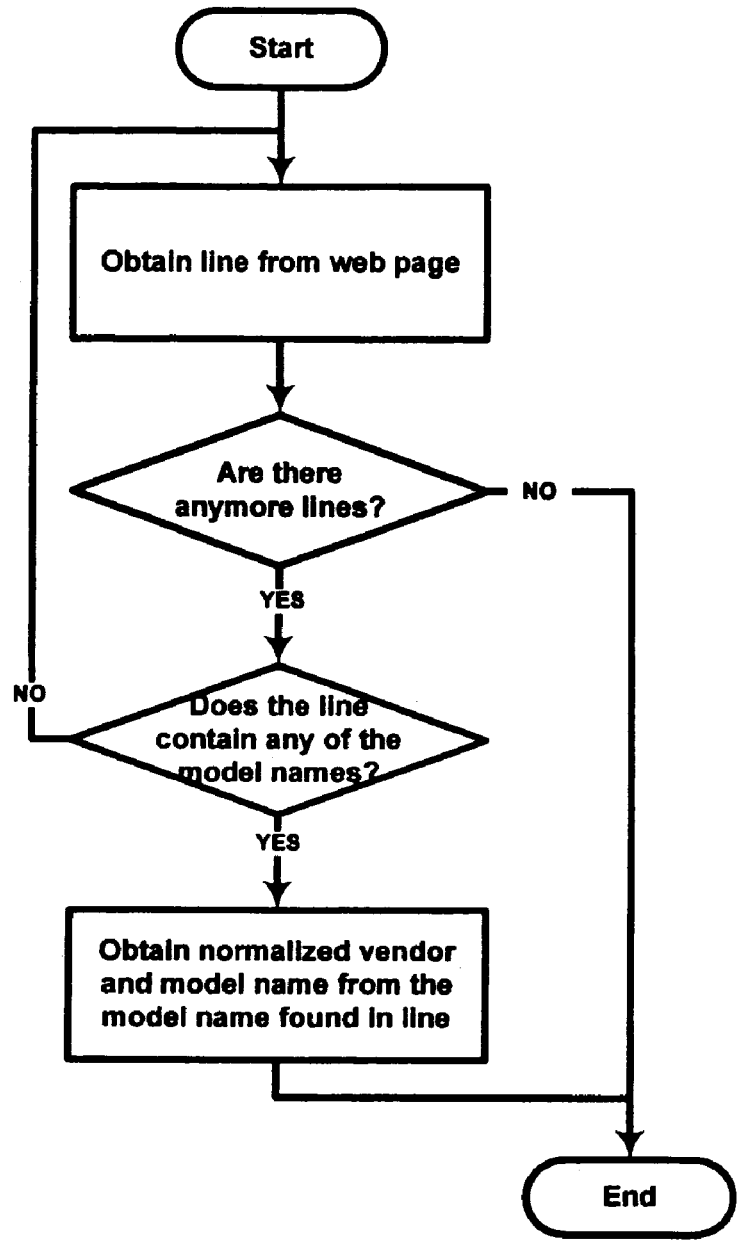
FIG. 44 is a flowchart describing the process of obtaining the model name from the web page of a device that will use the data structure of FIG. 39.

FIG. 44 is a flowchart that describes the process of obtaining the model name from the web page of a device that will use the map structure of FIG. 39. The map structure shows that for a given vendor, there are multiple web pages corresponding to different models where the model name can be extracted. If the web page is accessible, then the vendor name is known since it is associated with the web page. Since many models may use the same web page for indicating the model name, all the model names are searched for in each line of the web page until the model name is found. In the flowchart, a line is obtained from the web page. If no more lines can be obtained, then the process to obtain the model name failed even though the web page was accessible and the vendor name is known. If a line was obtained, the line is checked to see if any of the model names are found in the line. If none, then obtain the next line of the web page. Otherwise, from the model name found in the line, obtain the normalized model name and the process is completed.

FIG. 45 is a sample portion of a web page of a device that contains the model name of the device. This portion is the HTML source of the web page which is not visible in a web browser. As can be seen from the web page, the model name for the device is the LaserJet 9000. The process of FIG. 44 would read the first line of the web page which contains the model name. Then each model name that could be found from this web page would be searched for in this line. If the LaserJet 9000 is not supported by the HTTP protocol, then no model name would be found and this device would not be supported and monitored by the HTTP protocol. Otherwise, the unique ID of the device would be obtained, the information to extract status information from the device would be obtained, and status information would be obtained from the device.

FIG. 46 shows sample values for the map structure of FIG. 39 that are used to obtain the model name from the web page shown in FIG. 45. To obtain the model name, the system will go through the map structure one vendor at a time, attempt to access the web page in the vector pairs, and if the web page is accessible, determine if one of the model names in the vector of pairs can be found. For the sample values, the vendor HP would be used first. From the vector of pairs, the system will attempt to access the web page "/hp/device/this.LCDispatcher?dispatch=html&cat=0&pos=1". If the web page is accessible, then the system would read lines from the web page to find one of the model names—"HP Color LaserJet 4550", "HP LaserJet 9000 Series", or "hp color LaserJet 550". If any are found, then the model name is obtained. Otherwise, the system will check the next web page "/hp/device/this.LCDispatcher?nav=hp.Config" corresponding to HP and see if the model name "hp LaserJet 4345 mfp" can be found. If none of the web page corresponding to HP can be accessed, then the process is repeated for Xerox.

FIG. 47 is a flowchart that describes the process of obtaining the status information from the web page of a device that uses the data structures of FIGS. 40, 41 and 42. The map structure of FIG. 41 shows that for a given vendor and model, there are multiple web pages from which different status information can be extracted. Each web page is accessed to extract the status information. In the flowchart, the components of the SExtractionState of FIG. 42 are used. This flowchart shows the process that would obtain one status information from the web page. However, more than one status information could be extracted from the web page at the same time so the process in the flowchart would apply for unique ID and all status information obtained from the web page. The testing of the left side, steps 4700-4710 of FIG. 47, are done for each of the vector of SExtract State shown in FIG. 42. The iterator m_CurrentPreconditionItr of SExtractionState is checked to see if there are any sKey in the vector of sKey used to locate the line containing the status information. If there are more sKey, then a line is obtained from the web page. If the line does not contain sKey, the another line is obtained from the web page. If the line does contain sKey, increment the iterator to the next sKey. If there are no more sKey (m_CurrentPreconditionItr equals m_EndItr), then the status information will be on the next line. The next line if obtained from the web page. All strings up to and including m_sFrontDelete1 is deleted from the string containing the line of the web page containing the status information. Then all strings up to and include m_sFrontDelete2 is deleted from the line. Then all strings including and after m_sBackDelete is deleted from the line. All the HTML representation of spaces in the line such as   is converted to a blank space. All the leading and trailing spaces in the line are removed leading the status information. The right side of the flowchart shown in FIG. 47 (steps 4720-4732) is performed by CExtractValueFromLine in FIG. 37.

FIG. 48 is a sample portion of a web page of a device that contains status information. The status information is the toner level of different colors. The status information is found within the javascript of the web page. To obtain the status information for all the color toner levels, the sKey strings must be identified to locate the line containing the information. For example to locate the line containing the black toner level, the only sKey string needed to locate the line is "var YellowTonerPer". Another example to locate the line containing the cyan toner level, the sKey strings needed are "function RemainTonerOption( )", "else", and "{".

FIG. 49 shows sample values for the map structure of FIG. 41 used to obtain status information from the web page shown in FIG. 48. To obtain the status information using the map structure, the vector of pairs in the map for the vendor and model name is obtained. The vector of pairs will contain information about all the web pages that will contain status information for the vendor and model and what status information can be extracted from the web pages. The sample values only show one web page for the Samsung CLP550 printer in which four status information can be extracted (color toner levels). To extract the status information from the Samsung CLP550, the system will go through the vector of pairs. For each pair, the system will access the web page and then read lines from the web page until all the status information that can be extracted are obtained. For the sample values, the system will access the web page "/panel/setup.htm" of the Samsung CLP550 printer. The system will read all the lines of the web page looking for the sKey string associated with each status information. If the sKey strings are all found for a status information, then the status information is extracted from the next line using the front delete and back delete strings. Once all the status information is obtained, the system accesses the web page in the next pair of the vector to obtain status information from the next web page. This processes is repeated for all the web pages.

Figure 50:
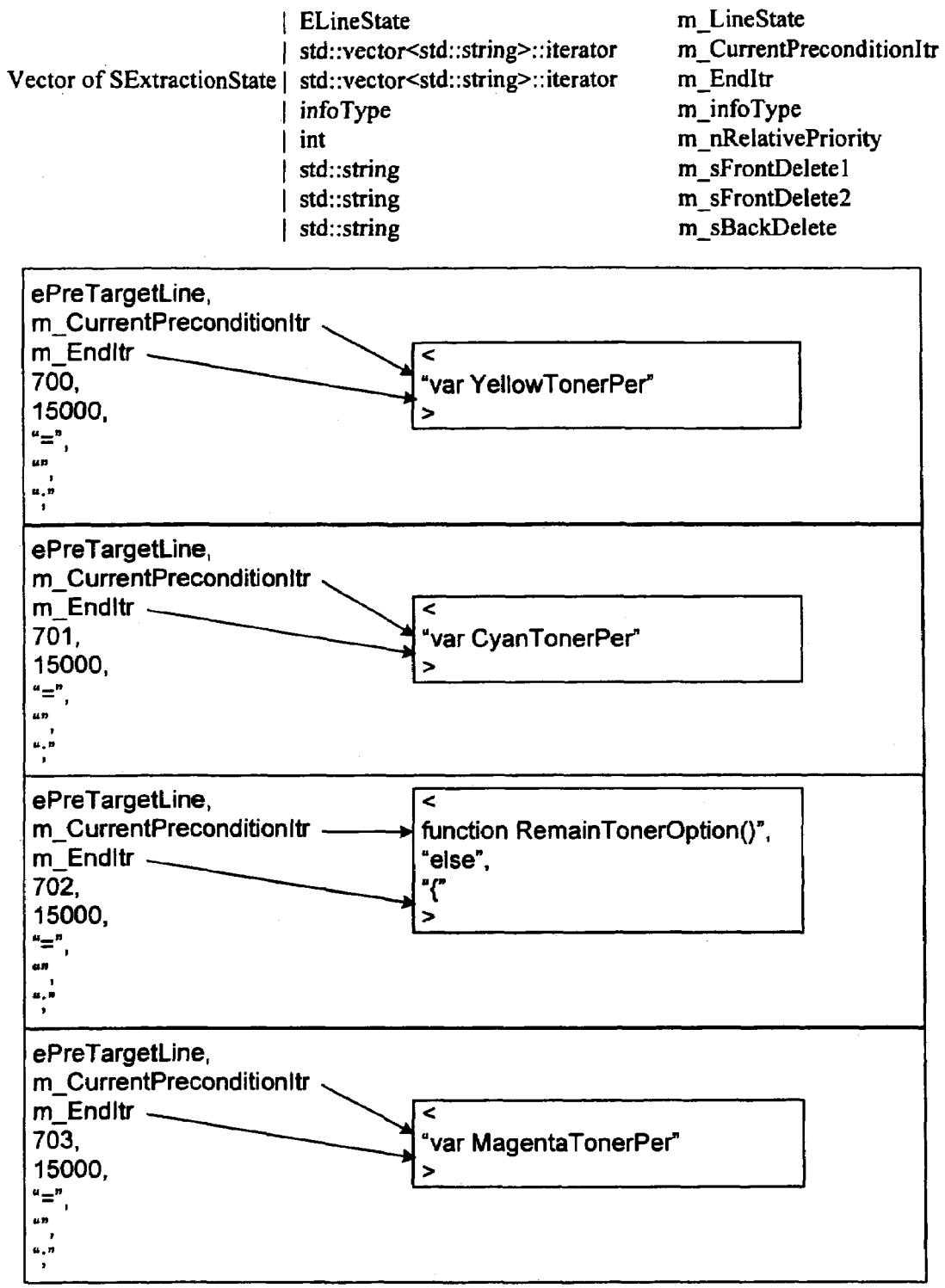
FIG. 50 shows sample values for the data structure of FIG. 42 used to obtain status information from the web page shown in FIG. 48.

FIG. 50 shows sample values for the vector structure of FIG. 42 used to obtain status information from the web page shown in FIG. 48. For a given web page, the vector structure contains a structure SExtractionState for each status information. Each structure will be used to locate the line containing the status information and to extract the desired information from the line. The value of m_LineState at the start is ePreTargetLine. As each line is read from the web page, the sKey in the vector pointed to by each m_CurrentPreconditionItr are checked to see if they exist in the line that was read. If so, the m_CurrentPreconditionItr is moved to the next key. This is repeated until there are no more sKey (when m_CurrentPreconditionItr equals m_EndItr). If there are no more sKey, then m_LineState changes to eTargetLine indicating that the next line read from the web page will contain the status information and the front delete and back delete strings of SExtractionState will be used to extract the information.

Figure 51:
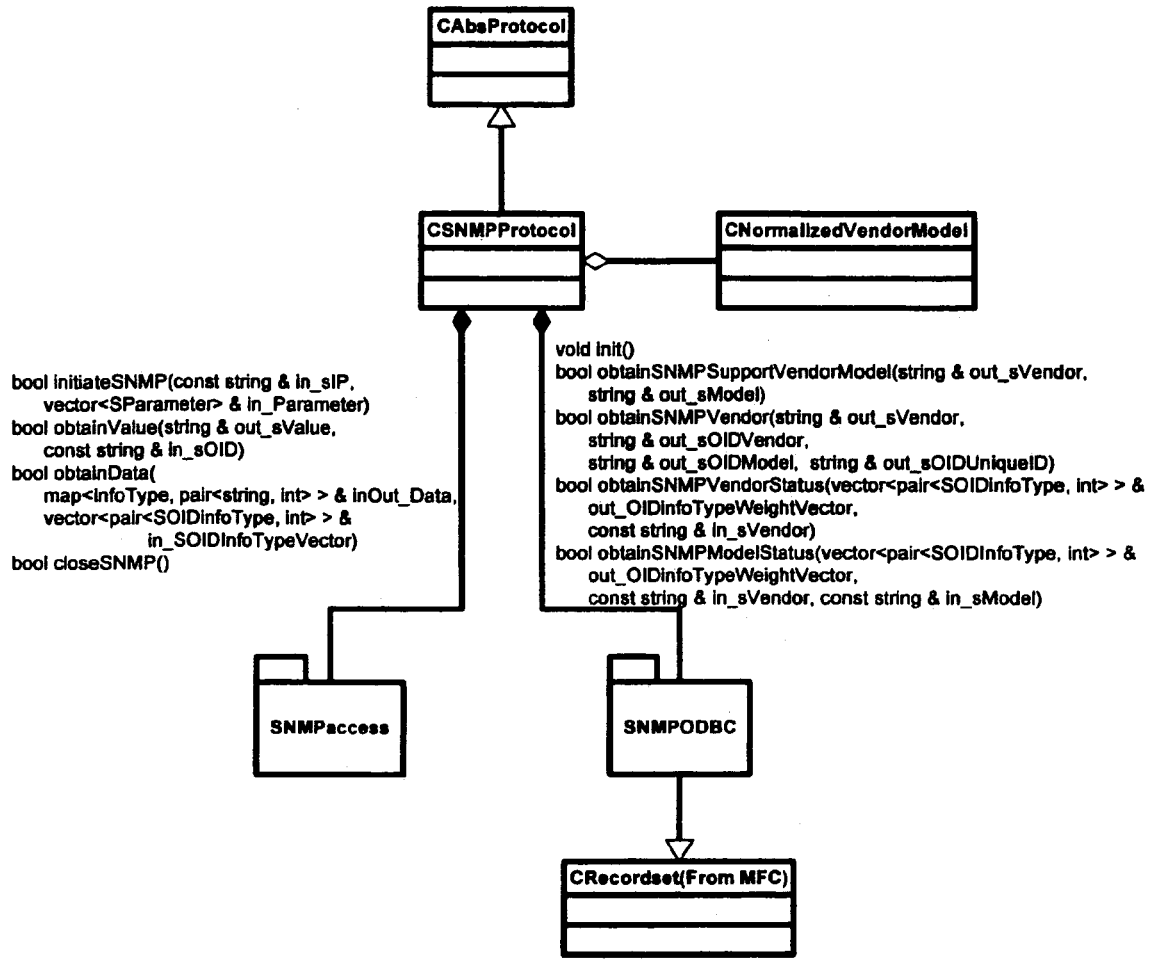
FIG. 51 shows the package diagram of the SNMP package used to extract information from the MIB of a device.

FIG. 51 shows a package diagram of the SNMP package that is used to extract information from the MIB of a device. FIG. 51 shows the package diagram for a first embodiment of the SNMP package 2304. This package is responsible for determining the vendor and model of network devices supported by the SNMP protocol and the information to be obtained from the network devices by SNMP protocol, and for accessing the network device through the SNMP protocol to obtain information from the network devices. The package contains the packages SNMPaccess, SNMPODBC, the class CSNMPProtocol, and uses the classes CNormalizedVendorModel 2314, CAbsProtocol 2308, and CRecordset 2310 as described in FIG. 22. The SNMPaccess package implements the SNMP protocol to access the network devices and to obtain information from the network devices. The SNMPODBC package accesses and obtains information from the database about vendor and model of network devices supported by the SNMP protocol and the information to be obtained from the network devices by SNMP protocol. The CSNMPProtocol class is a class derived from the CAbsProtocol class 2308. CSNMPProtocol obtains the necessary information from the network devices using the SNMP protocol. CSNMPProtocol provides the method for all the interface functions of CAbsProtocol 2308 as described in FIG. 22. FIG. 51 also shows the functions of the packages SNMPaccess and SNMPODBC that CSNMPProtocol uses. The SNMPODBC package uses the class CRecordset to obtain information from the database. The SNMP protocol obtains normalized vendor names and normalize model names from CNormalizedVendorModel so that it can use names which are common to all protocols.

FIG. 52 shows a map structure that is used in the SNMP package of FIG. 51 to extract the model name from the MIB. The map structure m_VendorModelSupport is an attribute member of CSNMPProtocol. The key to the map is a string for the vendor name. The value to the map is a vector of strings for all the models that are supported. The vendor name will be capitalized and does not correspond to the normalized vendor name. The model names are the names that will be found in the MIB of the devices and do not correspond to the normalized model names. The SNMP package will obtain the string containing the model name of the device from the MIB for a given vendor. Then the SNMP package will check which of the model names in the vector is found in the string to determine the model name. This map structure is populated with information from the tables in FIG. 18 of the support database.

FIG. 53 shows a map structure that is used in the SNMP package of FIG. 51 to determine the vendor name, model name, and unique ID from the MIB of a device. The map structure m_VendorOIDInfoMap is an attribute member of CSNMPProtocol. The key to the map is a string for the vendor name. The value to the map is a structure SVendorOIDInfo which consists of three strings that represent the object identifier. m_sEnterpriseOID is the enterprise object identifier that corresponds to a vendor. The enterprise object identifier uniquely identifies the vendor of a device. m_sOIDForModel is the object identifier that is used to obtain the string from the MIB of the device that will contain the model name. This string along with the vector of model names in the data structure of FIG. 52 will determine the model name of the device. m_sOIDForUniqueID is the object identifier that is used to obtain the string from the MIB of the device that will contain the unique ID of the device. The vendor name will be capitalized and does not correspond to the normalized vendor name. This map structure is populated with information from the tables in FIG. 18 of the support database.

FIG. 54 shows a map structure that is used in the SNMP package of FIG. 51 to extract the status information from the MIB of all devices that are monitored. The map structure m_VendorModelOIDInfo is an attribute member of CSNMPProtocol. The key to the map is the normalized vendor name. The value to the map is another inner map. The key to the inner map is the normalized model name (except for GENERIC). For a given vendor, the GENERIC model entry indicates that certain status information can be obtained from the device for all models of the given vendor. The value to the inner map is a vector of pairs that will be used to obtain the status information from the MIB of the device. Once the vendor and model are determined for a device, information about obtaining status information from the device is obtained from the support database and added to the map structure.

FIG. 55 shows a map structure that is used in the SNMP package of FIG. 51 for mapping the normalized vendor and model name with the vendor and model name as known by SNMP. The key to the map is a string for the normalized vendor name and model name separated by %. The value to the map is a pair where the first element of the pair is the vendor name and the second element of the pair is the model name. The vendor name and model name in the pair are names for the device as known by SNMP protocol.

The map structures of FIG. 52 and 53 are used during the initialization process only when the discovering the vendor name, model name, and unique ID of the device. The map structure of FIG. 55 is used to help populate the map structure of 54 to determine the status information to collect from all the devices discovered during the initialization process.

Figure 56:
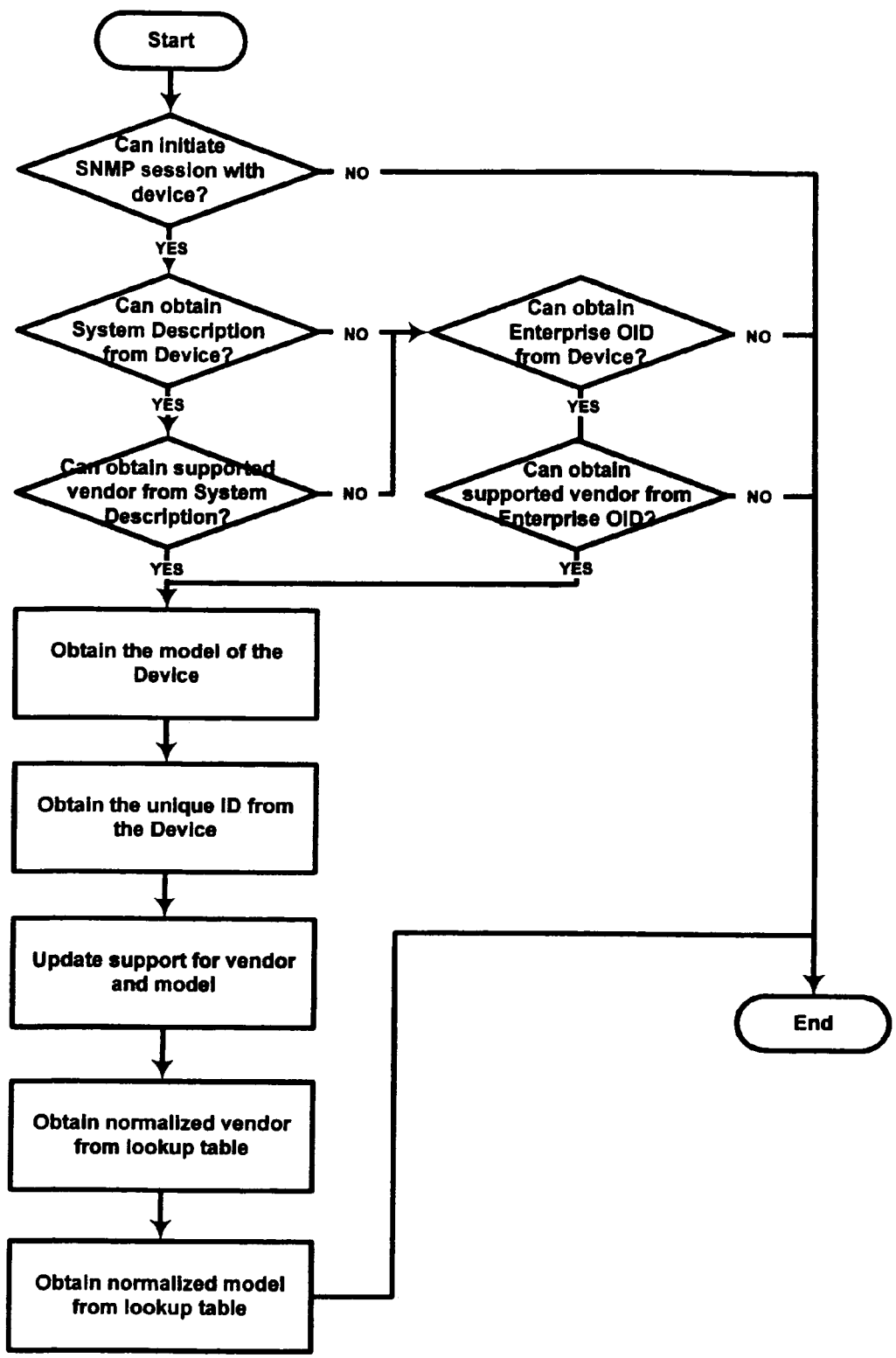
FIG. 56 is a flowchart describing the process of obtaining the vendor name, model name, and unique ID of the device.

FIG. 56 is a flowchart that describes the process of obtaining the vendor name, model name, and unique ID of the device through the SNMP protocol. The system initiates the SNMP session with the device. If the system fails to initiate the SNMP session, the process is complete and the SNMP protocol will not be used to obtain information from the device. If the system initiates an SNMP session with the device, the system obtains the system description from the MIB of the device and converts the string of the system description to all upper cases. In most cases, the system description will contain the vendor name. Each of the vendor names in the map structure of FIG. 53 will be checked to see if the vendor name is in the system description. If the system failed to obtain the system description or the system description did not contain any of the vendor names in the map structure, then the system obtains the enterprise OID from the device. Some devices such as the Konica Minolta Magicolor 3300 printer will not have the vendor name in the system description. Each of the enterprise OID in the map structure of FIG. 53 will be checked to see if it can be found in the obtained enterprise OID. The vendor is obtained when one of the enterprise OID in the map (FIG. 53) is found. For the Konica Minolta Magicolor 3300 printer, the enterprise OID can be used to identify the vendor. If the system failed to obtain the enterprise OID or the enterprise OID obtained did not contain any of the enterprise OID in the map structure of 53, the process is complete. However, SNMP protocol can be used to obtain generic information from the device since the SNMP session can be initiated. The sequence to obtain the vendor name cannot be reversed. The system description must be checked first before the enterprise OID. In most cases, the system description is sufficient to obtain the vendor name. Only a few cases require the enterprise OID to identify the vendor. The vendor name may not be correctly identified if the enterprise OID is checked first for the vendor name before the system description. The reason is that many vendors used enterprise OID of HP so that they would be identified as HP if the enterprise OID was used to identify the vendor. However, the system description would successfully identify the models of Samsung and Brother correctly. If the vendor name is obtained through either the system description or the enterprise OID, the system attempts to obtain the model name of the device. The system uses the object identifier in m_sOEDForModel corresponding to the vendor name obtained from the map structure of FIG. 53 to obtain the string from the MIB of the device that contains the model name. The each model name in the vector corresponding to the vendor name obtained from the map structure of FIG. 52 is checked to see if it is found in the string obtained from the device. Whether or not the model name is obtained, the system will next attempt to obtain the unique ID of the device. The system uses the object identifier in m_sOIDForUniqueID corresponding to the vendor name obtained from the map structure of FIG. 53 to obtain the string from the MIB of the device that contains the unique ID. Whether or not the system obtains the string, the system updates SNMP support for the device. Updating SNMP support populates the map structure of FIG. 54 with the information to obtain status information for a vendor and model of the device. If only the vendor is known, then generic status information is added to the map structure. If the vendor and model are known, then the generic status and model specific status information is added to the map structure. The vendor and model name obtained through SNMP are names which are in the SNMP tables of FIG. 18 in the support database. These names are used to match the names which are obtained from a device to determine the vendor and model name. These names may correspond to names used to identify the vendor and model names in other protocols. However, to guarantee that the vendor and model name obtained by the SNMP protocol is known by all other protocols, normalized vendor and model names are used. The normalized vendor and model names are common names that are shared among protocols. Therefore, the normalized vendor name for the vendor name obtained by the SNMP protocol is obtained using the lookup table described in FIG. 30 and the normalized model name for the model named obtained by the SNMP protocol is obtained using the lookup table described in FIG. 31.

Although the present invention is shown to include a few devices, which require monitoring, connected to a network, it will be appreciated that any number of devices may be connected to the network without deviating from the spirit and scope of the invention. Also, the present invention may also be applied in a home environment wherein various devices need to be monitored and controlled.

Embodiments of the present invention enables the monitoring of the various devices in a multi-vendor environment and further facilitates retrieving and displaying detailed information in a user-comprehensible or user-friendly manner even without having specific private management information base (MIB) information. Furthermore, the information can be redistributed from a monitoring station (902) to other computer (940) using various methods such as SMTP, FTP, or Web Services.

The controller of the present invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product residing on a storage medium including instructions that can be used to program a computer to perform a process of the invention. The storage medium can include, but is not limited to, any type of disk including floppy disks, optical discs, CD-ROMs, and magneto-optical disks, ROMS, RAMs, EPROMs, EEPROMs, magnetic or optical cards, or any type of media suitable for storing electronic instructions.

Numerous modifications and variations of the present invention are possible in light of the above teachings. It is therefore to be understood that within the scope of the appended claims, the invention may be practiced otherwise than as specifically described herein.

The invention claimed is:

1. A method of extracting information related to a monitored device communicatively coupled to a monitoring device configured to monitor the monitored device by using at least one of a plurality of communication protocols through a communication network, comprising:
   a. obtaining, with the monitoring device, a webpage address for a webpage stored on a server in the monitored device and a corresponding plurality of model names, which are models of a vendor of the monitored device, from a memory device storing a map structure that stores a vector pair formed by the webpage address and the corresponding plurality of model names;
   b. accessing, with the monitoring device and an HTTP communication protocol, the webpage stored on the server included in the monitored device using the webpage address obtained from the map structure;
   c. parsing, with the monitoring device, the webpage stored on the server included in the monitored device to find at least one of the plurality of model names that are the models of the vendor of the monitored device;
   d. extracting, with the monitoring device, a model name from the webpage stored on the server included in the monitored device, the model name being a model of the monitored device; and
   e. if one of the model names is found in the parsing step, then normalizing the found model as the model name of the monitored device by determining a normalized model name for the monitored device that corresponds to the model name extracted from the webpage stored on the server included in the monitored device, the normalized model name being a common model name that all of the plurality of communication protocols supported by the monitoring device can use while extracting information from the monitored device.

2. The method of claim 1, wherein the parsing step comprises: searching the webpage line-by-line until at least one of the plurality of model names is found or until all lines in the webpage have been searched.

3. The method of claim 1, wherein the database stores the webpage address and the corresponding plurality of model names in correspondence with a vendor name. and the method further includes repeating the obtaining, accessing, and parsing steps for a plurality of webpage addresses stored in the database for the vendor name.

4. A computer readable storage medium encoded with instructions which when executed by a processor on a monitoring device, causes the processor to implement a method of extracting information related to a monitored device communicatively coupled to the monitoring device configured to monitor the monitored device by using at least one of a plurality of communication protocols through a communication network, the comprising:
   a. obtaining, with the monitoring device, a webpage address for a webpage stored on a server in the monitored device and a corresponding plurality of model names, which are models of a vendor of the monitored device, from a memory device storing a map structure that stores a vector pair formed by the webpage address and the corresponding plurality of model names;

b. accessing, with the monitoring device and an HTTP communication protocol, the webpage stored on the server included in the monitored device using the webpage address obtained from the map structure;

c. parsing, with the monitoring device, the webpage stored on the server included in the monitored device to find at least one of the plurality of model names that are the models of the vendor of the monitored device d. extracting, with the monitoring device, a model name from the webpage stored on the server included in the monitored device, the model name being a model of the monitored device; and e. if one of the model names is found in the parsing step, then normalizing the found model as the model name of the monitored device by determining a normalized model name for the monitored device that corresponds to the model name extracted from the webpage stored on the server included in the monitored device, the normalized model name being a common model name that all of the plurality of communication protocols supported by the monitoring device can use while extracting information from the monitored device.

5. The computer readable storage medium of claim 4, wherein the parsing comprises:

a. searching the webpage line-by-line until at least one of the plurality of model names is found or until all lines in the webpage have been searched.

6. The computer readable storage medium of claim 4, wherein a database stores the webpage address and the corresponding plurality of model names in correspondence with a vendor name, and the method further includes a. repeating the instructions for obtaining, accessing, and parsing for a plurality of webpage addresses stored in the database for the vendor name.

7. A system for extracting information related to a monitored device communicatively coupled to a monitoring device configured to monitor the monitored device by using at least one of a plurality of communication protocols through a communication network, comprising:

a. means for obtaining, with the monitoring device, a webpage address for a webpage stored on a server in the monitored device and a corresponding plurality of model names, which are models of a vendor of the monitored device, from a memory device storing a map structure that stores a vector pair formed by the webpage address and the corresponding plurality of model names;

b. means for accessing, with the monitoring device and an HTTP communication protocol the webpage stored on the server included in the monitored device using the webpage address obtained from the map structure;

c. means for parsing, with the monitoring device, the webpage stored on the server included in the monitored device to find at least one of the plurality of model names that are the models of the vendor of the monitored device;

d. means for extracting, with the monitoring device, a model name from the webpage stored on the server included in the monitored device, the model name being a model of the monitored device; and e. if one of the model names is found in the parsing step, then normalizing the found model as the model name of the monitored device by a means for determining a normalized model name for the monitored device that corresponds to the model name extracted from the webpage stored on the server included in the monitored device, the normalized model name being a common model name that all of the plurality of communication protocols supported by the monitoring device can use while extracting information from the monitored device.

8. The system of claim 7, wherein the means for parsing comprises: means for searching the webpage line-by-line until at least one of the plurality of model names is found or until all lilies in the webpage have been searched.

9. The system of claim 7, wherein the database stores the webpage address and the corresponding plurality of model names in correspondence with a vendor name, and the system further includes means for causing the means for obtaining, means for accessing, and means for parsing to repeat.

* * * * *